(12) United States Patent
Patel et al.

(10) Patent No.: US 11,789,415 B2
(45) Date of Patent: **\*Oct. 17, 2023**

(54) BUILDING HVAC SYSTEM WITH MULTI-LEVEL MODEL PREDICTIVE CONTROL

(71) Applicant: Johnson Controls Tyco IP Holdings LLP, Milwaukee, WI (US)

(72) Inventors: Nishith R. Patel, Snellville, GA (US); Matthew J. Ellis, Milwaukee, WI (US); Michael J. Wenzel, Grafton, WI (US); Robert D. Turney, Watertown, WI (US); Brett M. Lenhardt, Waukesha, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,781

(22) Filed: Oct. 19, 2020

(65) Prior Publication Data

US 2021/0034024 A1 Feb. 4, 2021

Related U.S. Application Data

(63) Continuation-in-part of application No. 16/601,391, filed on Oct. 14, 2019, now Pat. No. 10,809,676, and
(Continued)

(51) Int. Cl.
*G05B 13/04* (2006.01)
*G05B 15/02* (2006.01)
(Continued)

(52) U.S. Cl.
CPC ............ *G05B 13/048* (2013.01); *F24F 11/30* (2018.01); *F24F 11/62* (2018.01); *G05B 13/041* (2013.01);
(Continued)

(58) Field of Classification Search
CPC ............ G05D 7/0617; G05D 23/1917; G05B 13/048; G05B 11/01; G05B 13/041;
(Continued)

(56) References Cited

U.S. PATENT DOCUMENTS 4,428,081 A   1/1984 Smith
4,716,601 A   1/1988 Mcneal
(Continued)

FOREIGN PATENT DOCUMENTS

CA    2957726 A1   3/2016
CA    3043996 A1   2/2018
(Continued)

OTHER PUBLICATIONS

Office Action on JP 2018-567674, dated Mar. 2, 2021, 8 pages.
(Continued)

*Primary Examiner* — Mohammad Ali
*Assistant Examiner* — Joshua T Sanders
(74) *Attorney, Agent, or Firm* — Foley & Lardner LLP

(57) ABSTRACT

A heating, ventilation, or air conditioning (HVAC) system for a building includes HVAC equipment configured to provide heating or cooling to one or more building spaces and one or more controllers. The one or more controllers include one or more processing circuits configured to generate energy targets for the one or more building spaces using a thermal capacitance of the one or more building spaces to which the heating or cooling is provided by the HVAC equipment, generate setpoints for the HVAC equipment using the energy targets for the one or more building spaces to which the heating or cooling is provided by the HVAC equipment, and operate the HVAC equipment using the setpoints to provide the heating or cooling to the one or more building spaces.

17 Claims, 22 Drawing Sheets

Related U.S. Application Data a continuation-in-part of application No. 16/601,385, filed on Oct. 14, 2019, now Pat. No. 10,809,675, said application No. 16/601,391 is a continuation of application No. 15/635,754, filed on Jun. 28, 2017, now Pat. No. 10,564,612, said application No. 16/601,385 is a continuation of application No. 15/199,910, filed on Jun. 30, 2016, now abandoned.

(60) Provisional application No. 62/357,338, filed on Jun. 30, 2016.

(51) Int. Cl.
  G05B 17/02 (2006.01)
  F24F 11/62 (2018.01)
  G05D 7/06 (2006.01)
  F24F 11/30 (2018.01)
  F24F 11/46 (2018.01)

(52) U.S. Cl.
  CPC .......... G05B 15/02 (2013.01); G05B 17/02 (2013.01); G05D 7/0617 (2013.01); F24F 11/46 (2018.01); G05B 2219/2642 (2013.01)

(58) Field of Classification Search
  CPC ..... F28D 20/0034; F24F 5/0017; F24F 11/30; F24F 3/044; F24F 11/83; F24F 11/77; F24F 11/62
  USPC .................................................. 700/277, 282
  See application file for complete search history.

(56) References Cited

U.S. PATENT DOCUMENTS

| | | |
|---|---|---|
| 4,748,697 A | 6/1988 | Hodnett |
| 5,163,185 A | 11/1992 | Hodnett |
| 6,047,412 A | 4/2000 | Wilson et al. |
| 6,415,452 B1 | 7/2002 | Watanabe et al. |
| 6,416,177 B1 | 7/2002 | Gibson |
| 6,725,467 B2 | 4/2004 | Harding |
| 7,580,775 B2 | 8/2009 | Kulyk et al. |
| 7,809,472 B1 | 10/2010 | Silva et al. |
| 7,894,946 B2 | 2/2011 | Kulyk et al. |
| 8,527,108 B2 | 9/2013 | Kulyk et al. |
| 8,527,109 B2 | 9/2013 | Kulyk et al. |
| 8,903,554 B2 | 12/2014 | Stagner |
| 8,918,223 B2 | 12/2014 | Kulyk et al. |
| 9,110,647 B2 | 8/2015 | Kulyk et al. |
| 9,171,276 B2 | 10/2015 | Steven et al. |
| 9,235,657 B1 | 1/2016 | Wenzel et al. |
| 9,300,141 B2 | 3/2016 | Marhoefer |
| D755,278 S | 5/2016 | Blanchard et al. |
| 9,429,923 B2 | 8/2016 | Ward et al. |
| 9,436,179 B1 | 9/2016 | Turney et al. |
| 9,447,985 B2 | 9/2016 | Johnson |
| 9,703,339 B2 | 7/2017 | Kulyk et al. |
| 10,139,877 B2 | 11/2018 | Kulyk et al. |
| 10,277,034 B2 | 4/2019 | Marhoefer |
| 10,871,756 B2 | 12/2020 | Johnson et al. |
| 10,908,578 B2 | 2/2021 | Johnson et al. |
| 10,921,768 B2 | 2/2021 | Johnson et al. |
| 11,156,978 B2 | 10/2021 | Johnson et al. |
| 2003/0055798 A1 | 3/2003 | Hittle et al. |
| 2007/0005191 A1 | 1/2007 | Sloup et al. |
| 2007/0129850 A1 | 6/2007 | Miyaji |
| 2007/0203860 A1 | 8/2007 | Golden et al. |
| 2008/0000241 A1 | 1/2008 | Larsen et al. |
| 2008/0244104 A1 | 10/2008 | Clemente |
| 2009/0112369 A1 | 4/2009 | Gwerder et al. |
| 2009/0229044 A1 | 9/2009 | Gill |
| 2010/0268353 A1 | 10/2010 | Crisalle et al. |
| 2011/0066258 A1 | 3/2011 | Torzhkov et al. |
| 2012/0022702 A1 | 1/2012 | Jang |
| 2012/0023647 A1 | 2/2012 | Park |
| 2012/0130556 A1 | 5/2012 | Marhoefer |
| 2012/0215362 A1 | 8/2012 | Stagner |
| 2013/0103378 A1 | 4/2013 | Tinnakornsrisuphap et al. |
| 2013/0104299 A1 | 5/2013 | Chen |
| 2013/0162037 A1 | 6/2013 | Kim et al. |
| 2013/0231792 A1 | 9/2013 | Ji et al. |
| 2013/0245847 A1 | 9/2013 | Steven et al. |
| 2013/0274940 A1 | 10/2013 | Wei et al. |
| 2013/0345880 A1 | 12/2013 | Asmus |
| 2013/0346139 A1 | 12/2013 | Steven et al. |
| 2014/0039709 A1 | 2/2014 | Steven et al. |
| 2014/0094979 A1 | 4/2014 | Mansfield |
| 2014/0188295 A1 | 7/2014 | Saito et al. |
| 2014/0277760 A1 | 9/2014 | Marik et al. |
| 2014/0277761 A1 | 9/2014 | Matsuoka et al. |
| 2014/0330611 A1 | 11/2014 | Steven et al. |
| 2014/0330695 A1 | 11/2014 | Steven et al. |
| 2014/0365017 A1 | 12/2014 | Hanna et al. |
| 2015/0011154 A1 | 1/2015 | Holm et al. |
| 2015/0067952 A1 | 3/2015 | Kulik |
| 2015/0088576 A1 | 3/2015 | Steven et al. |
| 2015/0134122 A1 | 5/2015 | Modi et al. |
| 2015/0142194 A1 | 5/2015 | Dyess et al. |
| 2015/0176848 A1 | 6/2015 | Jung et al. |
| 2015/0267932 A1 | 9/2015 | Kim et al. |
| 2015/0277467 A1 | 10/2015 | Steven et al. |
| 2015/0316902 A1 | 11/2015 | Wenzel et al. |
| 2015/0316907 A1 | 11/2015 | Elbsat et al. |
| 2015/0316946 A1 | 11/2015 | Wenzel et al. |
| 2015/0320600 A1 | 11/2015 | Blanchard et al. |
| 2015/0323208 A1 | 11/2015 | Son |
| 2015/0328049 A1 | 11/2015 | Blanchard et al. |
| 2015/0328050 A1 | 11/2015 | Sigismondo et al. |
| 2015/0378381 A1 | 12/2015 | Tinnakornsrisuphap et al. |
| 2016/0018796 A1 | 1/2016 | Lu |
| 2016/0084514 A1 | 3/2016 | Salsbury et al. |
| 2016/0091904 A1 | 3/2016 | Horesh et al. |
| 2016/0098022 A1 | 4/2016 | Wenzel et al. |
| 2016/0109147 A1* | 4/2016 | Uno ........................ F24F 11/62 700/276 |
| 2016/0146491 A1 | 5/2016 | Ettl et al. |
| 2016/0146493 A1* | 5/2016 | Ettl ........................ F24F 11/62 700/29 |
| 2016/0172859 A1 | 6/2016 | Marhoefer |
| 2016/0180474 A1 | 6/2016 | Steven et al. |
| 2016/0245539 A1 | 8/2016 | Motomura et al. |
| 2016/0305678 A1 | 10/2016 | Pavlovski et al. |
| 2016/0313019 A1* | 10/2016 | Mengle ..................... F24F 11/62 |
| 2016/0313751 A1 | 10/2016 | Risbeck et al. |
| 2016/0322835 A1 | 11/2016 | Carlson et al. |
| 2016/0377306 A1 | 12/2016 | Drees et al. |
| 2017/0016644 A1 | 1/2017 | Nagarathinam et al. |
| 2017/0030598 A1 | 2/2017 | Burns et al. |
| 2017/0102162 A1 | 4/2017 | Drees et al. |
| 2017/0102675 A1 | 4/2017 | Drees |
| 2017/0104337 A1 | 4/2017 | Drees |
| 2017/0104449 A1 | 4/2017 | Drees |
| 2017/0138623 A1 | 5/2017 | Song et al. |
| 2017/0234559 A1 | 8/2017 | Federspiel et al. |
| 2017/0237259 A1 | 8/2017 | Yoon et al. |
| 2017/0350625 A1 | 12/2017 | Burns et al. |
| 2018/0004171 A1 | 1/2018 | Patel et al. |
| 2018/0100668 A1 | 4/2018 | Huang |
| 2018/0180337 A1 | 6/2018 | Luo et al. |
| 2018/0195741 A1 | 7/2018 | Field et al. |
| 2018/0196456 A1 | 7/2018 | Elbsat |
| 2018/0197253 A1 | 7/2018 | Elbsat et al. |
| 2018/0224814 A1 | 8/2018 | Elbsat et al. |
| 2018/0285800 A1 | 10/2018 | Wenzel et al. |
| 2018/0340700 A1 | 11/2018 | Chen et al. |
| 2018/0372362 A1 | 12/2018 | Turney et al. |
| 2019/0115785 A1 | 4/2019 | Kallamkote et al. |
| 2020/0059098 A1 | 2/2020 | Dong et al. |

(56) References Cited

U.S. PATENT DOCUMENTS

| | | | | |
|---|---|---|---|---|
| 2020/0393860 | A1* | 12/2020 | Corbin | G05D 23/1923 |
| 2022/0268471 | A1 | 8/2022 | Turney et al. | |

FOREIGN PATENT DOCUMENTS

| | | | |
|---|---|---|---|
| CN | 1161753 | A | 10/1997 |
| CN | 104279715 | A | 1/2015 |
| CN | 104319766 | A | 1/2015 |
| CN | 104898422 | A | 9/2015 |
| EP | 1 156 286 | A2 | 11/2012 |
| EP | 3 186 687 | A4 | 7/2017 |
| EP | 3 497 377 | A1 | 6/2019 |
| JP | 2005-092584 | | 4/2005 |
| JP | 2010-025352 | A | 2/2010 |
| JP | 2011-179722 | A | 9/2011 |
| JP | 2012-080679 | A | 4/2012 |
| JP | 2013-142494 | A | 7/2013 |
| JP | 2014-027784 | A | 2/2014 |
| JP | 2014-047989 | A | 3/2014 |
| JP | 2014-096946 | A | 5/2014 |
| WO | WO-2012/161804 | A1 | 11/2012 |
| WO | WO-2013/130956 | A1 | 9/2013 |

OTHER PUBLICATIONS

JP Office Action on JP Appl. Ser. No. 2018-567572 dated Jan. 18, 2022 (8 pages).
Office Action on CN 201780041010.1, dated Apr. 27, 2021, 43 pages with English language translation.
Office Action on CN 201780041246.5, dated May 17, 2021, 27 pages with English language translation.
CN Office Action on CN Appl. Ser. No. 201780041246.5 dated Mar. 3, 2022 (10 pages).
Office Action on JP 2018-567668, dated Mar. 9, 2021, 10 pages with English language translation.
CN Office Action on CN Appl. Ser. No. 201780041010.1 dated Nov. 12, 2021 (21 pages).
JP Office Action on JP Appl. Ser. No. 2018-567668 dated Nov. 30, 2021 (6 pages).
Afram et al., Theory and applications of HVAC Control Systems—A review of model predictive control (MPC), Building and Environment, 2014, pp. 343-355.
Astrom. "Optimal Control of Markov Decision Processes with Incomplete State Estimation," J. Math. Anal. Appl., 1965, 10, pp. 174-205.
Atam, New Paths Toward Energy-Efficient Buildings, Dec. 2016, 17 pages.
Bengea et al., Implementation of Model Predictive Control for an HVAC System in a Mid-Size Commercial Building, Sep. 16, 2013, 16 pages.
Bittanti et al., Adaptive Control of Linear Time Invariant Systems: The "Bet on the Best" Principle, Communications in Information and Systems, 2006, 6.4, pp. 299-320.
Chen et al., "Control-oriented System Identification: an H1 Approach," Wiley-Interscience, 2000, 19, Chapters 3 & 8, 38 pages.
Feng et al., "Model Predictive Control of Radiant Slab Systems with Evaporative Cooling Sources," Energy and Buildings, 2015, 87, pp. 199-210.
George et al., "Time Series Analysis: Forecasting and Control," Fifth Edition, John Wiley & Sons, 2016, Chapters 4-7 and 13-15, 183 pages.
Hardt et al., "Gradient Descent Learns Linear Dynamical Systems," Journal of Machine Learning Research, 2018, 19, pp. 1-44.
Helmicki et al. "Control Oriented System Identification: a Worstcase/ deterministic Approach in H1," IEEE Transactions on Automatic Control, 1991, 36.10, pp. 1163-1176.
Kelly et al., "Are intelligent agents the key to optimizing building HVAC system performance?" HVAC&R Research, 2012, 18:4, 11 pages.
Kelman et al., "Bilinear Model Predictive Control of a HVAC System Using Sequential Quadratic Programming," Proceedings of the IFAC World Congress, Sep. 2, 2011, 6 pages.
Kingma et al,. "Adam: A Method for Stochastic Optimization," International Conference on Learning Representations (ICLR), 2015, 15 pages.
Ljung et al., "Theory and Practice of Recursive Identification," vol. 5. JSTOR, 1983, Chapters 2, 3 & 7, 80 pages.
Ljung, editor. "System Identification: Theory for the User," 2nd Edition, Prentice Hall, Upper Saddle River, New Jersey, 1999, Chapters 5 and 7, 40 pages.
Ma et al., "Model Predictive Control for the Operation of Building Cooling Systems", IEEE Transactions on Control Systems Technology, May 2012, 20:3, pp. 796-803.
Ma et al., Predictive Control for Energy Efficient Buildings with Thermal Storage: Modeling, Stimulation, and Experiments, IEEE Control Systems, Feb. 1, 2012, pp. 44-64.
Ma et. al., "Predictive control for Energy Efficient Buildings with Thermal Storage: Modeling, Stimulation, and Experiments", IEEE Control Systems, vol. 32, No. 1, Feb. 2012, pp. 44-49.
Morosan et al., Building temperature regulation using a distributed model predictive control, Energy and Buildings, Sep. 1, 2010, pp. 1445-1452.
Nevena et al., "Data center cooling using model-predictive control," 32nd Conference on Neural Information Processing Systems, 2018, 10 pages.
Office Action on CN 201780040984.8, dated Dec. 16, 2020, 7 pages.
Office Action on CN 201780040984.8, dated Mar. 25, 2020, 19 pages with translation.
Search Report for International Application No. PCT/US2017/ 038450, dated Nov. 30, 2017, 12 pages.
Search Report for International Application No. PCT/US2017/ 039798, dated Sep. 15, 2017, 15 pages.
Search Report for International Application No. PCT/US2017/ 039937, dated Sep. 21, 2017, 16 pages.
Ward et al., "Beyond Comfort—Managing the Impact of HVAC Control on the Outside World," Proceedings of Conference: Air Conditioning and the Low Carbon Cooling Challenge, Cumberland Lodge, Windsor, UK, London: Network for Comfort and Energy Use in Buildings, http://nceub.org.uk, Jul. 27-29, 2008, 15 pages.
Yudong et al., "Predictive Control for Energy Efficient Buildings with Thermal Storage: Modeling, Stimulation, and Experiments." IEEE Control Systems, Feb. 2012, 32.1, pp. 44-64.
Zhao et al., "An Energy Management System for Building Structures Using a Multi-Agent Decision-Making Control Methodology", IEEE Transactiona On Industry Applications, vol. 49, No. 1, Jan./Feb. 2013, pp. 322-330.
CN Office Action on CN Appl. Ser. No. 201780041010.1 dated Mar. 15, 2022, no translation (24 pages).
Office Action on JP 2018-567572, dated Jun. 8, 2021, 14 pages with English language translation.
JP Office Action on JP Appl. Ser. No. 2018-567668 dated Jun. 7, 2022, with translation (12 pages).
Kuraura, Takeshi, "Transition of Variable Refrigerative Flow," Japan Society of Refrigerating and Air Conditioning Engineers, Sep. 2010, vol. 85, No. 995 (6 pages).
Berggren et al., LCE analysis of buildings—Taking the step towards Net Zero Energy Buildings, Nov. 30, 2012, Energy and Buildings 62 (2013) 381-391. (Year: 2012).
Carrasco et al., Power Electronic Systems for the Grid Interaction of Renewable Energy Sources: a Survey, Jun. 2006, IEEE Transactions on Industrial Electronics, vol. 53 Iss. 4, Year 2006.
Cellura et al., Energy life-cycle approach in Net zero energy buildilngs balance: Cross Mark Operation and embodied energy of an Italian case study, May 4, 2013, Energy and Buildings 72 (2014) 371-381. (Year: 2013).
Cordiner et al., A study on the energy management in domestic micro-gridsd based on Model Predictive Control strategies, Feb. 25, 2015, Energy Conversion and Management 102 (2015) 50-58 (Year 2015).

(56) References Cited

OTHER PUBLICATIONS

Ferrarini et al., "A Distributed Model Predictive Control approach for the integration of flexible loads, storage and renewables," IEEE, 2014 (6 pages).
Gelazanskas et al., Demand side management in smart grid: A review and proposals for future direction, Sustainable Cities and Society 11, Year 2014, pp. 22-30.
Hamdy et al., A multi-stage optimization method for cost-optimal and nearly-zero-energy building solutions in line with the EPBD-recase 201 O, Apr. 4, 2012, Energy and Bui ldings 56 (2013) 189-203. (Year: 2012).
Homer Energy, "Homer Grid: How Grid Calculates Demand Charge and Energy Bills Savings," URL: https://www.homerenergy.com/products/grid/docs/latest/how_grid_calculates_demand_charge_and_energy_bills_savings.html, retrieved Dec. 2020, 1 page.
Homer Energy, "Homer Grid: Solving Problems with Homer Software," URL:https://www.homerenergy.com/products/grid/docs/latest/solving_proglems_with_homer_software.html, retrieved Dec. 2019, 1 page.
Homer Energy, "Homer Grid: Welcome to Homer Grid," URL: https://www.homerenergy.com/products/grid/docs/latest/index.html, retrieved Dec. 2020, 1 page.
International Search Report and Written Opinion on PCT Appl. Ser. No. PCT/US2018/029625 dated Aug. 2, 2018 (15 pages).
Johnson Solid State LLC, "Building Automation Equipment," URL: http://cooljohnson.com/Video/Building_Automation/Confidential_Customer_BLD_2/Building_Automation_Equipment.mp4, retrieved form internet Oct. 27, 2022 (35 pages).
Johnson Solid State, LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Li et al., Zero energy buildings and sustainable development implications—A review, Aug. 28, 2012, Energy 54 (2013) 1-10. (Year: 2012).
Lu et al., Design optimization and optimal control of grid-connected and standalone nearly/net zero energy buildings, Apr. 21, 2015, Applied Energy 155 (2015) 463-477. (Year: 2015).
Pikas et al., "Cost optimal and nearly zero energy building solutions for office buildings", Aug. 27, 2013, Energy and Buildings 74 (2014) 30-42. (Year: 2013).
Rahmani-Andebili et al., "Energy Scheduling for a Smart Home Applying Stochastic Model Predictive Control," IEEE, 2016 (6 pages).
Zong et al., "Model Predictive Controller for Active Demand Side Management with PV Self-Consumption in an Intelligent Building," 3rd IEEE PES Innovative Smart Grid Technologies Europe (ISGT Europe), Berlin, 2012 (8 pages).
CoolingLogic, "CoolingLogic: Up early, saving billions," URL: http://coolinglogic.com/documents/Marketinglyer_FINAL_HiRes8.5x11.pdf, retreived from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan-Oakland-County-Michigan/Building-Automation-Divine-Grace.html, retrieved from internet Oct. 27, 2022 (3 pages).
Johnson Heating and Cooling L.L.C., "Excel Rehavilitation Building Automation," URL: http://cooljohnson.com/Building-Automation-Systems-Michigan/Waterford/Michigan/Buildling-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retreived from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://coojohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Buildling-Automation-Systems-Michigan/Detroit/Mosaic-Christian.html, retrieved from internet Oct. 27, 2022 (5 pages).
Johnson Heating and Cooling L.LC., "Shepherd's Gate Lutheran Church Building Automation," URL: http://cooljohnson.com/Building-Automation-Systems-Michigan/Shelby-Township-Michigan/Buildling-Automation-Systems-SG.html, retrieved from internet Oct. 27, 2022 (3 pages).
Johnson Heating and Cooling L.L.C., "St. Clair County Residence Building Automation," URL: http://coojohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from Internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Buildling-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Buildin-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

(56) References Cited

OTHER PUBLICATIONS

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943 filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 235-255).
Koehler et al., "Building Temperature Distributed Control via Explicit MPC and 'Trim and Respond' Methods," European Control Conference (ECC), Jul 17-19, 2013, Zurich, Switzerland (pp. 4334-4339).
Kwadzogah et al., "Model Predictive Control for HVAC Systems—A Review, 2013 IEEE International Conference on Automation Science and Engineering, Model Predictive Control for HVAC Systems —A Review," 2013 IEEE International Conference on Automation Science and Engineering (CASE), Madison, WI, United States, Aug. 17-20, 2013 (pp. 442-447).
McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behavior of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
StLuka et al., "Energy Management for Buildings and Microgrids," 2011 50th IEEE Conference on Decision and Control and Eurpean Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP)', Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildinqs," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).
JP Office Action on JP Appl. Ser. No. 2022-15566 dated Jul. 4, 2023 (32 pages).

\* cited by examiner

Ambient Temperature and Electricity Pricing Data

High-Level Optimization Result
(Without Airside Power Consumption Model)

High-Level Optimization Result
(With Airside Power Consumption Model)

Low-Level Airside Optimization Result

Low-Level Waterside Optimization Result

BUILDING HVAC SYSTEM WITH MULTI-LEVEL MODEL PREDICTIVE CONTROL

CROSS-REFERENCE TO RELATED PATENT APPLICATIONS

This application is a continuation-in-part of U.S. patent application Ser. No. 16/601,391 filed Oct. 14, 2019, which is a continuation of U.S. patent application Ser. No. 15/635,754 filed Jun. 28, 2017, now U.S. Pat. No. 10,564,612, which claims the benefit of and priority to U.S. Provisional Patent Application No. 62/357,338 filed Jun. 30, 2016. This application is also a continuation-in-part of U.S. patent application Ser. No. 16/601,385 filed Oct. 14, 2019, which is a continuation of U.S. patent application Ser. No. 15/199,910 filed Jun. 30, 2016. The entire disclosures of these patent applications are incorporated by reference herein.

BACKGROUND

The present disclosure relates generally to a model predictive control (MPC) system for a building heating, ventilation, and air conditioning (HVAC) system and/or a variable refrigerant flow (VRF) system including an outdoor subsystem and a plurality of indoor subsystems.

Commercial buildings consume approximately 20% of the total U.S. energy consumption and account for roughly $200 billion per year in primary energy expenditures. The Energy Information Administration projects that commercial floor space and primary energy consumption will continue to grow into the future. Average energy prices, on the other hand, are expected to remain relatively stable. Therefore, the amount spent on energy in commercial buildings will continue to increase significantly. Given the significance of these energy cost values and their projected growth, buildings have become a prime target for control strategies designed to reduce consumption or improve efficiency, particularly in the area of temperature control.

Many HVAC systems in commercial buildings and educational facilities use simple on/off and proportional-integral-derivative (PID) controllers for control of their equipment. They rely on temperature controllers whose only goal is to converge to the desired temperature set point and stay there, within some tolerance. However, a better goal is to minimize total energy consumption or minimize total energy cost. In a utility market with time-varying prices, there exists the potential for cost savings by temporally shifting heating or cooling loads using some form of energy storage. To achieve these savings, predictive optimization can be used with a model of the system to forecast the future load. Load shifting decreases the burden on power plants during peak hours, allowing them to operate more efficiently. Furthermore, chillers operate more efficiently at night when the cooling water temperature is lower.

MPC is a method of advanced process control that has been highly successful over the past two decades. MPC uses a model of the system that relates the inputs (control actions) to outputs (process measurements). The model is used to predict the process variables based on the actions taken by the controller over a period of time called the horizon. At each step, MPC solves an online optimization problem using this model to determine a sequence of control actions that achieve an objective such as minimizing tracking error or input usage while respecting process constraints such as equipment capacity and safety bounds. The first control action in the sequence is implemented and the optimization problem is solved again at the next step after new measurements are obtained. In economic MPC, the objective in the optimization problem is to minimize total cost.

Economically optimal control systems have not been deployed widely in the HVAC industry. One fundamental obstacle to the successful deployment of MPC in HVAC systems is the large number of building zones. To implement MPC in HVAC systems, it may be desirable to solve the optimization problem in a reasonably short time (e.g., on the order of a few minutes). Campus-wide implementations may contain hundreds of buildings and zones. A single, combined control system for these applications is impractical and undesirable since the resulting single optimization problem is too large to solve in real time.

Some energy cost optimization techniques focus primarily on the power used by the waterside equipment, such as chillers and pumps, in generating chilled water since they were the major contributors to the electricity costs. Such optimization techniques may neglect the costs associated with running airside equipment, which had been minor. With chillers and central plants becoming more efficient, the percentage of the total cost associated with operating fans in air handler units has increased. In some implementations, airside costs can account for as much as 30% of the total energy cost. Therefore, it would be desirable to include an airside power consumption model in the economic optimization problem to effectively manage the overall power consumption of the airside and waterside systems simultaneously.

SUMMARY

One implementation of the present disclosure is a heating, ventilation, or air conditioning (HVAC) system for a building. The HVAC system includes an airside system having a plurality of airside subsystems, a waterside system, a high-level model predictive controller (MPC), and a plurality of low-level airside MPCs. Each airside subsystem includes airside HVAC equipment configured to provide heating or cooling to the airside subsystem. The waterside system includes waterside HVAC equipment configured to produce thermal energy used by the airside system to provide the heating or cooling. The high-level MPC is configured to perform a high-level optimization to generate an optimal airside subsystem load profile for each of the plurality of airside subsystems. The optimal airside subsystem load profiles optimize a total energy cost of both airside power consumption by the airside system and waterside power consumption by the waterside system at each of a plurality of time steps in an optimization period. Each of the low-level airside MPCs corresponds to one of the airside subsystems and is configured to use the optimal airside subsystem load profile for the corresponding airside subsystem to operate the airside HVAC equipment of the corresponding airside subsystem.

In some embodiments, the airside subsystems represent separate buildings thermally decoupled from one another such that no direct heat exchange occurs between the airside subsystems.

In some embodiments, each airside subsystem load profile indicates a thermal energy allocation to one of the plurality of airside subsystems at each of the plurality of time steps. The high-level MPC can be configured to use an airside power consumption model to define the airside power consumption of each airside subsystem as a function of the thermal energy allocation to the airside subsystem.

In some embodiments, the high-level MPC is configured to generate an airside subsystem temperature model for each of the plurality of airside subsystems. Each airside subsystem temperature model can define a relationship between one of the airside subsystem load profiles and a temperature of the corresponding airside subsystem.

In some embodiments, the high-level MPC is configured to generate an optimal waterside demand profile for the waterside system. The system can include a low-level waterside model predictive controller configured to perform a low-level optimization to generate optimal waterside setpoints for the waterside system subject to a demand constraint based on the optimal waterside demand profile. The low-level waterside model predictive controller can be configured to use the optimal waterside setpoints to operate waterside HVAC equipment in the waterside system.

In some embodiments, the high-level MPC is configured to perform the high-level optimization by optimizing a high-level cost function which defines the total energy cost as a function of a waterside demand profile indicating a thermal energy production of the waterside system at each of the plurality of time steps in the optimization period. The high-level MPC can use a waterside demand model to define the waterside demand profile as a function of the plurality of airside subsystem load profiles.

In some embodiments, each of the low-level airside model predictive controllers is configured to perform a low-level optimization to generate optimal airside temperature setpoints for the corresponding airside subsystem using the optimal airside subsystem load profile for the corresponding airside subsystem. Each low-level airside MPC can use the optimal airside temperature setpoints for the corresponding airside subsystem to operate the airside HVAC equipment in the corresponding airside subsystem.

In some embodiments, each airside subsystem includes a plurality of building zones. The optimal airside temperature setpoints for each airside subsystem can include optimal airside temperature setpoints for each of the plurality of building zones in the airside subsystem.

In some embodiments, each of the low-level airside MPCs is configured to generate a zone load profile for each of the plurality of building zones in the corresponding airside subsystem. Each zone load profile can indicate a thermal energy allocation to one of the building zones at each of the plurality of time steps in the optimization period.

In some embodiments, each of the optimal airside subsystem load profiles includes at least one of optimal thermal energy load values for the corresponding airside subsystem at each of the plurality of time steps and optimal temperature values for the corresponding airside subsystem at each of the plurality of time steps.

Another implementation of the present disclosure is a method for optimizing energy cost in a building HVAC system. The building HVAC system includes a waterside system and an airside system having a plurality of airside subsystems. The method includes generating a high-level cost function defining the energy cost as a function of both a waterside power consumption of the waterside system and an airside power consumption of each airside subsystem at each of a plurality of time steps in an optimization period. The method includes performing a high-level optimization at a high-level model predictive controller (MPC) to generate an optimal airside subsystem load profile for each of the plurality of airside subsystems. The optimal airside subsystem load profiles optimize the energy cost. The method includes providing the optimal airside subsystem load profiles from the high-level MPC to a plurality of low-level airside MPCs. Each of the low-level airside MPCs corresponds to one of the plurality of airside subsystems. The method includes using the optimal airside subsystem load profiles at each of the low-level airside MPCs to operate airside HVAC equipment in the corresponding airside subsystem.

In some embodiments, the airside subsystems represent separate buildings thermally decoupled from one another such that no direct heat exchange occurs between the airside subsystems.

In some embodiments, each airside subsystem load profile indicates a thermal energy allocation to one of the plurality of airside subsystems at each of the plurality of time steps. The method can further include using an airside power consumption model to define the airside power consumption of each airside subsystem as a function of the thermal energy allocation to the airside subsystem.

In some embodiments, the method includes generating an airside subsystem temperature model for each of the plurality of airside subsystems. Each airside subsystem temperature model can define a relationship between one of the airside subsystem load profiles and a temperature of the corresponding airside subsystem.

In some embodiments, performing the high-level optimization includes generating an optimal waterside demand profile for the waterside system. The method can include providing the optimal waterside demand profile to a low-level waterside MPC, performing a low-level optimization at the low-level waterside MPC to generate optimal waterside setpoints for the waterside system subject to a demand constraint based on the optimal waterside demand profile, and using the optimal waterside setpoints to operate waterside HVAC equipment in the waterside system.

In some embodiments, the high-level cost function defines the energy cost as a function of a waterside demand profile indicating a thermal energy production of the waterside system at each of the plurality of time steps in the optimization period. The method can include using a waterside demand model to define the waterside demand profile as a function of the plurality of airside subsystem load profiles.

In some embodiments, the method includes performing a low-level optimization at each of the low-level airside MPCs to generate optimal airside temperature setpoints for the corresponding airside subsystem using the optimal airside subsystem load profile for the corresponding airside subsystem. The method can include using the optimal airside temperature setpoints for the corresponding airside subsystem to operate the airside HVAC equipment in the corresponding airside subsystem.

In some embodiments, each airside subsystem includes a plurality of building zones. Performing the low-level optimization can include generating optimal airside temperature setpoints for each of the plurality of building zones.

In some embodiments, performing the low-level optimization includes generating a zone load profile for each of the plurality of building zones. Each zone load profile can indicate a thermal energy allocation to one of the building zones at each of the plurality of time steps in the optimization period.

Another implementation of the present disclosure is a method for optimizing energy cost in a building HVAC system. The building HVAC system includes a waterside system and an airside system having a plurality of airside subsystems. The method includes generating a high-level cost function defining the energy cost as a function of both a waterside power consumption of the waterside system and an airside power consumption of each airside subsystem at each of a plurality of time steps in an optimization period. The method includes performing a high-level optimization at a high-level model predictive controller (MPC) to generate an optimal airside subsystem temperature profile for each of the plurality of airside subsystems. The optimal airside subsystem temperature profiles optimize the energy cost defined by the cost function. The method includes providing the optimal airside subsystem temperature profiles from the high-level MPC to a plurality of low-level airside MPCs. Each of the low-level airside MPCs corresponds to one of the plurality of airside subsystems. The method includes using the optimal airside subsystem temperature profiles at each of the low-level airside MPCs to operate airside HVAC equipment in the corresponding airside subsystems.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

One implementation of the present disclosure is a model predictive control system for optimizing energy cost in a variable refrigerant flow (VRF) system. The VRF system includes an outdoor subsystem and a plurality of indoor subsystems. The model predictive control system includes a high-level model predictive controller (MPC) and a plurality of low-level indoor MPCs. The high-level MPC is configured to perform a high-level optimization to generate an optimal indoor subsystem load profile for each of the plurality of indoor subsystems. The optimal indoor subsystem load profiles optimize the energy cost. Each of the low-level indoor MPCs corresponds to one of the indoor subsystems and is configured to perform a low-level optimization to generate optimal indoor setpoints for one or more indoor VRF units of the corresponding indoor subsystem using the optimal indoor subsystem load profile for the corresponding indoor subsystem. Each of the low-level indoor MPCs is configured to operate the indoor VRF units of the corresponding indoor subsystem using the optimal indoor setpoints.

In some embodiments, each of the optimal indoor subsystem load profiles includes a thermal energy allocation to one of the indoor subsystems at each of a plurality of time steps in an optimization period. In some embodiments, each low-level indoor MPC is configured to use the thermal energy allocation to the corresponding indoor subsystem as an optimization constraint when performing the low-level optimization.

In some embodiments, the optimal indoor setpoints include at least one of refrigerant flow setpoints for each of the indoor VRF units and temperature setpoints for one or more building zones controlled by the indoor VRF units.

In some embodiments, each indoor subsystem includes a plurality of building zones. Each of the low-level indoor MPCs can be configured to generate optimal indoor temperature setpoints for each of the plurality of building zones in the corresponding indoor subsystem.

In some embodiments, each indoor subsystem includes a plurality of indoor VRF units. Each of the low-level indoor MPCs can be configured to generate optimal refrigerant flow decisions for each of the plurality of indoor VRF units in the corresponding indoor subsystem and use the optimal refrigerant flow decisions to calculate at least one of flow setpoints, temperature setpoints, and valve setpoints for each of the plurality of indoor VRF units.

In some embodiments, each of the low-level indoor MPCs is configured to identify a relationship between thermal energy load and refrigerant flow for each of the indoor VRF units in the corresponding indoor subsystem. Each of the low-level indoor MPCs can use the identified relationships between thermal energy load and refrigerant flow to generate the optimal refrigerant flow decisions for each of the indoor VRF units in the corresponding indoor subsystem.

In some embodiments, the high-level MPC is configured to generate predicted temperature profiles for each indoor subsystem resulting from the optimal indoor subsystem load profiles. In some embodiments, the low-level indoor MPCs are configured to generate the optimal indoor setpoints by minimizing an error between indoor subsystem temperatures and the predicted temperature profiles.

In some embodiments, each of the indoor subsystems represents a separate building thermally decoupled from one another such that no direct heat exchange occurs between the indoor subsystems.

In some embodiments, the high-level MPC is configured to generate an optimal outdoor unit demand profile for the outdoor subsystem. The system can include a low-level outdoor MPC configured to perform a low-level optimization to generate optimal outdoor setpoints for one or more outdoor VRF units of the outdoor subsystem subject to a demand constraint based on the optimal outdoor unit demand profile. The low-level outdoor MPC can be configured to use the optimal outdoor setpoints to operate the outdoor VRF units.

In some embodiments, the high-level MPC is configured to determine an optimal thermal energy allocation to each of the plurality of indoor subsystems at each of a plurality of time steps in an optimization period and an optimal thermal energy or refrigerant state allocation of the outdoor subsystem at each of the plurality of time steps in the optimization period.

Another implementation of the present disclosure is a method for optimizing energy cost in a variable refrigerant flow (VRF) system. The VRF system includes an outdoor subsystem and a plurality of indoor subsystems. The method includes performing a high-level optimization at a high-level model predictive controller (MPC) to generate an optimal indoor subsystem load profile for each of the plurality of indoor subsystems. The optimal indoor subsystem load profiles optimize the energy cost. The method includes providing the optimal indoor subsystem load profiles from the high-level MPC to a plurality of low-level indoor MPCs. Each of the low-level indoor MPCs corresponds to one of the plurality of indoor subsystems. The method includes performing a low-level optimization at each of the low-level indoor MPCs to generate optimal indoor setpoints for one or more indoor VRF units of the corresponding indoor subsystem using the optimal indoor subsystem load profile for the corresponding indoor subsystem. The method includes using the optimal indoor setpoints to operate the indoor VRF units in each of the plurality of indoor subsystems.

In some embodiments, each of the optimal indoor subsystem load profiles includes a thermal energy allocation to one of the indoor subsystems at each of a plurality of time steps in an optimization period. In some embodiments, performing the low-level optimization includes using the thermal energy allocation to the corresponding indoor subsystem as an optimization constraint.

In some embodiments, the optimal indoor setpoints include at least one of refrigerant flow setpoints for each of the indoor VRF units and temperature setpoints for one or more building zones controlled by the indoor VRF units.

In some embodiments, each indoor subsystem includes a plurality of building zones. Performing the low-level optimization can include generating optimal indoor temperature setpoints for each of the plurality of building zones in the corresponding indoor subsystem.

In some embodiments, each indoor subsystem includes a plurality of indoor VRF units. Performing the low-level optimization can include generating optimal refrigerant flow decisions for each of the plurality of indoor VRF units in the corresponding indoor subsystem and using the optimal refrigerant flow decisions to calculate at least one of flow setpoints, temperature setpoints, and valve setpoints for each of the plurality of indoor VRF units.

In some embodiments, performing the low-level optimization includes identifying a relationship between thermal energy load and refrigerant flow for each of the indoor VRF units in the corresponding indoor subsystem and using the identified relationships between thermal energy load and refrigerant flow to generate the optimal refrigerant flow decisions for each of the indoor VRF units in the corresponding indoor subsystem.

In some embodiments, performing the high-level optimization includes generating predicted temperature profiles for each indoor subsystem resulting from the optimal indoor subsystem load profiles. In some embodiments, performing the low-level optimization includes generating the optimal indoor setpoints by minimizing an error between indoor subsystem temperatures and the predicted temperature profiles.

In some embodiments, performing the high-level optimization includes generating an optimal outdoor unit demand profile for the outdoor subsystem. The method can further include performing a low-level optimization at a low-level outdoor model predictive controller to generate optimal outdoor setpoints for one or more outdoor VRF units of the outdoor subsystem subject to a demand constraint based on the optimal outdoor unit demand profile. The method can further include using the optimal outdoor setpoints to operate the outdoor VRF units.

In some embodiments, performing the high-level optimization includes determining an optimal thermal energy allocation to each of the plurality of indoor subsystems at each of a plurality of time steps in an optimization period and an optimal thermal energy or refrigerant state allocation of the outdoor subsystem at each of the plurality of time steps in the optimization period.

Another implementation of the present disclosure is a variable refrigerant flow (VRF) system. The VRF system includes a plurality of indoor subsystems, an outdoor subsystem, a high-level model predictive controller (MPC), and a plurality of low-level indoor MPCs. Each indoor subsystem includes one or more indoor VRF units. The outdoor subsystem includes one or more outdoor VRF units. The high-level MPC is configured to perform a high-level optimization to generate an optimal indoor subsystem load profile for each of the plurality of indoor subsystems. The optimal indoor subsystem load profiles optimize energy cost. Each low-level indoor MPC corresponds to one of the indoor subsystems and is configured to perform a low-level optimization to generate optimal indoor setpoints for the indoor VRF units of the corresponding indoor subsystem using the optimal indoor subsystem load profile for the corresponding indoor subsystem.

Another implementation of the present disclosure is a heating, ventilation, or air conditioning (HVAC) system for a building. The HVAC system includes HVAC equipment configured to provide heating or cooling to one or more building spaces and one or more controllers. The one or more controllers include one or more processing circuits configured to generate energy targets for the one or more building spaces using a thermal capacitance of the one or more building spaces to which the heating or cooling is provided by the HVAC equipment, generate setpoints for the HVAC equipment using the energy targets for the one or more building spaces to which the heating or cooling is provided by the HVAC equipment, and operate the HVAC equipment using the setpoints to provide the heating or cooling to the one or more building spaces.

In some embodiments, the one or more controllers are configured to generate the energy targets using a heat transfer model defining a relationship between the energy targets for the one or more building spaces, a temperature of the one or more building spaces predicted to result from the energy targets for the one or more building spaces, and the thermal capacitance of the one or more building spaces to which the heating or cooling is provided by the HVAC equipment.

In some embodiments, the energy targets include amounts of thermal energy to be added to the one or more building spaces or removed from the one or more building spaces by the HVAC equipment at each of a plurality of time steps in a time period. In some embodiments, the one or more controllers are configured to use the amounts of thermal energy to be added or removed by the HVAC equipment as a constraint when generating the setpoints for the HVAC equipment.

In some embodiments, the HVAC equipment include one or more indoor variable refrigerant flow (VRF) units and the setpoints include at least one of refrigerant flow setpoints for the one or more indoor VRF units or temperature setpoints for the one or more building spaces to which the heating or cooling is provided by the one or more indoor VRF units.

In some embodiments, the one or more controllers are configured to generate the energy targets using an airside power consumption model defining a relationship between the energy targets for the one or more building spaces and airside power consumption predicted to result from the energy targets for the one or more building spaces.

In some embodiments, the one or more controllers are configured to generate temperature profiles for the one or more building spaces predicted to result from the energy targets and generate the setpoints for the HVAC equipment such that the HVAC equipment operate to drive actual temperatures of the one or more building spaces toward the temperature profiles.

In some embodiments, the one or more building spaces include a plurality of building spaces and the HVAC equipment include a plurality of HVAC subsystems, HVAC subsystem corresponding to a building space of the plurality of building spaces and configured to provide heating or cooling to the corresponding building space. In some embodiments, the one or more controllers are configured to generate a plurality of energy targets, each energy target corresponding to a HVAC subsystem of the plurality of HVAC subsystems and generated based on a thermal capacitance of the building space to which the heating or cooling is provided by the corresponding HVAC subsystem.

In some embodiments, the plurality of HVAC subsystems and the plurality of building spaces are located in separate buildings thermally decoupled from one another such that no direct heat exchange occurs between building spaces served by separate HVAC subsystems.

In some embodiments, the HVAC equipment include one or more airside units configured to provide the heating or cooling to the one or more building spaces using a heated or chilled fluid provided as an input to the one or more airside units and at least one of an outdoor variable refrigerant flow (VRF) unit or a waterside system configured to provide the heated or chilled fluid to the one or more airside units.

In some embodiments, the one or more controllers are configured to generate the energy targets for the one or more building spaces by determining an amount of thermal energy to be delivered to each of the one or more airside units at each of a plurality of time steps in a time period and an amount of thermal energy to be produced by at least one of the outdoor VRF unit or the waterside system at each of the plurality of time steps in the time period.

Another implementation of the present disclosure is a method for operating a heating, ventilation, or air conditioning (HVAC) system for a building. The method includes generating energy targets for one or more building spaces using a thermal capacitance of the one or more building spaces, generating setpoints for HVAC equipment that provide heating or cooling to the one or more building spaces using the energy targets for the one or more building spaces, and operating the HVAC equipment using the setpoints to provide the heating or cooling to the one or more building spaces.

In some embodiments, the energy targets are generated using a heat transfer model defining a relationship between the energy targets for the one or more building spaces, a temperature of the one or more building spaces predicted to result from the energy targets for the one or more building spaces, and the thermal capacitance of the one or more building spaces to which the heating or cooling is provided by the HVAC equipment.

In some embodiments, the energy targets include amounts of thermal energy to be added to the one or more building spaces or removed from the one or more building spaces by the HVAC equipment at each of a plurality of time steps in a time period. In some embodiments, the amounts of thermal energy to be added or removed by the HVAC equipment are used as a constraint when generating the setpoints for the HVAC equipment.

In some embodiments, the HVAC equipment include one or more indoor variable refrigerant flow (VRF) units and the setpoints include at least one of refrigerant flow setpoints for the one or more indoor VRF units or temperature setpoints for the one or more building spaces to which the heating or cooling is provided by the one or more indoor VRF units.

In some embodiments, the energy targets are generated using an airside power consumption model defining a relationship between the energy targets for the one or more building spaces and airside power consumption predicted to result from the energy targets for the one or more building spaces.

In some embodiments, the method includes generating temperature profiles for the one or more building spaces predicted to result from the energy targets and generating the setpoints for the HVAC equipment such that the HVAC equipment operate to drive actual temperatures of the one or more building spaces toward the temperature profiles.

In some embodiments, the one or more building spaces comprise a plurality of building spaces. In some embodiments, the HVAC equipment comprise a plurality of HVAC subsystems, each HVAC subsystem corresponding to a building space of the plurality of building spaces and configured to provide heating or cooling to the corresponding building space. In some embodiments, the energy targets comprise a plurality of energy targets, each energy target corresponding to a HVAC subsystem of the plurality of HVAC subsystems and generated based on a thermal capacitance of the building space to which the heating or cooling is provided by the corresponding HVAC subsystem.

In some embodiments, the HVAC equipment include one or more airside units configured to provide the heating or cooling to the one or more building spaces using a heated or chilled fluid provided as an input to the one or more airside units and at least one of an outdoor variable refrigerant flow (VRF) unit or a waterside system configured to provide the heated or chilled fluid to the one or more airside units.

Another implementation of the present disclosure is or more non-transitory computer-readable media storing instructions that, when executed by one or more processors, cause the one or more processors to perform operations including generating energy targets for one or more building spaces using a thermal capacitance of the one or more building spaces, generating setpoints for HVAC equipment that provide heating or cooling to the one or more building spaces using the energy targets for the one or more building spaces, and operating the HVAC equipment using the setpoints to provide the heating or cooling to the one or more building spaces.

In some embodiments, the energy targets are generated using a heat transfer model defining a relationship between the energy targets for the one or more building spaces, a temperature of the one or more building spaces predicted to result from the energy targets for the one or more building spaces, and the thermal capacitance of the one or more building spaces to which the heating or cooling is provided by the HVAC equipment.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1A:
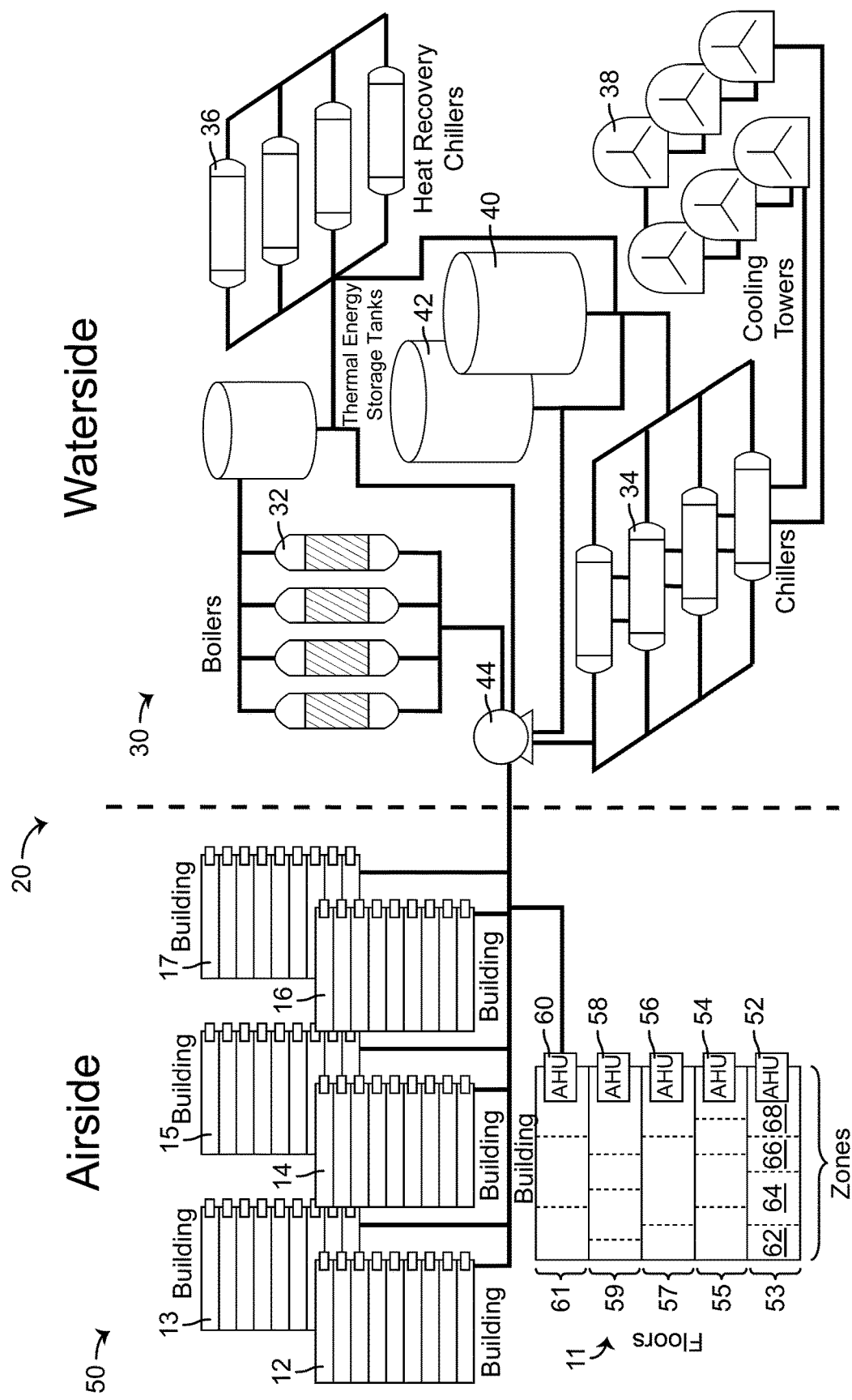
FIG. 1A is a schematic diagram of a waterside system and an airside system with multiple airside subsystems, according to some embodiments.

Referring generally to FIGS. 1A-15, heating, ventilation, and air conditioning (HVAC) system for a building is shown, according to some embodiments. The HVAC system includes a waterside system and an airside system having a plurality of airside subsystems. The HVAC system uses model predictive control (MPC) system to generate optimal setpoints for HVAC equipment of the waterside system and each of the airside subsystems.

MPC is a control technique that uses a model of a controlled system to relate system inputs (e.g., control actions, setpoints, etc.) to system states and system outputs (e.g., measurements, process variables, etc.). The model can be used to predict the system states and system outputs based on the actions taken by a controller at each time step during an optimization period. At each time step, MPC solves an online optimization problem using the system model to determine a sequence of control actions that achieve an objective (e.g., minimizing tracking error, minimizing energy cost, etc.) while respecting process constraints such as equipment capacity and safety bounds (e.g., temperature constraints, equipment switching constraints, etc.). The first control action in the sequence is implemented and the optimization problem is solved again at the next time step after new measurements are obtained.

The HVAC system described herein can optimize (e.g., minimize) the total cost of energy used to provide heating and/or cooling to a building or campus. Numerous studies have shown that MPC outperforms existing control systems due to its ability to forecast into the future and anticipate events before they occur. MPC enables shifting of the energy load from peak hours to off-peak hours by using the mass of the building for passive thermal energy storage (TES). Active thermal energy storage (e.g., chilled water tanks, hot water tanks, etc.) can also be used to further facilitate load shifting. Through a combination of active and passive storage systems, energy costs can be decreased by concentrating equipment usage to times of low resource prices, all while maintaining comfort limits within each building.

In some embodiments, the HVAC system includes a MPC layer and a regulatory layer. The MPC layer can receive measurements from the regulatory layer and provide setpoints to the regulatory layer. The MPC layer can generate optimal values for various decision variables including, for example, zone temperature setpoints, equipment on/off decisions, and TES charging/discharging rates. The MPC layer can determine the optimal values of the decision variables using system models such a zone temperature to cooling/heating duty model, a cooling/heating duty to temperature setpoint model, equipment models, and active TES models. The MPC layer can determine the optimal values of the decision variables by performing an optimization process subject to several constraints. The constraints can include comfort bounds on the zone air temperatures, equipment capacity constraints, TES tank size, and rate of change bounds on the equipment of the regulatory layer.

Solving a single MPC problem to determine the optimal values for all of the decision variables can be difficult for large-scale applications. For example, some airside systems can include thousands of discrete zones and some waterside systems can include thousands of unique HVAC devices. The discrete decisions (e.g., turning equipment on/off) can result in a mixed integer optimization problem, which further increases complexity. Due to the difficulty and computational complexity of the MPC problem, the MPC layer can decompose the overall MPC problem into smaller, more manageable, optimization problems.

The HVAC system can decompose the overall MPC problem into a high-level optimization problem and a low-level optimization problem. The high-level problem can be solved by a high-level model predictive controller to determine a load profile for each of a plurality of low-level airside subsystem and a demand profile for a waterside system. In some embodiments, the high-level controller uses active TES models and aggregate low-level models for each airside subsystem to reduce computational complexity. The high-level controller can determine load profiles that optimize (e.g., minimize) the total operational cost of the MPC system over the optimization period. Each load profile can include a load value for each time step in the optimization period. The high-level controller can provide the load profiles to a plurality of low-level airside model-predictive controllers. The low-level airside controllers can use the load profiles as constraints defining maximum permissible load values for each airside subsystem for each time step in the optimization period.

The low-level optimization problem can be further decomposed into a low-level waterside optimization problem and one or more low-level airside optimization problems. Each low-level airside problem can be solved by one of low-level airside controllers to determine zone temperature setpoints for the airside equipment of each airside subsystem. Each low-level airside controller can determine the zone temperature setpoints that optimize (e.g., minimize) the energy consumption of the corresponding airside subsystem while maintaining zone temperatures within defined temperature limits and without exceeding the load values provided by the high-level controller. Alternatively, each low-level airside controller can determine temperature setpoints that track the average building temperatures (e.g., predicted building temperature states) from the high-level optimization problem. These and other components of the HVAC system are described in greater detail below.

Building and Campus HVAC Systems

Figure 1B:
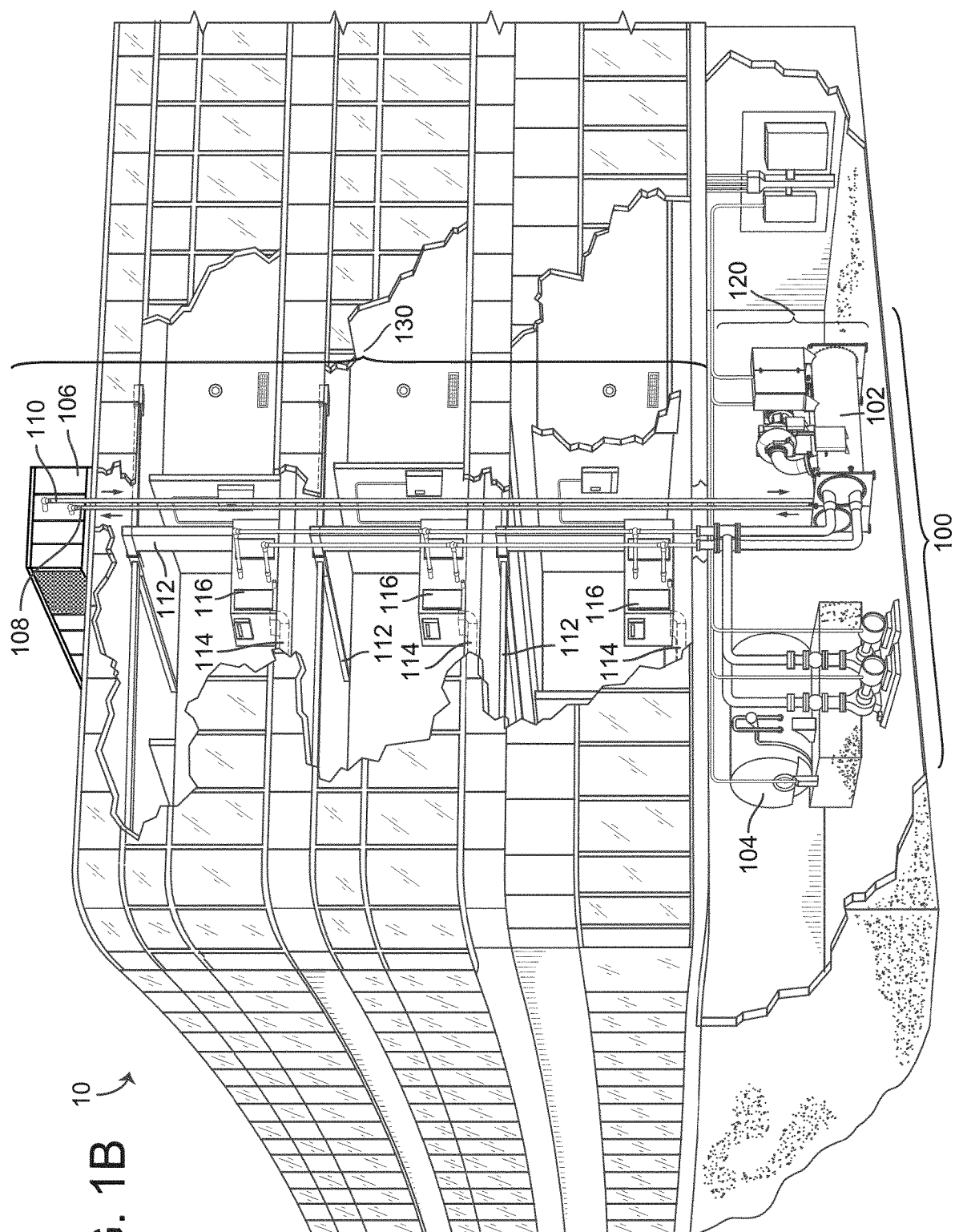
FIG. 1B is a drawing of a building equipped with a HVAC system having an airside system and a waterside system, according to some embodiments.

Referring now to FIGS. 1A-1B, embodiments of a heating, ventilation, and air conditioning (HVAC) system for a building or campus (i.e., a collection of buildings) are shown. FIG. 1A is a schematic diagram of a large-scale HVAC system 20 including a waterside system 30 and an airside system 50. Waterside system 30 is shown as a central plant having boilers 32, chillers 34, heat recovery chillers 36, cooling towers 38, a cold thermal energy storage (TES) tank 40, a hot TES tank 42, and a pump 44. The equipment of waterside system 30 can operate to heat or chill a working fluid (e.g., water, glycol, etc.) and provide the working fluid to airside system 50. Airside system 50 can use the heated fluid or chilled fluid from waterside system 30 to heat or cool airflows provided to various building zones. Examples of a waterside system and airside system which can be used in HVAC system 20 are described in greater detail with reference to FIGS. 2-3.

In the campus-wide implementation shown in FIG. 1A, airside system 50 can be distributed across multiple buildings 11-17. Airside system 50 can include multiple air handling units (AHUs) distributed across buildings 11-17. In some embodiments, the AHUs are rooftop AHUs located on the rooftops of buildings 11-17. In other embodiments, the AHUs can be distributed across multiple floors or zones of buildings 11-17. Each of buildings 11-17 can include one or more AHUs. For example, building 11 is shown to include a first AHU 52 located on the first floor 53, a second AHU 54 located on the second floor 55, a third AHU 56 located on the third floor 57, a fourth AHU 58 located on the fourth floor 59, and a fifth AHU 60 located on the fifth floor 61.

Each AHU of airside system 50 can receive the heated fluid and/or the chilled fluid from waterside system 30 and can use such fluids to provide heating or cooling for various building zones. Each AHU can be configured to provide airflow to a single building zone or multiple building zones. For example, AHU 52 can be configured to provide airflow to building zones 62, 64, 66, and 68. In a large scale HVAC system such as HVAC system 20, airside system 50 can include a large number of buildings (e.g., tens, hundreds, etc.) with each building having multiple AHUs and a large number of building zones. Each building zone can be controlled independently (e.g., via dampers or variable air volume (VAV) units) and can have different temperature setpoints. In some embodiments, the control objective for HVAC system 20 is to determine the appropriate temperature setpoints for all of the building zones and to operate the equipment of waterside system 30 and airside system 50 to meet the corresponding load.

Referring now to FIG. 1B, a perspective view of a building 10 is shown. Building 10 is served by a HVAC system 100 which operates on a relatively smaller scale than HVAC system 20. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop AHU 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1B) or at an offsite location such as a central plant (as shown in FIG. 1A). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Waterside System

Figure 2:
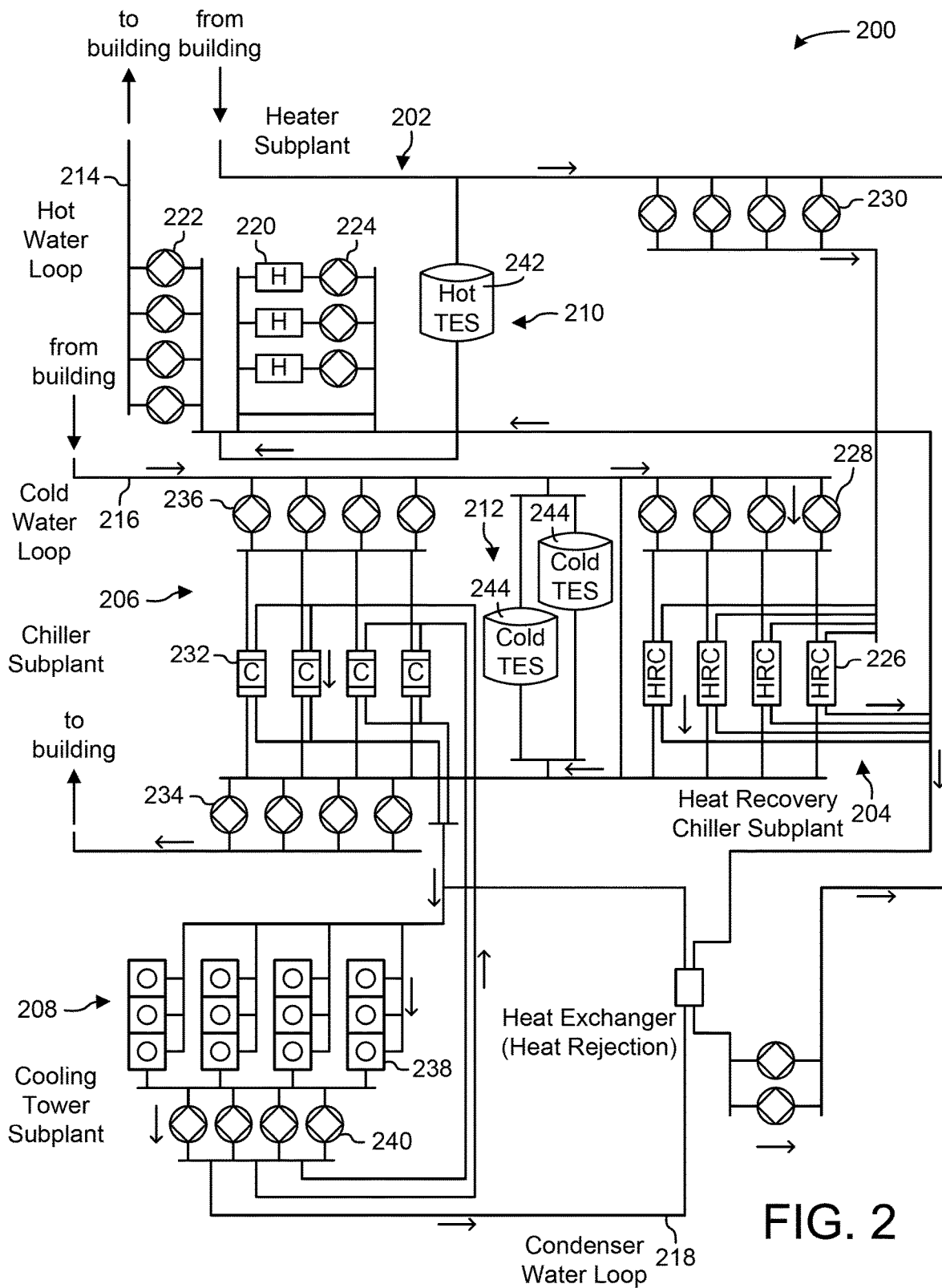
FIG. 2 is a schematic diagram of a waterside system which can be used in the systems of FIGS. 1A-1B, according to some embodiments.

Referring now to FIG. 2, a block diagram of a waterside system 200 is shown, according to some embodiments. In some embodiments, waterside system 200 can supplement or replace waterside system 30 in HVAC system 20 or waterside system 120 in HVAC system 100. Waterside system 200 can include some or all of the HVAC devices in HVAC system 20 (e.g., boilers 32, chillers 34, heat recovery chillers 36, etc.) or HVAC system 100 (e.g., boiler 104, chiller 102, pumps, valves, etc.) and can operate to supply a heated or chilled fluid to airside system 50 or airside system 130. The HVAC devices of waterside system 200 can be located within building 10 (as shown in FIG. 1B) or at an offsite location such as a central plant (as shown in FIG. 1A).

Waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and buildings 10-17. Chiller subplant 206 can be configured to chill water in a cold water loop 216 that circulates the cold water between chiller subplant 206 buildings 10-17. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to AHUs located on the rooftop of building 10 (as shown in FIG. 1B) or to individual floors or zones of buildings 11-17 (as shown in FIG. 1A). The AHUs push air past heat exchangers (e.g., heating coils or cooling coils) through which the water flows to provide heating or cooling for the air. The heated or cooled air can be delivered to individual zones of buildings 10-17 to serve the thermal energy loads of buildings 10-17. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Figure 3:
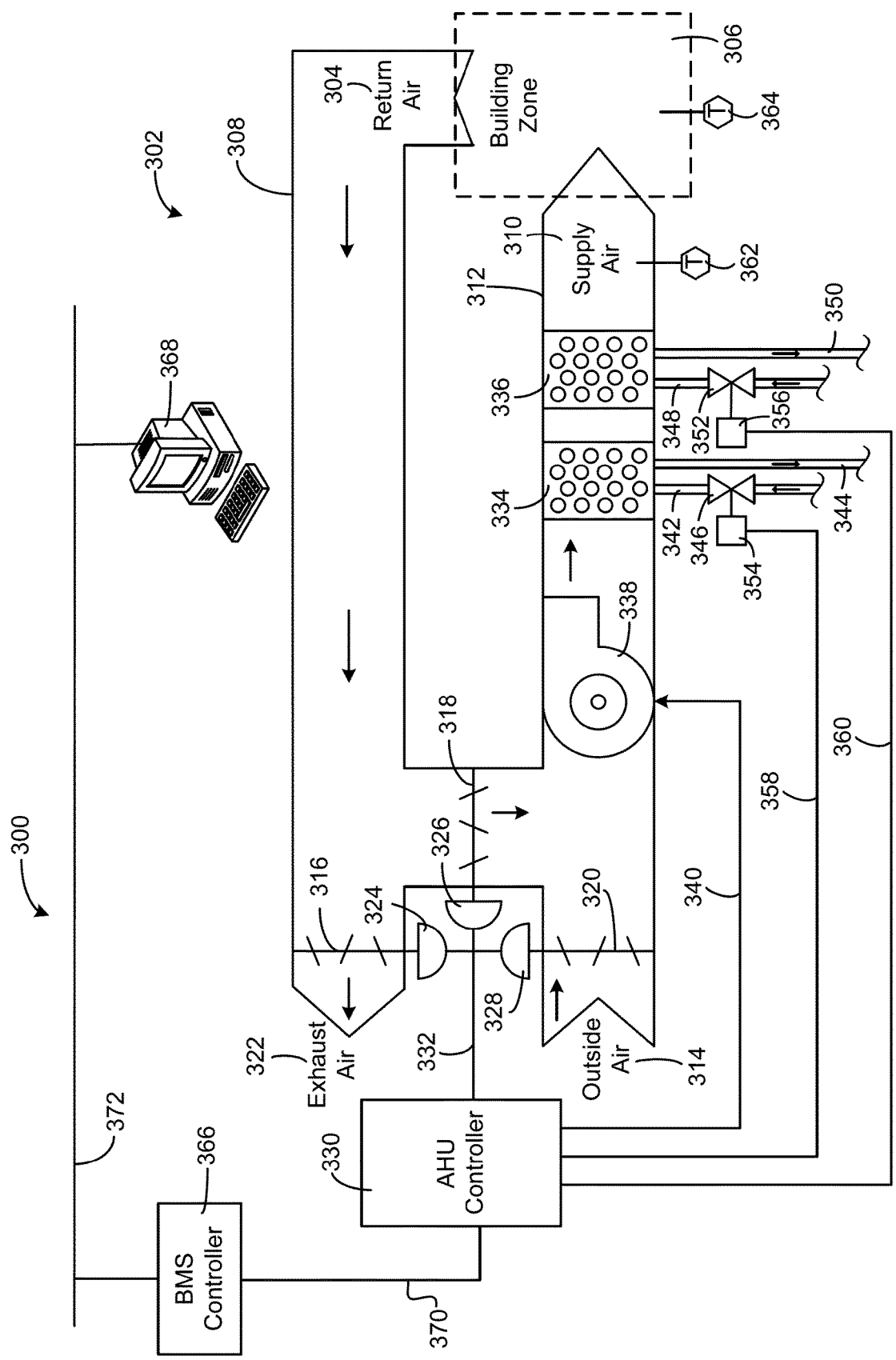
FIG. 3 is a block diagram of an airside system which can be used in the systems of FIGS. 1A-1B, according to some embodiments.

Referring now to FIG. 3, a block diagram of an airside system 300 is shown, according to some embodiments. In some embodiments, airside system 300 can supplement or replace airside system 50 in HVAC system 20 or airside system 130 in HVAC system 100. Airside system 300 can include some or all of the HVAC devices in HVAC system 20 (e.g., AHUs 52-60) or HVAC system 100 (e.g., AHU 106, VAV units 116, ducts 112-114, fans, dampers, etc.) and can be located in or around buildings 10-17. Airside system 300 can operate to heat or cool an airflow provided to buildings 10-17 using a heated or chilled fluid provided by waterside systems 200.

Airside system 300 is shown to include an economizer-type AHU 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1B) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, HVAC system 20 and/or other controllable systems that serve buildings 10-17. BMS controller 366 can communicate with multiple downstream building systems or subsystems (e.g., HVAC systems 20 or 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 20, HVAC system 100, and/or the various devices thereof. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management Systems

Figure 4:
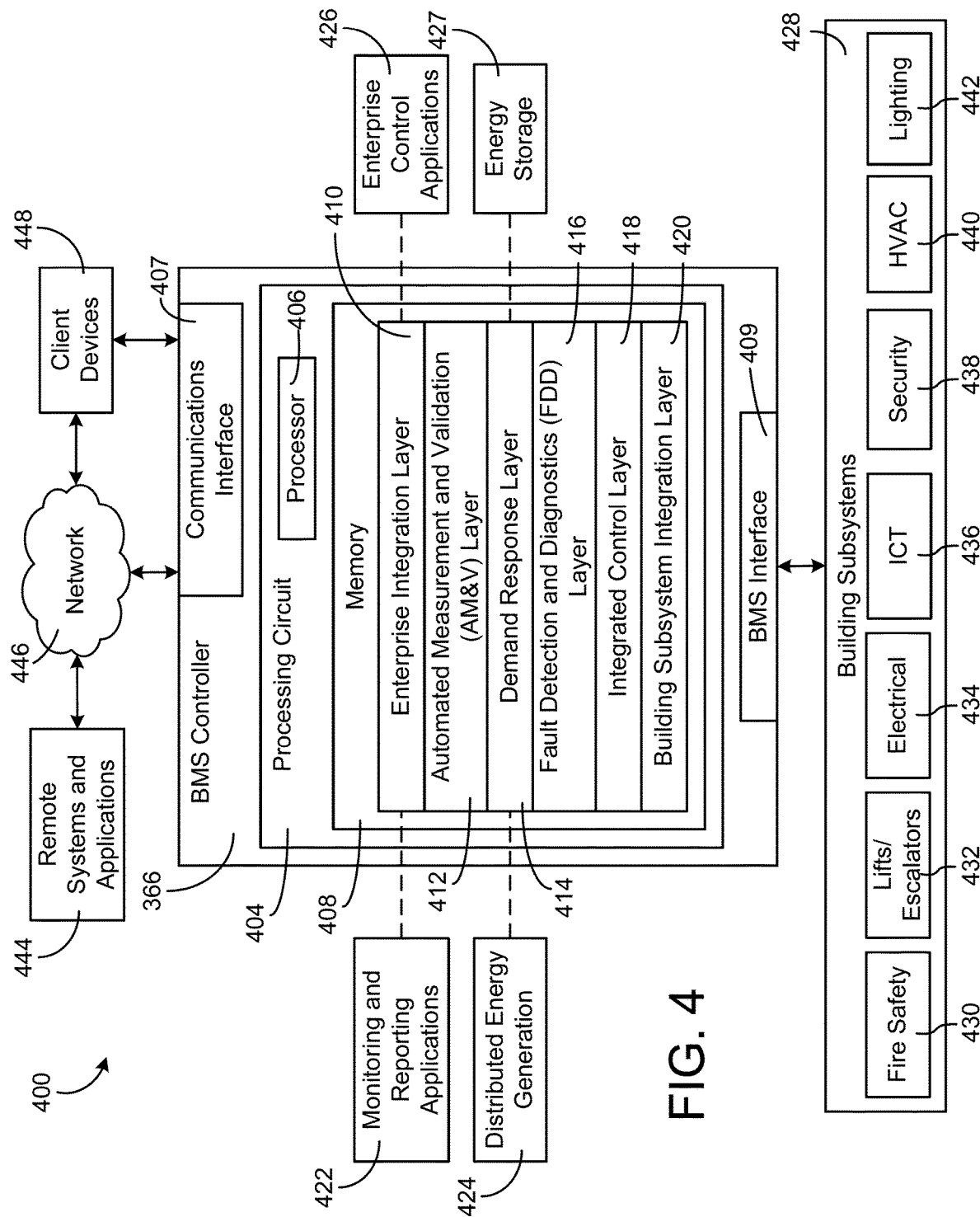
FIG. 4 is a block diagram of a building management system (BMS) which can be used to monitor and control the building of FIG. 1B, according to some embodiments.

Referring now to FIG. 4, a block diagram of a building management system (BMS) 400 is shown, according to an exemplary embodiment. BMS 400 can be implemented in one or more of buildings 10-17 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control buildings 10-17. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 20 or HVAC system 100, as described with reference to FIGS. 1A-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within buildings 10-17. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of buildings 10-17. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
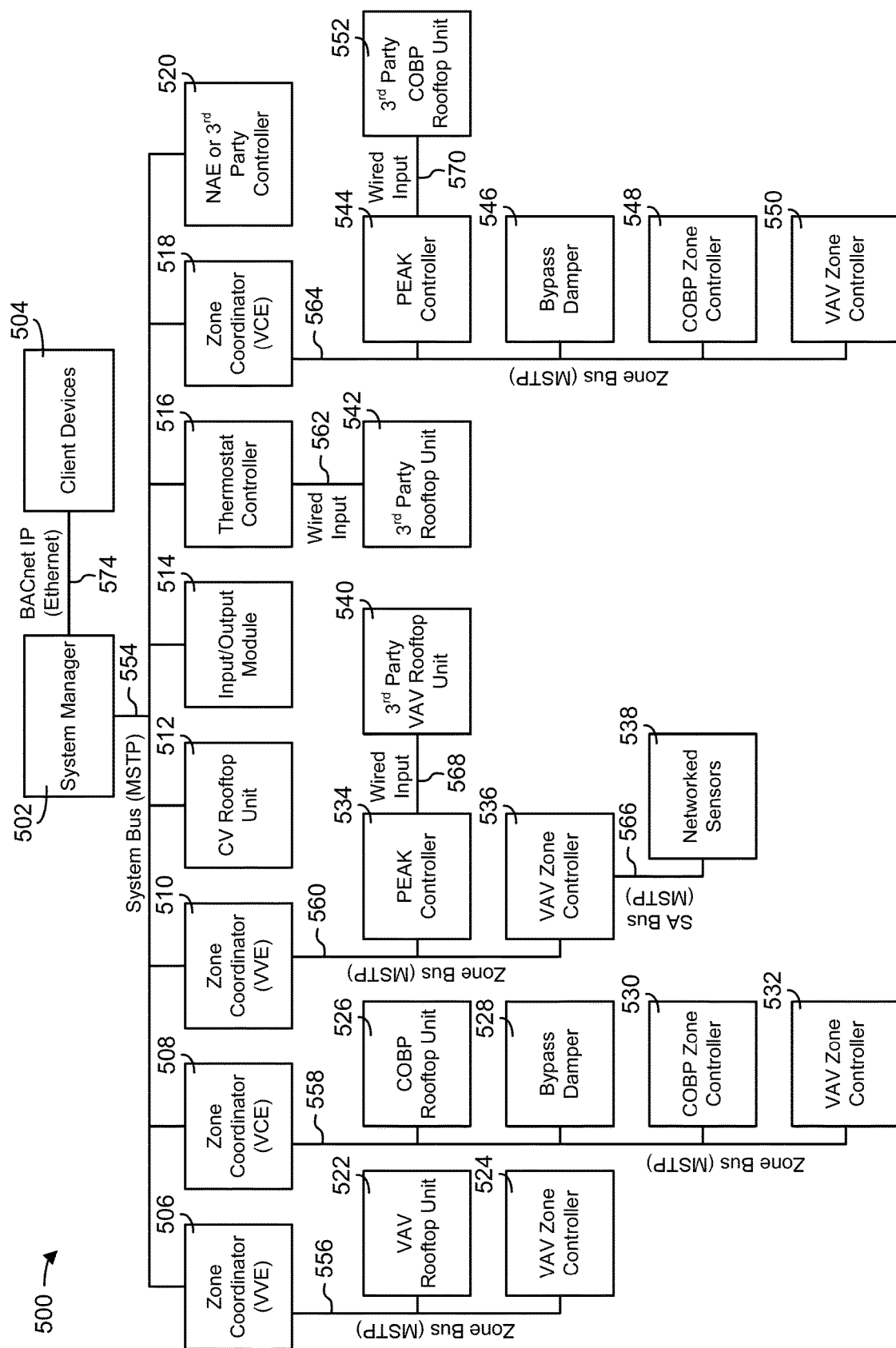
FIG. 5 is a block diagram of another BMS which can be used to monitor and control the building of FIG. 1B, according to some embodiments.

Referring now to FIG. 5, a block diagram of another building management system (BMS) 500 is shown, according to some embodiments. BMS 500 can be implemented in one or more of buildings 10-17 and used to monitor and control the devices of HVAC systems 20 and 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control algorithms, feedback control algorithms, etc.) to control a variable state or condition (e.g., temperature, humidity, airflow, lighting, etc.) in or around building 10.

Distributed Model Predictive Control System

Figure 6:
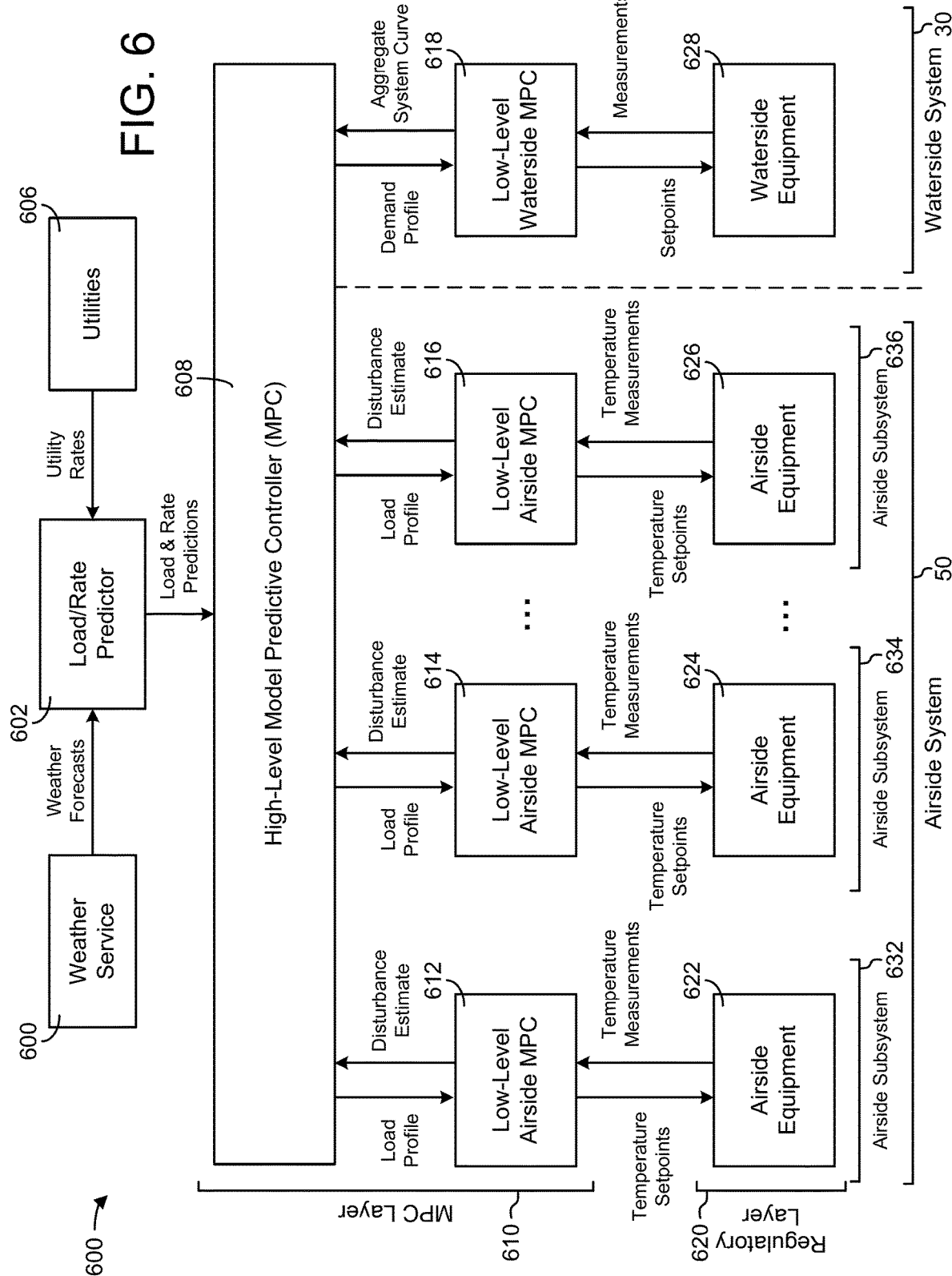
FIG. 6 is a block diagram of a distributed model predictive control system with a high-level model-predictive controller, several low-level airside model predictive controllers, and a low-level waterside model predictive controller, according to some embodiments.

Referring now to FIG. 6, a block diagram of a distributed model predictive control (MPC) system 600 is shown, according to some embodiments. MPC system 600 uses a MPC technique to determine optimal setpoints for the equipment of an airside system and a waterside system over a time horizon. MPC system 600 can be used in combination with HVAC system 20, waterside system 20, airside system 50, HVAC system 100, waterside system 120, airside system 130, waterside system 200, airside system 300, BMS 400, and/or BMS 500, as described with reference to FIGS. 1A-5. For example, MPC system 600 can determine optimal temperature setpoints for the airside equipment 622-626 of airside system 50 and/or airside system 300. Similarly, MPC system 600 can determine optimal setpoints for the waterside equipment 628 of waterside system 30 and/or waterside system 200.

MPC is a control technique that uses a model of a controlled system to relate system inputs (e.g., control actions, setpoints, etc.) to system states and system outputs (e.g., measurements, process variables, etc.). The model can be used to predict the system states and system outputs based on the actions taken by a controller at each time step during an optimization period. At each time step, MPC solves an online optimization problem using the system model to determine a sequence of control actions that achieve an objective (e.g., minimizing tracking error, minimizing energy cost, etc.) while respecting process constraints such as equipment capacity and safety bounds (e.g., temperature constraints, equipment switching constraints, etc.). The first control action in the sequence is implemented and the optimization problem is solved again at the next time step after new measurements are obtained.

In economic MPC, the objective in the optimization problem is often to minimize total cost, as defined by a cost function. Numerous studies have shown that MPC outperforms existing control systems due to its ability to forecast into the future and anticipate events before they occur. MPC enables shifting of the energy load from peak hours to off-peak hours by using the mass of the building for passive thermal energy storage (TES). Active thermal energy storage (e.g., chilled water tanks, hot water tanks, etc.) can also be used to further facilitate load shifting. Through a combination of active and passive storage systems, energy costs can be decreased by concentrating equipment usage to times of low resource prices, all while maintaining comfort limits within each building.

Still referring to FIG. 6, distributed MPC system 600 is shown to include a MPC layer 610 and a regulatory layer 620. MPC layer 610 is shown to include a high-level model predictive controller 608 and several low-level model predictive controllers 612-618. Controllers 612, 614, and 616 are shown as low-level airside model predictive controllers, whereas controller 618 is shown as a low-level waterside model predictive controller. MPC layer 610 can be configured to determine and provide optimal temperature setpoints and equipment operating setpoints to the equipment of regulatory layer 620. In some embodiments, MPC layer 610 can be retrofit to any existing BMS to provide setpoint optimization for the airside equipment and waterside equipment of the BMS.

Regulatory layer 620 is shown to include airside equipment 622-626 and waterside equipment 628. Airside equipment 622-626 can include some or all of the equipment of airside system 50, airside system 130, and/or airside system 300, as described with reference to FIGS. 1A-1B and FIG. 3. Waterside equipment 628 can include some or all of the equipment of waterside system 30, waterside system 120, and/or waterside system 200, as described with reference to FIGS. 1A-2. In some embodiments, regulatory layer 620 includes some or all of the equipment of BMS 400 and/or BMS 500, as described with reference to FIGS. 4-5. For example, regulatory layer 620 can include PID controllers, operable equipment (e.g., chillers, boilers, air handling units, etc.), and/or other systems or devices configured to control a process variable to a setpoint.

In some embodiments, distributed MPC system 600 includes a load/rate predictor 602. Load/rate predictor 602 can provide MPC layer 610 with load and rate predictions including, for example, disturbance forecasts, electricity prices, demand charge prices, and outside air temperatures. Load/rate predictor 602 is shown receiving weather forecasts from a weather service 604. In some embodiments, load/rate predictor 602 generates the disturbance forecasts as a function of the weather forecasts. In some embodiments, load/rate predictor 602 uses feedback from regulatory layer 620 to generate the disturbance forecasts. Feedback from regulatory layer 620 can include various types of sensory inputs (e.g., temperature, flow, humidity, enthalpy, etc.) or other data relating to the controlled building or campus (e.g., building occupancy data, building electric load, etc.). In some embodiments, load/rate predictor 602 generates a disturbance forecast including a predicted disturbance value for each time step within the optimization period.

In some embodiments, load/rate predictor 602 uses a deterministic plus stochastic model trained from historical load data to generate the disturbance forecast. Load/rate predictor 602 can use any of a variety of prediction methods to generate the disturbance forecast (e.g., linear regression for the deterministic portion and an autoregressive model for the stochastic portion). Load/rate predictor 602 can predict one or more different types of disturbances for the building or campus. For example, load/rate predictor 602 can predict a thermal load resulting from heat transfer between the air within a building and the outside air through the walls of the building. Load/rate predictor 602 can predict a thermal load resulting from internal heat generation within the building (e.g., heat generated by electronics in the building, heat generated by building occupants, etc.). In some embodiments, load/rate predictor 602 makes load/rate predictions using the techniques described in U.S. patent application Ser. No. 14/717,593, titled "Building Management System for Forecasting Time Series Values of Building Variables" and filed May 20, 2015, the entire disclosure of which is incorporated by reference herein.

Load/rate predictor 602 is shown receiving utility rates from utilities 606. Utility rates can indicate a cost or price per unit of a resource (e.g., electricity, natural gas, water, etc.) provided by utilities 606 at each time step in the optimization period. In some embodiments, the utility rates are time-variable rates. For example, the price of electricity can be higher at certain times of day or days of the week (e.g., during high demand periods) and lower at other times of day or days of the week (e.g., during low demand periods). The utility rates can define various time periods and a cost per unit of a resource during each time period. Utility rates can be actual rates received from utilities 606 or predicted utility rates estimated by load/rate predictor 602.

In some embodiments, the utility rates include demand charges for one or more resources provided by utilities 606. A demand charge can define a separate cost imposed by utilities 606 based on the maximum usage of a particular resource (e.g., maximum energy consumption) during a demand charge period. The utility rates can define various demand charge periods and one or more demand charges associated with each demand charge period. In some instances, demand charge periods can overlap partially or completely with each other and/or with the optimization period. Advantageously, MPC layer 610 can account for demand charges in the high-level optimization process performed by high-level model predictive controller 608. Utilities 606 can be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 602 can store the predicted loads and the utility rates in memory and/or provide the predicted loads and the utility rates to high-level MPC 608.

MPC layer 610 can receive measurements from regulatory layer 620 and provide setpoints to regulatory layer 620. MPC layer 610 can generate optimal values for various decision variables including, for example, zone temperature setpoints, equipment on/off decisions, and TES charging/discharging rates. MPC layer 610 can determine the optimal values of the decision variables using system models such a zone temperature to cooling/heating duty model, a cooling/heating duty to temperature setpoint model, equipment models, and active TES models. MPC layer 610 can determine the optimal values of the decision variables by performing an optimization process subject to several constraints. The constraints can include comfort bounds on the zone air temperatures, equipment capacity constraints, TES tank size, and rate of change bounds on the equipment of regulatory layer 620.

As discussed above, solving a single MPC problem to determine the optimal values of the decision variables can be difficult for large-scale applications. For example, airside system 50 can include thousands of discrete zones and waterside system 30 can include thousands of unique HVAC devices. The discrete decisions (e.g., turning equipment on/off) can result in a mixed integer optimization problem, which further increases complexity. Due to the difficulty and computational complexity of the MPC problem, MPC layer 610 can decompose the overall MPC problem into smaller, more manageable, optimization problems.

As shown in FIG. 6, distributed MPC system 600 can decompose the overall MPC problem into a high-level optimization problem and a low-level optimization problem. The high-level problem can be solved by high-level controller 608 to determine a load profile for each low-level airside subsystem 632-636 and a demand profile for waterside system 30. In some embodiments, high-level controller 608 uses active TES models and aggregate low-level models for each airside subsystem 632-636 to reduce computational complexity. High-level controller 608 can determine load profiles that optimize (e.g., minimize) the total operational cost of MPC system 600 over the optimization period. Each load profile can include a load value for each time step in the optimization period. Low-level airside controllers 612-616 can use the load profiles as constraints defining maximum permissible load values for each airside subsystem 632-636 for each time step in the optimization period. High-level controller 608 can provide the load profiles to each of the low-level airside controller 612-616. The high-level optimization performed by high-level controller 608 is described in greater detail with reference to FIG. 7.

The low-level optimization problem can be further decomposed into a low-level waterside optimization problem and one or more low-level airside optimization problems. Each low-level airside problem can be solved by one of low-level airside controllers 612-616 to determine zone temperature setpoints for the airside equipment 622-626 of each airside subsystem 632-636. Each low-level airside controller 612-616 can determine the zone temperature setpoints that optimize (e.g., minimize) the energy consumption of the corresponding airside subsystem 632-636 while maintaining zone temperatures within defined temperature limits and without exceeding the load values provided by high-level controller 608. Alternatively, each low-level airside controller 612-616 can determine temperature setpoints that track the average building temperatures (e.g., predicted building temperature states) from the high-level optimization problem. The low-level optimization performed by low-level controllers 612-616 is described in greater detail with reference to FIG. 8.

The low-level waterside problem can be solved by low-level waterside controller 618. In some embodiments, the low-level waterside problem is a mixed-integer linear program. Low-level waterside controller 618 can determine optimal setpoints for waterside equipment 628 that minimize operating cost while meeting the demand profile from high-level controller 608. Decision variables optimized by low-level waterside controller 618 can include, for example, equipment on/off states, thermal loads for chillers, flow rates for pumps, setpoints for other auxiliary waterside equipment, and TES charge/discharge rates. Low-level waterside controller 618 can use the demand profile from high-level controller 608 as an input specifying the overall demand to be met by waterside system 30 at each time step of the optimization period.

In some embodiments, low-level waterside controller 628 decomposes the low-level waterside optimization problem into a first waterside optimization problem and a second waterside optimization problem. The first waterside optimization problem can allocate the demand specified by high-level controller 608 across multiple subplants of the waterside system (e.g., heater subplant 202, heat recovery chiller subplant 204, chiller subplant 206, cooling tower subplant 208, hot TES subplant 210, and cold TES subplant 212). The second waterside optimization problem can be decomposed into a mixed-integer optimization problem for each subplant to determine optimal equipment on/off states and equipment setpoints for waterside equipment 628. An example of a waterside optimization technique which can be used by low-level waterside controller 628 is described in detail in U.S. patent application Ser. No. 14/634,609 filed Feb. 27, 2015, the entire disclosure of which is incorporated by reference herein.

As shown in FIG. 6, each low-level airside model predictive controller 612-616 can control a subsystem 632-636 of the entire airside system 50. Each low-level airside controller 612-616 can perform a separate airside optimization process to determine optimal temperature setpoints for the airside equipment 622-626 of the corresponding airside subsystem 632-636. Each airside subsystem 632-636 (e.g., each building) can include multiple AHUs, each of which can be configured to deliver air to multiple building zones. Accordingly, each airside system 632-636 can include many building zones.

In some embodiments, high-level controller 608 uses an aggregate model of each airside subsystem 632-636 and allocates a thermal energy load to each airside subsystem 632-636. Low-level airside controllers 612-626 can use more detailed zone-level models during the low-level optimization processes to determine the optimal temperature setpoints for each building zone of the corresponding airside subsystem. Decomposing airside system 50 into separate airside subsystems 632-636 can improve computational performance and substantially decrease the amount of time required to solve the low-level MPC problems. For example, all of the low-level MPC problems can be solved within a few minutes.

In some embodiments, each airside subsystem 632-636 represents a separate building. Significant coupling between airside subsystems 632-636 (e.g., heat exchange between subsystems 632-636) can affect performance since low-level controllers 612-616 are not required to coordinate their solutions. One way to decompose airside system 50 to guarantee that there is no coupling between subsystems 632-636 is to decompose by building since separate buildings do not exchange heat with one another. For this reason, it may be desirable to select airside subsystems 632-636 so that each airside subsystem 632-636 represents a separate building. In other embodiments, each airside subsystem 632-636 can represent a single building zone, a collection of zones within a building, or even multiple buildings.

In MPC system 600, high-level model predictive controller 608 determines the thermal energy loads to allocate to each airside subsystem 632-636 (e.g., each building) and the demand profile for waterside system 30. Each airside subsystem 632-636 can include a separate low-level airside controller 612-616 that computes the temperature setpoints for each zone in that airside subsystem 632-636 (e.g., each zone in the building). If each low-level airside subsystem 632-636 represents a separate building the low-level airside problem can be solved in a distributed manner since there is no heat transfer between the separate buildings. The low-level airside problem can be easily extended to handle large industrial and campus-wide implementations without increasing computational complexity.

Distributed MPC system 600 provides several advantages over alternative control strategies. For example, high-level controller 608 can coordinate operation low-level airside subsystems 632-636 via the load profiles provided to each low-level controller 612-616. By including a demand charge in the high-level objective function, high-level controller 608 can generate load profiles which stager the operation of low-level airside subsystems 632-636. In other words, high-level controller 608 can generate load profiles which ensure that low-level airside subsystems 632-636 do not all consume power at the same time. This allows high-level controller 608 to coordinate operation of low-level airside subsystems 632-636 and account for the demand charge without requiring communication between low-level airside controllers 612-616. The coupling caused by the presence of a single waterside system 30 for all airside subsystems 632-636 is also addressed by high-level controller 608. Hence, the low-level control problems are completely decoupled such that iterations and communication between low-level controllers 612-616 are not required.

Data communication between MPC layer 610 and regulatory layer 620 can also be greatly reduced. For example, data communication between MPC layer 610 and regulatory layer 620 can be limited to measurements and setpoints, as shown in FIG. 6. This allows MPC system 600 to be integrated with any existing BMS. High level controller 608 can use aggregate models of each airside subsystem 632-636 and waterside system 30 to reduce computational complexity during the high-level optimization. Each low-level airside controller 612-616 can provide high-level controller 608 with an aggregate disturbance estimate, an aggregate building temperature, and aggregate system parameters (e.g., thermal capacitance, heat transfer coefficient, etc.) for the corresponding airside subsystem 632-636.

Distributed MPC system 600 can be used to control a variety of different systems including, for example, a chiller plant, air handling units, rooftop units, variable refrigerant flow systems, airside systems, waterside systems, building management systems, and/or other types of systems for which power consumption or thermal energy loads can be allocated to different subsystems. Most building temperature regulation methods do not consider detailed models of waterside equipment 628 or integer decision variables, which decreases the fidelity of energy cost calculations. However, MPC system 600 can include integer variables in the waterside optimization problem to determine when to turn equipment on and off rather than relying on heuristics. Active TES can also be used in the waterside optimization problem, which allows for the greatest potential for load shifting and cost savings. However, MPC system 600 can still be applied generally, whether or not active TES is available.

High-Level Model Predictive Controller

Figure 7:
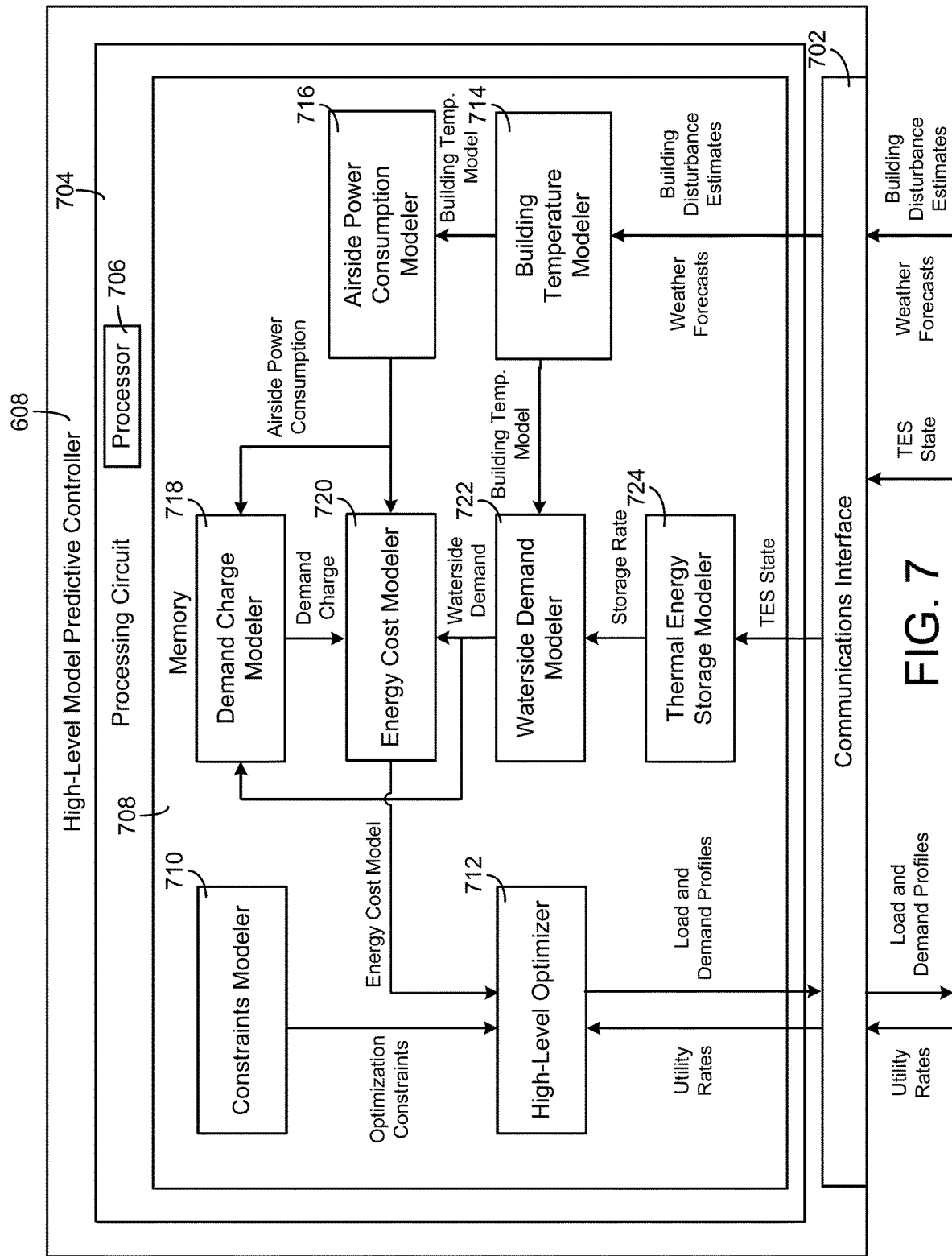
FIG. 7 is a block diagram illustrating the high-level model predictive controller of FIG. 6 in greater detail, according to some embodiments.

Referring now to FIG. 7, a block diagram illustrating high-level model predictive controller (MPC) 608 in greater detail is shown, according to some embodiments. High-level MPC 608 is shown a communications interface 702 and a processing circuit 704. Communications interface 702 can include wired or wireless interfaces (e.g., jacks, antennas, transmitters, receivers, transceivers, wire terminals, etc.) for conducting data communications with various systems, devices, or networks. For example, communications interface 702 can include an Ethernet card and port for sending and receiving data via an Ethernet-based communications network and/or a WiFi transceiver for communicating via a wireless communications network. Communications interface 702 can be configured to communicate via local area networks or wide area networks (e.g., the Internet, a building WAN, etc.) and may use a variety of communications protocols (e.g., BACnet, IP, LON, etc.).

Communications interface 702 can be a network interface configured to facilitate electronic data communications between high-level MPC 608 and various external systems or devices (e.g., weather service 604, utilities 606, low-level controllers 612-618, BMS equipment, etc.). For example, high-level MPC 608 can receive weather forecasts from weather service 604, utility rates from utilities 606, and/or load and rate predictions from load/rate predictor 602. High-level MPC 608 can receive measurements from the BMS indicating one or more measured states of the controlled building or campus (e.g., temperature, humidity, electric loads, etc.) and one or more states of waterside system 30 (e.g., equipment status, power consumption, equipment availability, etc.). In some embodiments, high-level MPC 608 receives a measurement of the TES state from waterside system 30, which indicates the current fill level of the TES tanks.

High-level MPC 608 can receive building disturbance estimates from each low-level airside controller 612-616. The building disturbance estimates can indicate an estimated thermal energy load for each airside subsystem 632-636. High-level MPC 608 can receive aggregate system curves, aggregate building parameters, and/or coefficients of performance from each low-level controller 612-618. High-level MPC 608 can use the information received at communications interface 702 to generate load profiles for each low-level airside subsystem 632-636 and a demand profile for waterside system 30. High-level MPC 608 can provide the load profiles and the demand profile to low-level controllers 612-618.

Processing circuit 704 is shown to include a processor 706 and memory 708. Processor 706 can be a general purpose or specific purpose processor, an application specific integrated circuit (ASIC), one or more field programmable gate arrays (FPGAs), a group of processing components, or other suitable processing components. Processor 706 can be configured to execute computer code or instructions stored in memory 708 or received from other computer readable media (e.g., CDROM, network storage, a remote server, etc.).

Memory 708 can include one or more devices (e.g., memory units, memory devices, storage devices, etc.) for storing data and/or computer code for completing and/or facilitating the various processes described in the present disclosure. Memory 708 can include random access memory (RAM), read-only memory (ROM), hard drive storage, temporary storage, non-volatile memory, flash memory, optical memory, or any other suitable memory for storing software objects and/or computer instructions. Memory 708 can include database components, object code components, script components, or any other type of information structure for supporting the various activities and information structures described in the present disclosure. Memory 708 can be communicably connected to processor 706 via processing circuit 704 and can include computer code for executing (e.g., by processor 706) one or more processes described herein. When processor 706 executes instructions stored in memory 708, processor 706 generally configures high-level MPC 608 (and more particularly processing circuit 704) to complete such activities.

Still referring to FIG. 7, high-level MPC 608 is shown to include a building temperature modeler 714. Building temperature modeler 714 can generate a temperature model for each airside subsystem 632-636. The temperature models generated by building temperature modeler 714 are referred to as building temperature models under the assumption that each airside subsystem 632-636 represents a separate building. However, the temperature models generated by building temperature modeler 714 can be temperature models for other types of subsystems if airside subsystems 632-636 represent other types of spaces. Building temperature modeler 714 can generate a temperature model for each building. Although only three airside subsystems 632-636 are shown in FIG. 6, it should be understood that any number of buildings and airside subsystems 632-636 may be present. In general, building temperature modeler 714 can generate $n_b$ building temperature models, where $n_b$ is the total number of buildings and/or airside subsystems 632-636.

In some embodiments, building temperature modeler 714 models the temperature of each building using a building heat transfer model. The dynamics of heating or cooling a single building zone are described by the energy balance:

$$C\frac{dT}{dt} = -H(T - T_a) - \dot{Q}_c + \dot{Q}_{other}$$

where C is the thermal capacitance of the building zone, H is the ambient heat transfer coefficient for the building zone, T is the temperature of the building zone, $T_a$ is the ambient temperature outside the building zone (e.g., the outside air temperature), $\dot{Q}_c$ is the amount of cooling applied to the building zone (i.e., the cooling load), and $\dot{Q}_{other}$ is the external load, radiation, or other disturbance experienced by the building zone. In the previous equation, $\dot{Q}_c$ represents heat transfer out of the building zone (i.e., cooling) by the HVAC system and therefore has a negative sign. However, if heating is applied to the building zone rather than cooling, the sign on $\dot{Q}_c$ can be switched to a positive sign such that $\dot{Q}_c$ represents the amount of heating applied to the building zone by the HVAC system (i.e., the heating load).

The previous equation combines all mass and air properties of the building zone into a single zone temperature. Other heat transfer models which can be used by building temperature modeler 714 include the following air and mass zone models:

$$C_z\frac{dT_z}{dt} = H_{az}(T_a - T_z) + H_{mz}(T_m - T_z) - \dot{Q}_c + \dot{Q}_{other}$$

$$C_m\frac{dT_m}{dt} = H_{mz}(T_z - T_m)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by building temperature modeler 714 include the following air, shallow mass, and deep mass zone models:

$$C_Z\frac{dT_z}{dt} = H_{az}(T_a - T_z) + H_{sz}(T_s - T_z) - \dot{Q}_c + \dot{Q}_{other}$$

$$C_s\frac{dT_s}{dt} = H_{sz}(T_z - T_s) + H_{ds}(T_d - T_s)$$

$$C_d\frac{dT_d}{dt} = H_{ds}(T_s - T_d)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, building temperature modeler 714 models the temperature of each building using the following building temperature model:

$$C_b\frac{dT_b}{dt} = -H_b(T_b - T_a) - \dot{Q}_{c,b} + \dot{Q}_{other,b}$$

where $C_b$ and $T_b$ are the thermal capacitance and temperature of the building designated by building index b, $T_a$ is the ambient air temperature outside building b (e.g., outside air temperature), $H_b$ is the heat transfer coefficient between building b and the ambient air, $\dot{Q}_{c,b}$ is the amount of cooling applied to the building by MPC system 600 (i.e., the amount of heat removed from the building), and $\dot{Q}_{other,b}$ is the external load, radiation, or disturbance experienced by building b. If heating is provided to the building rather than cooling, the sign on $\dot{Q}_{c,b}$ can be switched from a negative sign to a positive sign.

Building temperature modeler 714 can use the building disturbance estimates received from low-level airside controllers 612-616 to identify appropriate values of the external disturbance $\dot{Q}_{other,b}$ for each building b at each time step of the optimization period. In some embodiments, building temperature modeler 714 uses the weather forecasts from weather service 604 and/or the load and rate predictions provided by load/rate predictor 602 to determine appropriate values for the ambient air temperature $T_a$ and/or the external disturbance $\dot{Q}_{other,b}$ for each building b at each time step of the optimization period. Values of $C_b$ and $H_b$ can be specified as parameters of the building b, received from the low-level airside controller for the building b, received from a user, retrieved from memory 708, or otherwise provided to building temperature modeler 714. Building temperature modeler 714 can generate a building temperature model for each building b, where b=1 . . . $n_b$ and $n_b$ is the total number of buildings.

Still referring to FIG. 7, high-level MPC 608 is shown to include a thermal energy storage (TES) modeler 724. TES modeler 724 can generate a model for the active thermal energy storage provided by TES tanks 42 and 40. In some embodiments, TES modeler 724 uses the following equation to model the active thermal energy storage:

$$\frac{ds}{dt} = -\sigma s + \dot{Q}_{storage}$$

where s is the amount of thermal energy (e.g., heating or cooling potential) stored in a given TES tank, $\sigma$ is the decay constant for the TES tank, and $\dot{Q}_{storage}$ is the rate at which thermal energy is stored in the TES tank. TES modeler 724 can generate an active TES model for each TES tank.

High level MPC 608 is shown to include a waterside demand modeler 722. Waterside demand modeler 722 can generate a model representing the demand on waterside system 30 as a function of the thermal energy load $\dot{Q}_{c,b}$ allocated to each building b and the amount of thermal energy storage $\dot{Q}_{storage}$ at each time step of the optimization period. In some embodiments, waterside demand modeler 722 uses the following equation to model waterside demand:

$$\dot{Q}_{HVAC,k} = \sum_{b=1}^{b_n} \dot{Q}_{c,b,k} + \dot{Q}_{storage,k}$$

where $\dot{Q}_{HVAC,k}$ is the waterside demand at time step k (e.g., the thermal energy production of waterside system 30 at time step k), $\dot{Q}_{c,b,k}$ is the thermal energy load allocated to building b at time step k, and $\dot{Q}_{storage,k}$ is the amount of thermal energy being stored in the TES tanks during time step k. The previous equation indicates that the total demand $\dot{Q}_{HVAC,k}$ on the waterside system 30 is a summation of the thermal energy loads $\dot{Q}_{c,b,k}$ allocated to each building b and the thermal energy $\dot{Q}_{storage,k}$ being stored in the TES tanks. This equation can be used by high level MPC 608 as an energy balance constraint to ensure that waterside system 30 generates enough thermal energy to cover the building loads and the thermal energy storage at each time step k.

High level MPC 608 is shown to include a constraints modeler 710. Constraints modeler 710 can generate and impose optimization constraints on the optimization procedure performed by high-level optimizer 712. Constraints imposed by constraints modeler 710 can include, for example, equipment capacity constraints and building temperature constraints. In some embodiments, constraints modeler 710 imposes the following constraint:

$$\dot{Q}_{HVAC,k} \leq \dot{Q}_{HVAC,max}$$

to ensure that the waterside demand $\dot{Q}_{HVAC,k}$ at each time step k is less than or equal to the maximum capacity $\dot{Q}_{HVAC,max}$ of waterside system 30. Similarly, constraints modeler 710 can impose the following constraint:

$$0 \leq s_k \leq s_{max}$$

to ensure that the amount of thermal energy stored in the TES tanks at any time step k is between the minimum possible level of the TES tanks (i.e., zero) and the maximum possible level of the TES tanks (i.e., $s_{max}$).

In some embodiments, constraints modeler 710 imposes constraints on the building temperature $T_b$. For example, constraints modeler 710 can constrain the building temperature $T_b$ between a minimum temperature $T_{min}$ and a maximum temperature $T_{max}$ as shown in the following equation:

$$T_{min} \leq T_b \leq T_{max}$$

where the values of $T_{min}$ and $T_{max}$ can be adjusted based on the temperature setpoints of the building. In some embodiments, constraints modeler 710 automatically adjusts the values of $T_{min}$ and $T_{max}$ based on information received from the low-level airside controller and/or BMS for the building. For example, constraints modeler 710 can use a temperature setpoint schedule and/or occupancy schedule for the building to automatically adjust the values of $T_{min}$ and $T_{max}$ for each time step k. This allows constraints modeler 710 to use temperature limits based on the time-varying setpoint temperature range for the building so that the building temperature $T_b$ is maintained within time-appropriate temperature limits $T_{min}$ and $T_{max}$.

Still referring to FIG. 7, high-level MPC 608 is shown to include an energy cost modeler 720 and a demand charge modeler 718. Energy cost modeler 720 can generate an energy cost model representing the cost of energy consumed by MPC system 600. The cost of energy can include both a per-unit cost of energy resources (e.g., electricity, water, natural gas, etc.) consumed by MPC system 600 during the optimization period and a demand charge based on the maximum power consumption. The demand charge component of the energy cost model can be modeled by demand charge modeler 718 and enforced via demand charge constraints. In some embodiments, the energy cost model accounts for only the energy resources consumed by waterside system 30. In other embodiments, the energy cost model also accounts for the power consumption of airside system 50, which can be modeled by airside power consumption modeler 716. Examples of both scenarios are described below.

Example 1: Energy Cost Model without Airside Power Consumption

In some embodiments, energy cost modeler 720 generates an energy cost model that accounts for the energy consumption of waterside system 30 without including airside power consumption. For example, energy cost modeler 720 can model total energy cost during the optimization period using the following equation:

$$\sum_{k=0}^{N-1} c_k \eta_{tot} \dot{Q}_{HVAC,k} \Delta + c_{peak} \eta_{tot} \dot{Q}_{peak}$$

The first term of the energy cost model accounts for the per unit costs (e.g., $/kWh) of energy consumed during each time step k of the optimization period. In some embodiments, $c_k$ is the cost per unit of energy consumed at time step k to satisfy the total waterside demand $\dot{Q}_{HVAC,k}$ at time step k, the parameter $\eta_{tot}$ is the inverse of the coefficient of performance of the aggregate airside/waterside system (e.g., $0.1 \leq \eta_{tot} \leq 0.25$), and $\Delta$ is the duration of time step k. Accordingly, the term $\eta_{tot}\dot{Q}_{HVAC,k}\Delta$ represents the total amount of energy consumed (e.g., kWh) during time step k to satisfy the waterside demand $\dot{Q}_{HVAC,k}$. Multiplying by the cost $c_k$ per unit energy consumed (e.g., \$/kWh) yields the total cost (e.g., \$) of the energy consumed during time step k. The energy cost model can include a summation of the energy costs during each time step k to determine the total cost of energy consumption over the optimization period.

The second term of the energy cost model accounts for the demand charge. In some embodiments, $c_{peak}$ is the demand charge rate (e.g., \$/kW), $\dot{Q}_{peak}$ is the peak waterside demand during the demand charge period (e.g., the maximum of $\dot{Q}_{HVAC,k}$), and $\eta_{tot}$ is the inverse of the coefficient of performance of the aggregate airside/waterside system. Accordingly, the term $\eta_{tot}\dot{Q}_{peak}$ represents the peak power consumption to satisfy the peak waterside demand $\dot{Q}_{peak}$. Multiplying by the demand charge rate $c_{peak}$ yields the total cost (e.g., \$) of the demand charge.

In some embodiments, demand charge modeler 718 generates demand charge constraints to ensure that $\dot{Q}_{peak}$ has the appropriate value. If the demand charge period is contained entirely within the optimization period (e.g., between time steps k=0 and k=N−1), then the appropriate value of $\dot{Q}_{peak}$ is simply the maximum of $\dot{Q}_{HVAC,k}$ during the optimization period. Demand charge modeler 718 can implement the following demand charge constraint:

$$0 \leq \dot{Q}_{HVAC,k} \leq \dot{Q}_{peak}$$

to ensure that the peak waterside demand $\dot{Q}_{peak}$ is always greater than or equal to the waterside demand $\dot{Q}_{HVAC,k}$ at each time step. This forces the peak waterside demand $\dot{Q}_{peak}$ to be at least as large as the maximum waterside demand during the optimization period.

If the demand charge period begins before the optimization period, it is possible that the maximum value of $\dot{Q}_{HVAC,k}$ during the demand charge period occurred prior to the beginning of the optimization period. Demand charge modeler 718 can implement the following demand charge constraint:

$$\dot{Q}_{peak,past} \leq \dot{Q}_{peak}$$

to ensure that the peak waterside demand $\dot{Q}_{peak}$ is always greater than or equal to the maximum waterside demand $\dot{Q}_{peak,past}$ that occurred during the same demand charge period, even if the maximum waterside demand occurred prior to the beginning of the current optimization period. In some embodiments, demand charge modeler 718 updates $\dot{Q}_{peak,past}$ each time a new maximum waterside demand is set to ensure that the energy cost model accurately represents the demand charge imposed by the power utility.

High-level optimizer 712 can use the energy cost model, demand charge model, building temperature model, thermal energy storage model, waterside demand model, and optimization constraints to formulate an optimization problem. In some embodiments, high-level optimizer 712 seeks to minimize the total cost of energy consumed by waterside system 30 (i.e., energy cost and demand charge) subject to the building temperature constraints and other constraints provided by the high-level models described herein. For example, high-level optimizer 712 can formulate the high-level optimization problem as:

$$\min_{x,u,\dot{Q}_{peak}} \sum_{k=0}^{N-1} c_k \eta_{tot} \dot{Q}_{HVAC,k} \Delta + c_{peak} \eta_{tot} \dot{Q}_{peak}$$

subject to the following constraints:

$$C_b \frac{dT_b}{dt} = -H_b(T_b - T_a) - \dot{Q}_{c,b} + \dot{Q}_{other,b}$$

$$\frac{ds}{dt} = -\sigma s + \dot{Q}_{storage}$$

$$\dot{Q}_{HVAC,k} = \sum_{b=1}^{b_n} \dot{Q}_{c,b,k} + \dot{Q}_{storage,k}$$

$$0 \leq \dot{Q}_{HVAC,k} \leq \dot{Q}_{peak}$$

$$\dot{Q}_{peak,past} \leq \dot{Q}_{peak} \leq \dot{Q}_{HVAC,max}$$

$$0 \leq s_k \leq s_{max}$$

$$T_{min} \leq T_b \leq T_{max}$$

In some embodiments, high-level optimizer 712 converts one or more of the above-identified models and/or constraints to state-space form for use in the high-level optimization problem. For example, high-level optimizer 712 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. Table 1 illustrates the variables that can be included in each of these vectors:

TABLE 1

| Variables in High-Level Optimization | | |
|---|---|---|
| States | $x = [T_b \ s]^T$ | $n = n_b + 1$ |
| Inputs | $u = [\dot{Q}_{c,b} \ \dot{Q}_{storage}]^T$ | $m = n_b + 1$ |
| Measurements | $y = [T_b \ s]^T$ | $p = n_b + 1$ |
| Disturbances | $d = [T_a \ \dot{Q}_{other,b}]^T$ | $n_d = n_b + 1$ |

As shown in Table 1, the system states vector x includes the building temperature $T_b$ and the TES storage level s. In some embodiments, the system states vector x includes a building temperature $T_b$ for each of the $n_b$ buildings and a TES storage level s such that the total number n of variables in the system states vector x is equal to $n_b+1$. The inputs vector u can include the thermal energy load $\dot{Q}_{c,b}$ allocated to each building b and the thermal energy load $\dot{Q}_{storage}$ allocated to thermal energy storage. In some embodiments, the inputs vector u includes a thermal energy load $\dot{Q}_{c,b}$ for each of the $n_b$ buildings and a TES load $\dot{Q}_{storage}$ such that the total number m of variables in the inputs vector u is equal to $n_b+1$. The disturbance vector d can include the ambient air temperature $T_a$ and the estimated disturbance $\dot{Q}_{other,b}$ for each building. In some embodiments, the disturbances vector d includes an estimated disturbance $\dot{Q}_{other,b}$ for each of the $n_b$ buildings and a single ambient air temperature $T_a$ such that the total number $n_d$ of variables in the disturbances vector d is equal to $n_b+1$.

In some embodiments, the measurements vector y is the same as the system states vector x. This indicates that all of the system states are directly measured (i.e., $y_k=x_k$) and the values of the C and D matrices in the state-space model are C=1 and D=0. In other embodiments, the system states x can be constructed or predicted from the measurements y. For example, high-level MPC 608 can use a Kalman filter or other predictive technique to construct the system states x from the measurements y. Accordingly, the system states x can be replaced with $\hat{T}_b$ and $\hat{s}$, where the hat notation indicates that such states are predicted. The values of the A, B, C, and D, matrices in the state-space representation can be identified using a system identification technique. Examples of state prediction and system identification techniques which can be used by high-level MPC 608 are described in detail in U.S. Pat. No. 9,235,657 titled "System Identification and Model Development" and filed Mar. 13, 2013, the entire disclosure of which is incorporated by reference herein.

Example 2: Energy Cost Model with Airside Power Consumption

In some embodiments, energy cost modeler 720 generates an energy cost model that accounts for both the energy consumption of waterside system 30 and the energy consumption of airside system 50. For example, the energy cost model can account for the power $\dot{W}_{air,b}$ consumed by fans and other types of airside equipment 622 to deliver the allocated thermal energy load $\dot{Q}_{c,b}$ to the building. In some embodiments, the power consumption $\dot{W}_{air,b}$ of each airside subsystem 632-636 is a function of the thermal energy load $\dot{Q}_{c,b}$ allocated to that airside subsystem.

Airside power consumption modeler 716 can generate an airside power consumption model which relates airside power consumption $\dot{W}_{air,b}$ to thermal energy load $\dot{Q}_{c,b}$. In some embodiments, airside power consumption modeler 716 models airside power consumption using the following equation:

$$\dot{W}_{air,b} = \eta_{air}\dot{Q}_{c,b}$$

where $\dot{W}_{air,b}$ is the amount of power consumed by the airside equipment 622 of building b to deliver the thermal energy load $\dot{Q}_{c,b}$. The conversion factor $\eta_{air}$ can be a function of the coefficient of performance of the airside equipment 622 (e.g., an inverse of the coefficient of performance). In some embodiments, $\eta_{air}$ is a constant, which indicates that the relationship between airside power consumption $\dot{W}_{air,b}$ and thermal energy load $\dot{Q}_{c,b}$ is linear. In other embodiments, $\eta_{air}$ can be calculated by airside power consumption modeler 716 as a nonlinear function of load and other parameters using operating data.

In some embodiments, airside power consumption modeler 716 calculates the conversion factor $\eta_{air}$ as a function of various airside system parameters such as the type of AHUs, the time of day, comfort bounds, ambient conditions, chilled water supply temperature, chilled water supply flow rate, and/or other parameters that characterize airside system 50 or any of the airside subsystems 632-636. For example, airside power consumption modeler 716 can collect operating data from airside equipment 622 and/or low-level airside controller 612 and use the operating data to determine an appropriate value of $\eta_{air}$.

In some embodiments, airside power consumption modeler 716 calculates $\eta_{air}$ as a function of the thermal energy load $\dot{Q}_c$ and individual fan power models. For example, air at 20° C. can have a density $\rho_{air}$ and heat capacity $C_{p,air}$ as shown in the following equations:

$$\rho_{air} = 1.205 \frac{\text{kg}}{\text{m}^3}$$

$$C_{p,air} = 1.005 \frac{\text{kJ}}{\text{kg} \cdot \text{K}}$$

The thermal energy load $\dot{Q}_c$ provided by an airflow can be represented using the following model:

$$\dot{Q}_c = \dot{m}_{air} C_{p,air} \Delta T$$

$$\dot{Q}_c = \rho_{air} \dot{V}_{air} C_{p,air}(T_{room} - T_{supply})$$

$$\frac{\dot{Q}_c}{\dot{V}_{air}} = \rho_{air} C_{p,air}(T_{room} - T_{supply})$$

where $\dot{V}_{air}$ is the volumetric flow rate of supply air into a building zone, $T_{room}$ is the temperature of the building zone, and $T_{supply}$ is the temperature of the supply air. Assuming that the supply air temperature $T_{supply}$ is approximately 55° F. and the room air temperature $T_{room}$ is approximately 72° F., airside power consumption modeler 716 can calculate the thermal energy load per unit volume of airflow (e.g., the cooling capacity of the air) as follows:

$$\frac{\dot{Q}_c}{\dot{V}_{air}} = \left(1.205 \frac{\text{kg}}{\text{m}^3}\right)\left(1.005 \frac{\text{kJ}}{\text{kg} \cdot \text{K}}\right)(72° \text{ F.} - 55° \text{ F.})\left(\frac{5 \text{ K}}{9° \text{ F.}}\right)$$

$$\frac{\dot{Q}_c}{\dot{V}_{air}} = 11.437 \frac{\text{kJ}}{\text{m}^3}$$

Airside power consumption modeler 714 can use this value of cooling capacity $\dot{Q}_c/\dot{V}_{air}$ and the estimated power consumption per unit volume of a typical airside fan to estimate the value of $\eta_{air}$. For example, typical HVAC fans consume approximately 1 horsepower (hp) to provide between 1000 cubic feet per minute (CFM) and 1500 CFM of airflow. These values can be converted to metric values as follows:

$$\left(\frac{1 \text{ hp}}{1000 \text{ CFM} - 1500 \text{ CFM}}\right)\left(\frac{2118.9 \text{ CFM}}{1 \text{ m}^3/\text{s}}\right)\left(\frac{0.7457 \text{ kW}}{\text{hp}}\right) =$$

$$1.05 \frac{\text{kJ}}{\text{m}^3} - 1.58 \frac{\text{kJ}}{\text{m}^3}$$

Substituting these values into the airside power consumption model yields:

$$\frac{\dot{W}_{air}}{\dot{V}_{air}} = \eta_{air} \frac{\dot{Q}_c}{\dot{V}_{air}}$$

$$1.05 \frac{\text{kJ}}{\text{m}^3} - 1.58 \frac{\text{kJ}}{\text{m}^3} = \eta_{air} 11.437 \frac{\text{kJ}}{\text{m}^3}$$

$$\eta_{air} = 0.091 - 0.14$$

which indicates that the airside power consumption $\dot{W}_{air,b}$ of each airside subsystem 622-626 is approximately 10% of the thermal energy load $\dot{Q}_{c,b}$ delivered by the airside subsystem.

Given that airside power consumption $\dot{W}_{air,b}$ can be modeled as $\eta_{air}\dot{Q}_{c,b}$, energy cost modeler 720 can model total energy cost during the optimization period using the following equation:

$$\sum_{k=0}^{N-1} c_k \left( \eta_{HVAC}\dot{Q}_{HVAC,k} + \eta_{air}\sum_{b=1}^{n_b} \dot{Q}_{c,b,k} \right) \Delta + c_{peak}\dot{W}_{peak}$$

The first portion of the energy cost model accounts for the per unit costs (e.g., $/kWh) of energy consumed by waterside system 30 during each time step k of the optimization period. In some embodiments, $c_k$ is the cost per unit of energy consumed at time step k, $\Delta$ is the duration of time step k, and $\eta_{HVAC}$ is the inverse of the coefficient of performance of waterside system 30 (e.g., $\eta_{HVAC} \sim 0.2$). The term $\eta_{HVAC}\dot{Q}_{HVAC,k}$ represents the amount of power consumption (e.g., kW) by waterside system 30 during time step k to satisfy the waterside demand $\dot{Q}_{HVAC,k}$. Multiplying by the cost $c_k$ per unit energy consumed (e.g., $/kWh) and the duration $\Delta$ (e.g., hours) yields the total cost (e.g., $) of the energy consumed during time step k by waterside system 30. The first portion of the energy cost model can be summed across all time steps k=0 ... N−1 of the optimization period to determine the total energy consumed by waterside system 30 over the duration of the optimization period.

The second portion of the energy cost model accounts for the per unit costs (e.g., $/kWh) of energy consumed by each airside subsystem (e.g., each building b) during each time step k of the optimization period. As described above, $\eta_{air}$ is the inverse of the coefficient of performance of the airside subsystems (e.g., $\eta_{air} \sim 0.1$) and $\dot{Q}_{c,b,k}$ is the thermal energy load delivered by the airside subsystem for building b at time step k. The term $\eta_{air}\dot{Q}_{c,b,k}$ represents the power consumption $\dot{W}_{air,b}$ of the airside equipment for building b. The second portion of the energy cost model can be summed across all buildings b=1 ... $n_b$ and across all time steps k=0 ... N−1 to determine the total power consumption of all airside subsystems over the duration of the optimization period. Multiplying by the cost $c_k$ per unit energy consumed (e.g., $/kWh) and the duration $\Delta$ (e.g., hours) yields the total cost (e.g., $) of the energy consumed by the airside subsystems over the duration of the optimization period.

The third portion of the energy cost model accounts for the demand charge. In some embodiments, $c_{peak}$ is the demand charge rate (e.g., $/kW) and $\dot{W}_{peak}$ is the peak aggregate airside and waterside power consumption during the applicable demand charge period. Multiplying by the demand charge rate $c_{peak}$ yields the total cost (e.g., $) of the demand charge. In some embodiments, demand charge modeler 718 generates demand charge constraints to ensure that $\dot{W}_{peak}$ has the appropriate value. If the demand charge period is contained entirely within the optimization period (e.g., between time steps k=0 and k=N−1), then the appropriate value of $\dot{W}_{peak}$ is the maximum of the combined waterside/airside power consumption at any time step k during the optimization period. Demand charge modeler 718 can implement the following demand charge constraint:

$$0 \le \left( \eta_{HVAC}\dot{Q}_{HVAC,k} + \eta_{air}\sum_{b=1}^{n_b} \dot{Q}_{c,b,k} \right) \le \dot{W}_{peak}$$

to ensure that the peak power consumption $\dot{W}_{peak}$ is always greater than or equal to the sum of the waterside power consumption $\eta_{HVAC}\dot{Q}_{HVAC,k}$ and the airside power consumption $\eta_{air}\sum_{b=1}^{n_b} \dot{Q}_{c,b,k}$ at each time step. This forces the peak power consumption $\dot{W}_{peak}$ to be at least as large as the maximum combined airside/waterside demand during the optimization period.

If the demand charge period begins before the optimization period, it is possible that the maximum peak power consumption during the demand charge period occurred prior to the beginning of the optimization period. Demand charge modeler 718 can implement the following demand charge constraint:

$$\dot{W}_{peak,past} \le \dot{W}_{peak}$$

to ensure that the peak power consumption $\dot{W}_{peak}$ is always greater than or equal to the maximum power consumption $\dot{W}_{peak,past}$ that occurred during the same demand charge period, even if the maximum power consumption occurred prior to the beginning of the current optimization period. In some embodiments, demand charge modeler 718 updates $\dot{W}_{peak,past}$ each time a new maximum power consumption is set to ensure that the energy cost model accurately represents the demand charge imposed by the power utility.

High-level optimizer 712 can use the energy cost model, airside power consumption model, demand charge model, building temperature model, thermal energy storage model, waterside demand model, and optimization constraints to formulate an optimization problem. In some embodiments, high-level optimizer 712 seeks to minimize the total cost of energy consumed by the aggregate airside/waterside system subject to the building temperature constraints and other constraints provided by the high-level models described herein. For example, high-level optimizer 712 can formulate the high-level optimization problem as:

$$\min_{x,u,\dot{W}_{peak}} \sum_{k=0}^{N-1} c_k \left( \eta_{HVAC}\dot{Q}_{HVAC,k} + \eta_{air}\sum_{b=1}^{n_b} \dot{Q}_{b,c,k} \right) \Delta + c_{peak}\dot{W}_{peak}$$

subject to the following constraints:

$$C_b \frac{dT_b}{dt} = -H_b(T_b - T_a) - \dot{Q}_{c,b} + \dot{Q}_{other,b}$$

$$\frac{ds}{dt} = -\sigma s + \dot{Q}_{storage}$$

$$\dot{Q}_{HVAC,k} = \sum_{b=1}^{b_n} \dot{Q}_{c,b,k} + \dot{Q}_{storage,k}$$

$$0 \le \left( \eta_{HVAC}\dot{Q}_{HVAC,k} + \eta_{air}\sum_{b=1}^{n_b} \dot{Q}_{c,b,k} \right) \le \dot{W}_{peak}$$

$$\dot{W}_{peak,past} \le \dot{W}_{peak}$$

$$0 \le \dot{Q}_{HVAC,k} \le \dot{Q}_{HVAC,max}$$

$$0 \le s_k \le s_{max}$$

$$T_{min} \le T_b \le T_{max}$$

In some embodiments, high-level optimizer 712 converts one or more of the above-identified models and/or constraints to state-space form for use in the high-level optimization problem. For example, high-level optimizer 712 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. The variables included in each vector can be the same as shown in Table 1 above.

High-level optimizer 712 can perform an optimization procedure to determine optimal values for each the input variables in the vector u at each time step k of the optimization period. For example, high-level optimizer 712 can determine optimal values for each of the thermal energy loads $\dot{Q}_{c,b,k}$ allocated to each building b at each time step k and the thermal energy load $\dot{Q}_{storage,k}$ allocated to thermal energy storage at each time step k. Each set of thermal energy loads $\dot{Q}_{c,b,k}$ with the same building index b forms a load profile for a particular airside subsystem and includes a load value for each time step k in the optimization period. Similarly, the set of TES loads $\dot{Q}_{storage,k}$ forms a load profile for the TES tanks and includes a load value for each time step k in the optimization period. High-level optimizer 712 can provide the airside subsystem load profiles to the low-level airside controllers 612-616 and can provide the TES load profile to the low-level waterside controller 618.

In some embodiments, high-level optimizer 712 generates a vector of predicted temperature states $\hat{T}_b$ for each low-level airside subsystem 632-636. Each vector of predicted temperature states $\hat{T}_b$ can include a predicted building temperature state $\hat{T}_{b,k}$ for each time step k during the optimization period. Temperature states $\hat{T}_{b,k}$ can be predicted using any of a variety of predictive techniques including, for example, a Kalman filter as described in U.S. Pat. No. 9,235,657. High-level optimizer 712 can provide each vector of predicted temperature states $\hat{T}_b$ to the low-level airside controller 612-616 for the corresponding low-level airside subsystem 632-636. In some embodiments, low-level airside controllers 612-616 use the predicted temperature states $\hat{T}_b$ to generate zone temperature setpoints that track the predicted temperature states $\hat{T}_{b,k}$ at each time step k.

In some embodiments, high-level optimizer 712 calculates the total demand $\dot{Q}_{HVAC,k}$ on waterside system 30 at each time step k as a summation of the building thermal energy loads $\dot{Q}_{c,b,k}$ and the TES load $\dot{Q}_{storage,k}$ at time step k. The set of waterside demand values forms a demand profile for waterside system 30 and includes a demand value for each time step k in the optimization period. The demand value $\dot{Q}_{HVAC,k}$ for a particular time step k represents the total demand which must be satisfied by waterside system 30 at that time step k. High-level optimizer 712 can provide the waterside demand profile to low-level waterside controller 618.

Low-Level Airside Model Predictive Controller

Figure 8:
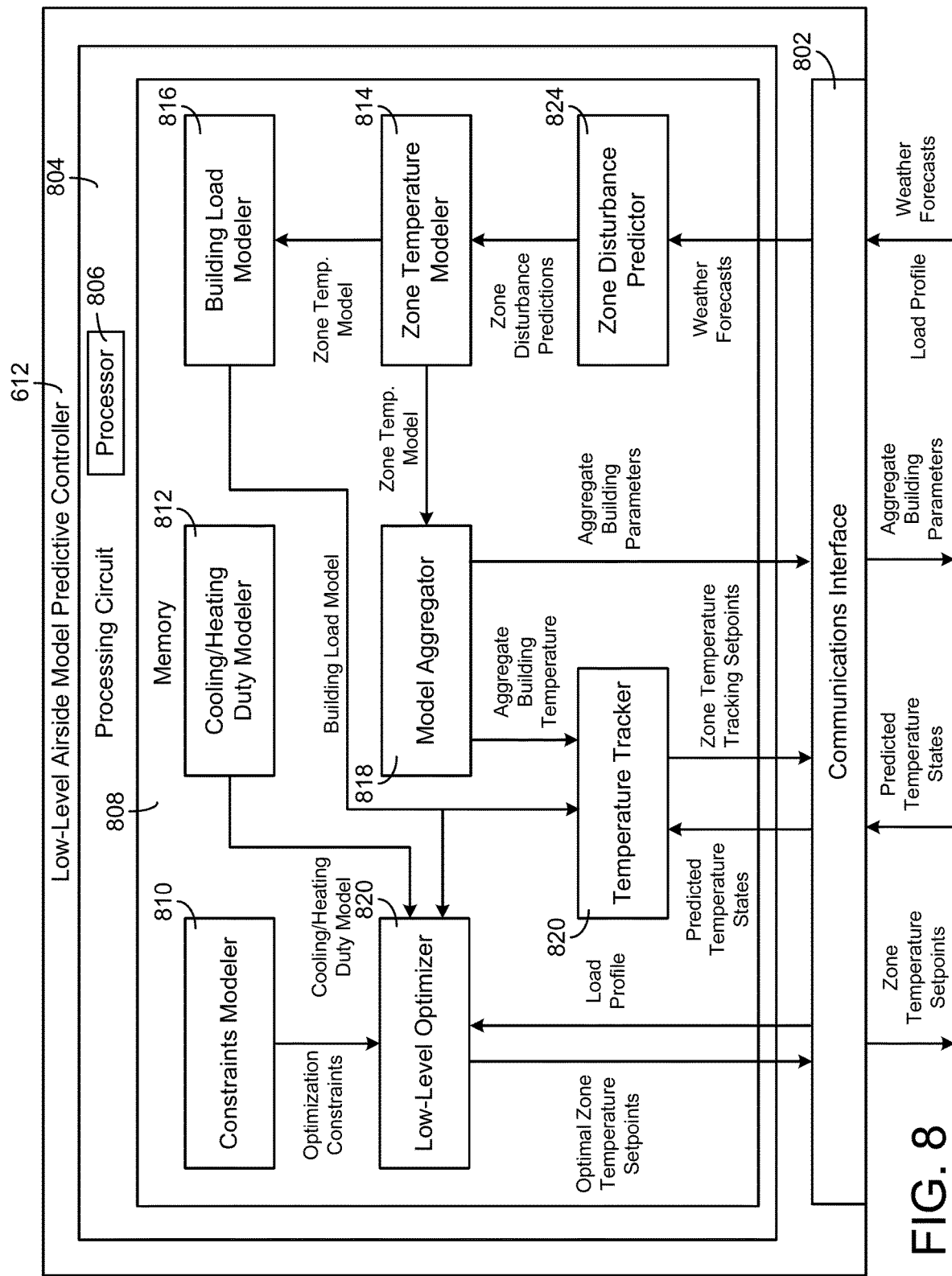
FIG. 8 is a block diagram illustrating one of the low-level model predictive controllers of FIG. 6 in greater detail, according to some embodiments.

Referring now to FIG. 8, a block diagram illustrating low-level model predictive controller (MPC) 612 in greater detail is shown, according to some embodiments. Although only one low-level airside MPC 612 is shown in detail, it should be understood that any other low-level airside MPCs in control system 600 (e.g., low-level airside MPCs 614-616) can include some or all of the same components as low-level airside MPC 612. Control system 600 can include any number of low-level airside MPCs, each of which can operate independently to monitor and control a separate low-level airside subsystem (e.g., airside subsystems 632-636).

Low-level airside MPC 612 is shown a communications interface 802 and a processing circuit 804. Communications interface 802 can include wired or wireless interfaces (e.g., jacks, antennas, transmitters, receivers, transceivers, wire terminals, etc.) for conducting data communications with various systems, devices, or networks. For example, communications interface 802 can include an Ethernet card and port for sending and receiving data via an Ethernet-based communications network and/or a WiFi transceiver for communicating via a wireless communications network. Communications interface 802 can be configured to communicate via local area networks or wide area networks (e.g., the Internet, a building WAN, etc.) and may use a variety of communications protocols (e.g., BACnet, IP, LON, etc.).

Communications interface 802 can be a network interface configured to facilitate electronic data communications between low-level airside MPC 612 and various external systems or devices (e.g., weather service 604, high-level MPC 608, airside equipment 622, etc.). For example, low-level airside MPC 612 can receive weather forecasts from weather service 604 and/or load predictions from load/rate predictor 602. Low-level airside MPC 612 can receive measurements from the BMS indicating one or more measured states of the controlled building or campus (e.g., temperature, humidity, electric loads, etc.) and one or more states of airside subsystem 632 (e.g., equipment status, power consumption, equipment availability, etc.). Low-level airside MPC 612 can receive predicted temperature states and/or a load profile from high-level MPC 608. Low-level airside MPC 612 can use the information received at communications interface 802 to generate zone temperature setpoints each zone of low-level airside subsystem 632. Low-level airside MPC 612 can provide the zone temperature setpoints to airside equipment 622.

Processing circuit 804 is shown to include a processor 806 and memory 808. Processor 806 can be a general purpose or specific purpose processor, an application specific integrated circuit (ASIC), one or more field programmable gate arrays (FPGAs), a group of processing components, or other suitable processing components. Processor 806 can be configured to execute computer code or instructions stored in memory 808 or received from other computer readable media (e.g., CDROM, network storage, a remote server, etc.).

Memory 808 can include one or more devices (e.g., memory units, memory devices, storage devices, etc.) for storing data and/or computer code for completing and/or facilitating the various processes described in the present disclosure. Memory 808 can include random access memory (RAM), read-only memory (ROM), hard drive storage, temporary storage, non-volatile memory, flash memory, optical memory, or any other suitable memory for storing software objects and/or computer instructions. Memory 808 can include database components, object code components, script components, or any other type of information structure for supporting the various activities and information structures described in the present disclosure. Memory 808 can be communicably connected to processor 806 via processing circuit 804 and can include computer code for executing (e.g., by processor 806) one or more processes described herein. When processor 806 executes instructions stored in memory 808, processor 806 generally configures low-level airside MPC 612 (and more particularly processing circuit 804) to complete such activities.

Still referring to FIG. 8, low-level airside MPC 612 is shown to include a zone disturbance predictor 824. Zone disturbance predictor 824 can generate a disturbance forecast for each zone i of airside subsystem 632. Throughout this disclosure, the index i is used to denote individual zones, where i=1 ... $n_z$ and $n_z$ is the total number of zones in a given airside subsystem. The disturbance forecast for zone i can include a vector of disturbance values $\dot{Q}_{other,i}$, where each element of the vector $\dot{Q}_{other,i}$ includes a predicted disturbance value $\dot{Q}_{other,i,k}$ for a particular time step k of the optimization period.

Zone disturbance predictor 824 is shown receiving weather forecasts from a weather service 604. In some embodiments, zone disturbance predictor 824 generates the disturbance forecasts as a function of the weather forecasts. In some embodiments, zone disturbance predictor 824 uses feedback from regulatory layer 620 to generate the disturbance forecasts. Feedback from regulatory layer 620 can include various types of sensory inputs (e.g., temperature, flow, humidity, enthalpy, etc.) or other data relating to the controlled building or campus (e.g., building occupancy data, building electric load, etc.). In some embodiments, zone disturbance predictor 824 uses a deterministic plus stochastic model trained from historical load data to generate the disturbance forecasts. Zone disturbance predictor 824 can use any of a variety of prediction methods to generate the disturbance forecasts (e.g., linear regression for the deterministic portion and an autoregressive model for the stochastic portion).

Zone disturbance predictor 824 can predict one or more different types of disturbances for each building zone i. For example, zone disturbance predictor 824 can predict a thermal load resulting from heat transfer between the air within building zone i and outside air through the walls of the building. Zone disturbance predictor 824 can predict a thermal load resulting from internal heat generation within the building zone (e.g., heat generated by electronics in the building zone, heat generated by zone occupants, etc.). In some embodiments, zone disturbance predictor 824 makes disturbance predictions using the predictive techniques described in U.S. patent application Ser. No. 14/717,593.

Still referring to FIG. 8, low-level airside MPC 612 is shown to include a zone temperature modeler 814. Zone temperature modeler 814 can generate a temperature model for each building zone i of airside subsystem 632. Airside subsystem 632 can have any number of zones. In some embodiments, the temperature of each zone can be independently controlled and/or adjusted. Some building zones can exchange heat with each other (e.g., if the building zones are adjacent to one another), whereas other building zones do not directly exchange energy. In general, zone temperature modeler 814 can generate $n_z$ zone temperature models, where $n_z$ is the total number of zones in airside subsystem 632.

In some embodiments, zone temperature modeler 814 models the temperature of each building zone using a zone heat transfer model. The dynamics of heating or cooling a single building zone are described by the energy balance:

$$C\frac{dT}{dt} = -H(T - T_a) - \dot{Q}_c + \dot{Q}_{other}$$

where C is the thermal capacitance of the building zone, H is the ambient heat transfer coefficient for the building zone, T is the temperature of the building zone, $T_a$ is the ambient temperature outside the building zone (e.g., the outside air temperature), $\dot{Q}_c$ is the amount of cooling applied to the building zone (i.e., the cooling load), and $\dot{Q}_{other}$ is the external load, radiation, or other disturbance experienced by the building zone. In the previous equation, $\dot{Q}_c$ represents heat transfer out of the building zone (i.e., cooling) by the HVAC system and therefore has a negative sign. However, if heating is applied to the building zone rather than cooling, the sign on $\dot{Q}_c$ can be switched to a positive sign such that $\dot{Q}_c$ represents the amount of heating applied to the building zone by the HVAC system (i.e., the heating load).

The previous equation combines all mass and air properties of the building zone into a single zone temperature. Other heat transfer models which can be used by zone temperature modeler 814 include the following air and mass zone models:

$$C_z\frac{dT_z}{dt} = H_{az}(T_a - T_z) + H_{mz}(T_m - T_z) - \dot{Q}_c + \dot{Q}_{other}$$

$$C_m\frac{dT_m}{dt} = H_{mz}(T_z - T_m)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by zone temperature modeler 814 include the following air, shallow mass, and deep mass zone models:

$$C_z\frac{dT_z}{dt} = H_{az}(T_a - T_z) + H_{sz}(T_s - T_z) - \dot{Q}_c + \dot{Q}_{other}$$

$$C_s\frac{dT_s}{dt} = H_{sz}(T_z - T_s) + H_{ds}(T_d - T_s)$$

$$C_d\frac{dT_d}{dt} = H_{ds}(T_s - T_d)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, zone temperature modeler 814 models the temperature of each building using the following zone temperature model:

$$C_i \frac{dT_i}{dt} = -H_i(T_i - T_a) - \sum_{j \neq i} \beta_{ij}(T_i - T_j) - \dot{Q}_{c,i} + \dot{Q}_{other,i}$$

where $C_i$ and $T_i$ are the thermal capacitance and temperature of the building zone designated by zone index i, $T_a$ is the ambient air temperature outside zone i (e.g., outside air temperature), $H_i$ is the heat transfer coefficient between zone i and the ambient air, $\dot{Q}_{c,i}$ is the amount of cooling applied to the building zone i by MPC system 600 (i.e., the amount of heat removed from the zone), and $\dot{Q}_{other,i}$ is the external load, radiation, or disturbance experienced by zone i. If heating is provided to the zone rather than cooling, the sign on $\dot{Q}_{c,i}$ can be switched from a negative sign to a positive sign.

The parameter $\beta_{ij}$ characterizes the degree of coupling between zone i and another zone j (e.g., a building zone adjacent to zone i). If zones i and j are not adjacent and/or do not directly exchange heat with each other, zone temperature modeler 814 can set the value of $\beta_{ij}$ equal to zero. The zone temperature model can include a summation of the heat transfers between building zone i and each other building zone j≠i as a function of the zone temperatures $T_i$ and $T_j$ and the coupling coefficient $\beta_{ij}$. In other embodiments, heat transfer between zones can be accounted for using the external disturbance estimate $\dot{Q}_{other,i}$.

Zone temperature modeler 814 can use the zone disturbance estimates received from zone disturbance predictor 824 to identify appropriate values of the external disturbance $\dot{Q}_{other,i}$ for each zone i at each time step of the optimization period. In some embodiments, zone temperature modeler 824 uses the weather forecasts from weather service 604 and/or the load and rate predictions provided by load/rate predictor 602 to determine appropriate values for the ambient air temperature $T_a$ and/or the external disturbance $\dot{Q}_{other,i}$ for each zone i at each time step of the optimization period. Values of $C_i$ and $H_i$ can be specified as parameters of the zone i, received from the BMS that manages the building zone i, received from a user, retrieved from memory 808, or otherwise provided to zone temperature modeler 814. Zone temperature modeler 714 can generate a zone temperature model for each zone i, where i=1 . . . $n_z$ and $n_z$ is the total number of zones.

Still referring to FIG. 8, low-level airside MPC 612 is shown to include a building load modeler 816. Building load modeler 816 can generate a model of the total amount of thermal energy delivered to the airside subsystem $Q_{total}$ (e.g., the total amount of heating or cooling delivered to the building) as a function of the individual zone loads $\dot{Q}_{c,i}$. In some embodiments, building load modeler 816 models the total building load using the following equation:

$$\frac{dQ_{total}}{dt} = \sum_{i=1}^{n_z} \dot{Q}_{c,i}$$

where $Q_{total}$ is the total amount of thermal energy (e.g., heating or cooling) delivered to the airside subsystem and $\dot{Q}_{c,i}$ is the rate at which thermal energy is being delivered (units of power) of a particular zone i. The building load model can sum the thermal energy loads $\dot{Q}_{c,i}$ of each building zone to calculate the total airside subsystem thermal energy load $$\frac{dQ_{total}}{dt},$$

which is the derivative of the total amount of thermal energy $Q_{total}$ delivered to the airside subsystem.

Low-level airside MPC 612 is shown to include a cooling/heating duty modeler 820. Cooling/heating duty modeler 820 can generate one or more models that define the thermal energy load $\dot{Q}_{c,i}$ of each building zone as a function of the zone temperature $T_i$ and the zone temperature setpoint $T_{sp,i}$ as shown in the following equation:

$$\dot{Q}_{c,i} = f(T_i, T_{sp,i})$$

The models generated by cooling/heating duty modeler 820 can be used as optimization constraints to ensure that the thermal energy load $\dot{Q}_{c,i}$ is not reduced to a value that would cause the zone temperature $T_i$ to deviate from an acceptable or comfortable temperature range.

In some embodiments, cooling/heating duty modeler 820 relates zone thermal energy load $\dot{Q}_{c,i}$ to the zone temperature $T_i$ and the zone temperature setpoint $T_{sp,i}$ using multiple models. For example, cooling/heating duty modeler 820 can use a model of the zone regulatory controller to determine the control action performed by the controller as a function of the zone temperature $T_i$ and the zone temperature setpoint $T_{sp,i}$. An example of such a zone regulatory controller model is shown in the following equation:

$$v_{air,i} = f_1(T_i, T_{sp,i})$$

where $v_{air,i}$ is the rate of airflow to building zone i (i.e., the control action). The function $f_1$ can be identified from data. For example, cooling/heating duty modeler 820 can collect measurements of $v_{air,i}$ and $T_i$ and identify the corresponding value of $T_{sp,i}$. Cooling/heating duty modeler 820 can perform a system identification process using the collected values of $v_{air,i}$, $T_i$, and $T_{sp,i}$ as training data to determine the function $f_1$ that defines the relationship between such variables.

Cooling/heating duty modeler 820 can use an energy balance model relating the control action $v_{air,i}$ to the zone thermal energy load $\dot{Q}_{c,i}$, as shown in the following equation:

$$\dot{Q}_{c,i} = f_2(v_{air,i})$$

where the function $f_2$ can be identified from training data. Cooling/heating duty modeler 820 can perform a system identification process using collected values of $v_{air,i}$ and $\dot{Q}_{c,i}$ to determine the function $f_2$ that defines the relationship between such variables.

In some embodiments, a linear relationship exists between $\dot{Q}_{c,i}$ and $v_{air,i}$. Assuming an ideal proportional-integral (PI) controller and a linear relationship between $\dot{Q}_{c,i}$ and $v_{air,i}$ a simplified linear controller model can be used to define the thermal energy load $\dot{Q}_{c,i}$ of each building zone as a function of the zone temperature $T_i$ and the zone temperature setpoint $T_{sp,i}$. An example of such a model is shown in the following equations:

$$\dot{Q}_{c,i} = \dot{Q}_{ss,i} + K_{c,i}\left[\varepsilon_i + \frac{1}{\tau_{I,i}}\int_0^t \varepsilon_i(t')dt'\right]$$

$$\varepsilon_i = T_{sp,i} - T_i$$

where $\dot{Q}_{ss,i}$ is the steady-state rate of heating or cooling rate, $K_{c,i}$ is the scaled zone PI controller proportional gain, $\tau_{I,i}$ is the zone PI controller integral time, and $\varepsilon_i$ is the setpoint error (i.e., the difference between the zone temperature setpoint $T_{i,sp}$ and the zone temperature $T_{sp}$). Saturation can be represented by constraints on $\dot{Q}_{c,i}$. If a linear model is not sufficiently accurate to model the PI controller and heat transfer in the AHU for zone i, a nonlinear heating/cooling duty model can be used instead.

Advantageously, modeling the regulatory controllers (e.g., zone PI controllers) in the low-level airside optimization problem allows low-level airside MPC 612 to use the dynamics of the regulatory controllers when determining the optimal temperature setpoints. In some embodiments, the responses of the regulatory controllers can be sluggish. For example, it can take some zones up to an hour to reach a new temperature setpoint. Using the dynamics of the regulatory controllers in the low-level MPC problem allows low-level airside MPC 612 to consider the time between control action and effect such that optimal temperature setpoints can be selected in view of time-varying energy prices.

Still referring to FIG. 8, low-level airside MPC 612 is shown to include a constraints modeler 810. Constraints modeler 810 can generate and impose optimization constraints on the optimization procedure performed by low-level optimizer 812. Constraints imposed by constraints modeler 810 can include, for example, equipment capacity constraints and zone temperature constraints. In some embodiments, constraints modeler 810 imposes constraints on the zone temperature $T_i$. For example, constraints modeler 810 can constrain the zone temperature $T_i$ between a minimum temperature $T_{min}$ and a maximum temperature $T_{max}$ as shown in the following equation:

$$T_{min} \leq T_i \leq T_{max}$$

where the values of $T_{min}$ and $T_{max}$ can be adjusted based on the temperature setpoints of the building.

In some embodiments, constraints modeler 810 automatically adjusts the values of $T_{min}$ and $T_{max}$ based on information received from the BMS for the building zone. For example, constraints modeler 810 can use a temperature setpoint schedule and/or occupancy schedule for the building zone to automatically adjust the values of $T_{min}$ and $T_{max}$ for each time step k. This allows constraints modeler 810 to use temperature limits based on the time-varying setpoint temperature range for the zone so that the zone temperature $T_i$ is maintained within time-appropriate temperature limits $T_{min}$ and $T_{max}$.

In some embodiments, constraints modeler 810 imposes a constraint to ensure that the total airside subsystem load during any time step k is no greater than the thermal energy load allocated to the airside subsystem by high-level MPC 608. For example, constraints modeler 810 can impose the constraint:

$$\frac{Q_{total,k+1} - Q_{total,k}}{\Delta} \leq \dot{Q}_{c,b,k}$$

where $Q_{total,k+1}$ is the total airside subsystem energy consumed at time step k+1, $Q_{total,k}$ is the total airside subsystem energy consumed at time step k, $\dot{Q}_{c,b,k}$ is the thermal energy load allocated to the airside subsystem b by high-level MPC 608, and $\Delta$ is the duration of each time step. The left side of the equation represents the airside subsystem thermal energy load during time step k (i.e., the change in total thermal energy delivered between consecutive time steps divided by the time step duration), whereas the right side of the equation represents the thermal energy load allocated to airside subsystem b during time step k by high-level MPC 608.

In some embodiments, constraints modeler 810 imposes an additional constraint to ensure that the total amount of thermal energy delivered does not decrease between consecutive time steps, as shown in the following equation:

$$Q_{total,k+1} - Q_{total,k} \geq 0$$

Since $Q_{total,k+1}$ is a summation of the amount of thermal energy delivered up to time step k+1, this constraint prevents low-level optimizer 812 from selecting a negative value for the thermal energy load $\dot{Q}_{c,i}$ at time step k. In other words, the rate at which thermal energy is delivered (i.e., $\dot{Q}_{c,i}$) can add to the total amount of thermal energy delivered over the optimization period, but cannot subtract from the total amount of thermal energy delivered.

Low-level optimizer 812 can use the zone temperature models, building load model, cooling/heating duty model, and optimization constraints to formulate an optimization problem. In some embodiments, the low-level optimization problem seeks to minimize the total amount of thermal energy $Q_{total,N}$ used by the airside subsystem 632 over the optimization period subject to the zone temperature constraints and other constraints provided by the low-level airside models described herein. For example, low-level optimizer 812 can formulate the low-level optimization problem as:

$$\min_{x,u} Q_{total,N}$$

subject to the following constraints:

$$C_i \frac{dT_i}{dt} = -H_i(T_i - T_a) - \sum_{j \neq i} \beta_{ij}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_{min} \leq T_i \leq T_{max}$$

$$\frac{Q_{total,k+1} - Q_{total,k}}{\Delta} \leq \dot{Q}_{c,b,k}$$

$$Q_{total,k+1} - Q_{total,k} \geq 0$$

$$\dot{Q}_{c,i} = f(T_i, T_{sp,i})$$

where the function $f$ is defined according to the following relationship between $\dot{Q}_{c,i}$, $T_i$, and $T_{i,sp}$ $$\dot{Q}_{c,i} = \dot{Q}_{ss,i} + K_{c,i}\left[\varepsilon_i + \frac{1}{\tau_{I,i}} \int_0^t \varepsilon_i(t')dt'\right]$$

$$\varepsilon_i = T_{sp,i} - T_i$$

In some embodiments, low-level optimizer 812 converts one or more of the above-identified models and/or constraints to state-space form for use in the low-level optimization problem. For example, low-level optimizer 812 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. Table 2 illustrates the variables that can be included in each of these vectors:

TABLE 2

Variables in Low-Level Optimization

| | | |
|---|---|---|
| States | $x = [T_i \; \bar{\epsilon}i \; Q_{total}]^T$ | $n = 2n_z + 1$ |
| Inputs | $u = [T_{sp,i}]^T$ | $m = n_z$ |
| Measurements | $y = [T_i \; Q_{total}]^T$ | $p = n_z + 1$ |
| Disturbances | $d = [T_a \; \dot{Q}_{other,i} \; \dot{Q}_{ss,i}]^T$ | $n_d = 2n_z + 1$ |

As shown in Table 2, the system states vector x includes the zone temperature $T_i$, the integral of the zone tracking error $\bar{\epsilon}_i$, and the total thermal energy delivered to the airside subsystem. In some embodiments, the system states vector x includes a zone temperature $T_i$ and an integrated zone tracking error $\bar{\epsilon}_i$ for each of the $n_z$ zones and single total thermal energy value such that the total number n of variables in the system states vector x is equal to $2n_z+1$. The inputs vector u can include the temperature setpoint $T_{sp,i}$. In some embodiments, the inputs vector u includes a temperature setpoint $T_{sp,i}$ for each of the $n_z$ zones such that the total number m of variables in the inputs vector u is equal to $n_z$.

In some embodiments, the measurements vector y is the same as the system states vector x, but without the integrated zone tracking error $\bar{\epsilon}_i$. This indicates that the zone temperature $T_i$ and the total amount of thermal energy delivered $Q_{total}$ are directly measured. The value of the integrated zone tracking error $\bar{\epsilon}_i$ can be calculated from the difference between $T_{i,sp}$ and $T_i$. The disturbance vector d can include the ambient air temperature $T_a$, the estimated disturbance $\dot{Q}_{other,i}$ for each zone, and the steady-state rate of heating/cooling $\dot{Q}_{ss,i}$ for each zone. In some embodiments, the disturbances vector d includes an estimated disturbance $\dot{Q}_{other,i}$ and a steady-state rate of heating/cooling $\dot{Q}_{ss,i}$ for each of the $n_z$ buildings and a single ambient air temperature $T_a$ such that the total number $n_d$ of variables in the disturbances vector d is equal to $n_z+1$.

In some embodiments, the system states x can be constructed or predicted from the measurements y. For example, low-level airside MPC 612 can use a Kalman filter or other predictive technique to construct the system states x from the measurements y. The values of the A, B, C, and D, matrices in the state-space representation can be identified using a system identification technique. Examples of state prediction and system identification techniques which can be used by low-level MPC 612 are described in detail in U.S. Pat. No. 9,235,657.

Still referring to FIG. 8, low-level airside MPC 612 is shown to include a model aggregator 818. Model aggregator 818 can generate aggregate values for various building parameters and/or variables used in the low-level optimization. For example, model aggregator 818 can generate an aggregate building temperature $T_b$ for the low-level airside subsystem by aggregating the individual zone temperatures $T_i$ of each zone in the building. In some embodiments, model aggregator 818 generates the aggregate building temperature $T_b$ using the following equation:

$$T_b = \frac{\sum_{i=1}^{n_z} C_i T_i}{\sum_{i=1}^{n_z} C_i}$$

where $C_i$ is the thermal capacitance of zone i and $T_i$ is the temperature of zone i. The numerator of the previous equation represents the total amount of heat in the building, whereas the denominator represents the total thermal capacitance of the building. Both quantities are summed across all building zones i=1 . . . $n_z$. Model aggregator 818 can divide the total amount of heat by the total thermal capacitance to estimate an average building temperature $T_b$. Model aggregator 818 can calculate an aggregate building temperature $T_{b,k}$ for each time step k of the optimization period.

Model aggregator 818 can calculate aggregate values for other building parameters or variables such as the building thermal capacitance $C_b$, the building heat transfer coefficient $H_b$, and the estimated building disturbance $\dot{Q}_{other,b}$. In some embodiments, model aggregator 818 calculates the aggregate values for these variables and parameters using the following equations:

$$C_b = \sum_{i=1}^{n_z} C_i$$

$$H_b = \sum_{i=1}^{n_z} H_i$$

$$\dot{Q}_{other,b} = \sum_{i=1}^{n_z} \dot{Q}_{other,i}$$

where the building thermal capacitance $C_b$ is the summation of the zone thermal capacitance $C_i$ values for each building zone, the building heat transfer coefficient $H_b$ is the summation of the zone heat transfer coefficients $H_i$ values for each building zone, and the estimated building disturbance $\dot{Q}_{other,b}$ is the summation of the estimated building disturbances $\dot{Q}_{other,i}$ for each building zone. Model aggregator 818 can calculate aggregate values of $C_{b,k}$, $H_{b,k}$, and $\dot{Q}_{other,b,k}$ or each time step k of the optimization period.

In some embodiments, model aggregator 818 provides the aggregate building parameters and variables $T_b$, $C_b$, $H_b$, and $\dot{Q}_{other,b}$ to high-level MPC 608. High-level MPC 608 can use such values as inputs to the high-level models, constraints, and optimization function used in the high-level optimization. Advantageously, the model aggregation performed by model aggregator 818 helps to reduce the amount of information exchanged between each low-level airside MPC 612-616 and high-level MPC 608. For example, each low-level MPC 612-616 can provide high-level MPC 608 with the aggregate values described above rather than individual values of such variables and parameters for each building zone.

Still referring to FIG. 8, low-level airside MPC 612 is shown to include a temperature tracker 822. In some embodiments, temperature tracker 822 performs an alternative optimization which can supplement or replace the low-level optimization performed by low-level optimizer 812. Rather than minimizing the total thermal energy $Q_{total,N}$ used by the low-level airside subsystem, temperature tracker 822 can generate zone temperature setpoints $T_{sp,i}$ which track the predicted building temperature states $T_{b,k}$ generated by high-level MPC 608 as a result of the high-level optimization. For example, high-level MPC 608 can calculate the building temperature states $\hat{T}_{b,k}$ for each low-level airside subsystem 632-636 predicted to result from the load profiles generated by high-level MPC 608. As described above, the predicted temperature states $\hat{T}_{b,k}$ can be calculated using a Kalman filter or any other type of state prediction technique. High-level MPC 608 can provide the predicted temperature states $\hat{T}_{b,k}$ to each low-level airside MPC 612-616 for use in the temperature tracking process.

Temperature tracker 822 is shown receiving the predicted temperature states $\hat{T}_{b,k}$ via communications interface 802. Temperature tracker 822 can also receive the aggregate building temperatures $T_{b,k}$ generated by model aggregator 818. Temperature tracker 822 can formulate an objective function which seeks to minimize the error between the aggregate building temperatures $T_{b,k}$ and the predicted temperature states $\hat{T}_{b,k}$, as shown in the following equation:

$$\sum_{k=1}^{N} \frac{1}{2} \|T_{b,k} - \hat{T}_{b,k}\|^2 + \mu Q_{total,N}$$

where $\mu$ is a small penalty factor applied to the total amount of thermal energy $Q_{total,N}$ used by the airside subsystem over the optimization period. The value of $\mu$ can be adjusted to increase or decrease the weight assigned to the total amount of thermal energy $Q_{total,N}$ relative to the temperature tracking error.

Temperature tracker 822 can use the previous equation as the objective function in an optimization procedure to determine optimal values for the zone temperature setpoints $T_{sp,i}$. The optimization performed by temperature tracker 822 can be similar to the optimization performed by low-level optimizer 812, with the exception that temperature tracker 822 is not constrained by the load profile provided by high-level MPC 608 and seeks to optimize a different objective function. For example, temperature tracker 822 can minimize the objective function:

$$\min_{x,u} \sum_{k=1}^{N} \frac{1}{2} \|T_{b,k} - \hat{T}_{b,k}\|^2 + \mu Q_{total,N}$$

subject to the following constraints:

$$C_i \frac{dT_i}{dt} = -H_i(T_i - T_a) - \sum_{j \neq i} \beta_{i,j}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_{min} \leq T_i \leq T_{max}$$

$$Q_{total,k+1} - Q_{total,k} \geq 0$$

$$\dot{Q}_{c,i} = f(T_i, T_{sp,i})$$

where the function $f$ is defined according to the following relationship between $\dot{Q}_{c,i}$, $T_i$, and $T_{i,sp}$ $$\dot{Q}_{c,i} = \dot{Q}_{ss,i} + K_{c,i}\left[\varepsilon_i + \frac{1}{\tau_{I,i}} \int_0^\tau \varepsilon_i(t')dt'\right]$$

$$\varepsilon_i = T_{sp,i} - T_i$$

In some embodiments, temperature tracker 822 converts one or more of the above-identified models and/or constraints to state-space form for use in the low-level optimization problem. For example, temperature tracker 822 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. The variables included in each vector can be the same as shown in Table 2 above.

Simulation Study

Referring now to FIGS. 9-13, several graphs 900-1350 illustrating the results of a simulation study are shown, according to some embodiments. The simulation study involved using model predictive control system 600 to monitor and control a five-zone building with a large active TES tank. Each of graphs 900-1350 shows a set of values for a particular variable or parameter as a function of time. Some variables or parameters can be received as input data to control system 600 (e.g., weather data, utility rates, etc.), whereas other variables or parameters can be calculated and/or optimized by control system 600 as previously described.

Figure 9:
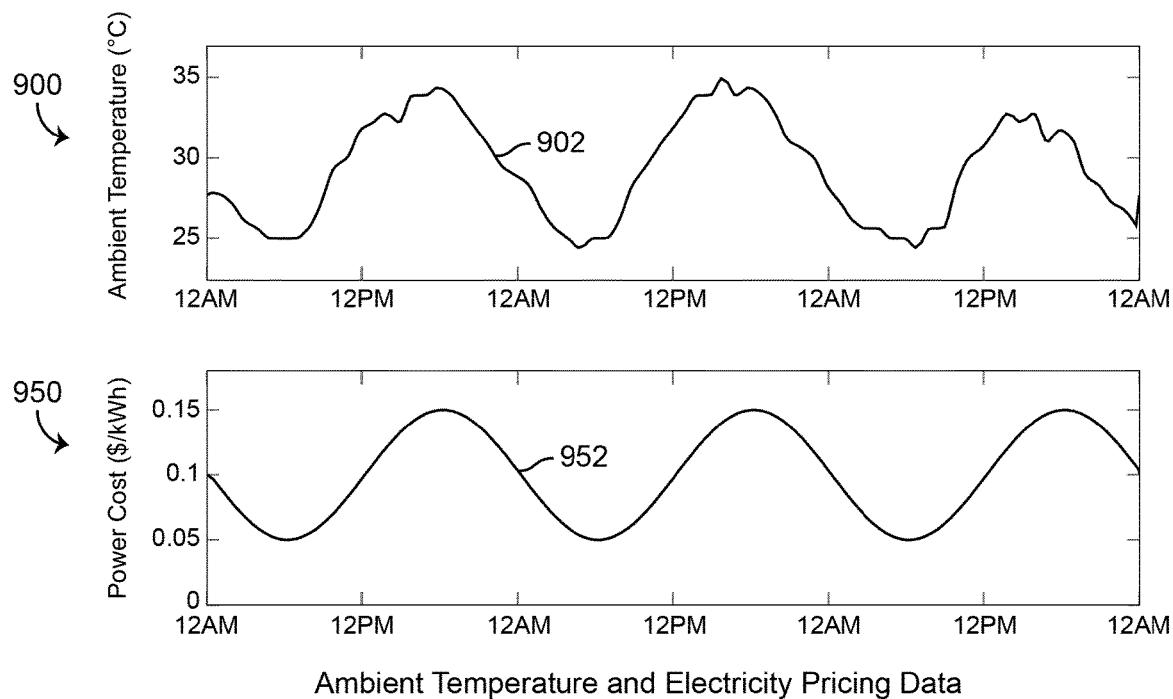
FIG. 9 is a graph of ambient temperature and power cost as a function of time, both of which can be provided as inputs to the high-level model predictive controller of FIGS. 6-7, according to some embodiments.

FIG. 9 shows the weather and electricity pricing data for the duration of an optimization period. Graph 900 illustrates ambient temperature 902 as a function of time. Ambient temperature 902 can be received as a weather forecast from a weather service 604 and used to determine appropriate values for the variable $T_a$ in the high-level and low-level optimizations. Graph 950 illustrates electricity pricing 952 as a function of time. Electricity pricing 954 can be received as an input from utilities 606 and/or predicted by load/rate predictor 602.

Figure 10:
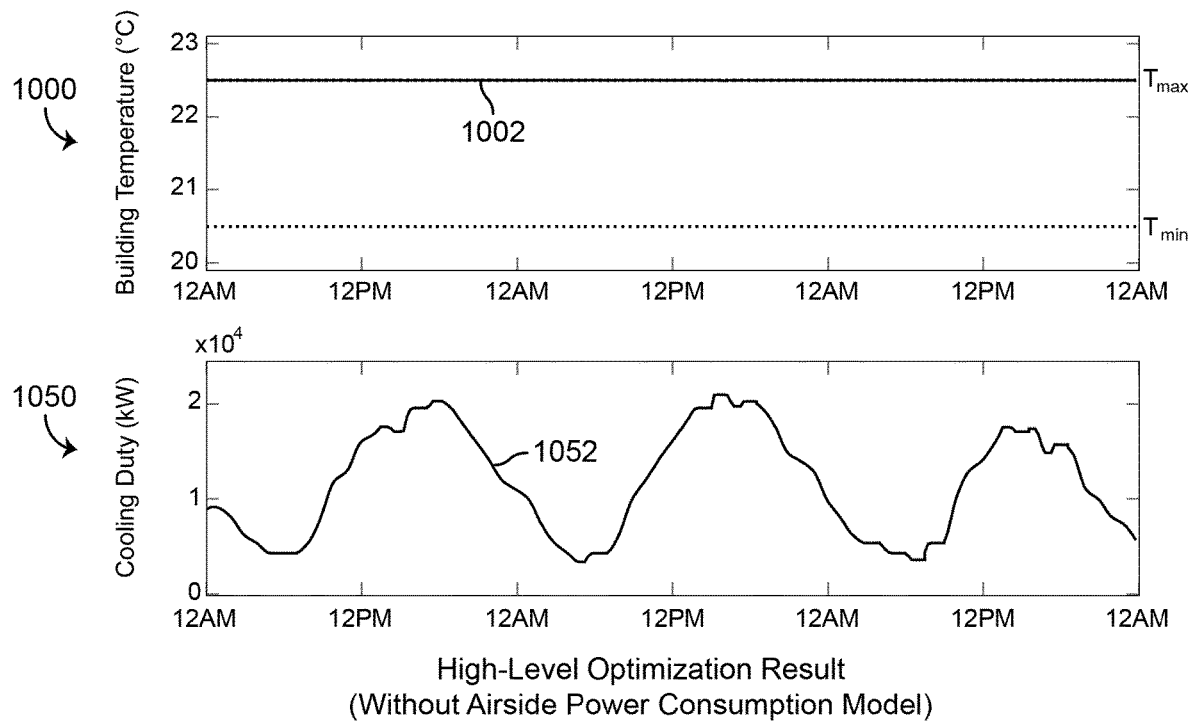
FIG. 10 is a graph of building temperature and cooling duty as a function of time, both of which can be provided as results of a high-level optimization performed by the high-level model predictive controller of FIGS. 6-7 when the cost of airside power consumption is not included in the high-level optimization, according to some embodiments.

FIG. 10 shows the results of the high-level optimization performed by high-level MPC 608 when the cost of airside power consumption is not included in the high-level optimization function. Graph 1000 illustrates building temperature 1002 (e.g., building temperature $T_b$, building temperature $\hat{T}_b$) as a function of time. Building temperature 1002 can be measured as an output of the building (e.g., using equipment of airside subsystem 632) and/or predicted as a result of the high-level optimization. When airside power consumption is not included, high-level MPC 608 may choose to keep the building temperature at the upper bound of the comfort zone (i.e., $T_{max}$) at all times.

Graph 1050 illustrates the cooling duty 1052 of airside subsystem 632 (e.g., $\dot{Q}_{c,b}$) as a function of time. Cooling duty 1052 is an example of a load profile which can be optimized by high-level MPC 608 for each airside subsystem and provided to the low-level airside MPC 612-616 for the airside subsystem. Cooling duty 1052 can be calculated by high-level MPC 608 as a result of the optimal building temperature 1002. In some embodiments, high-level MPC 608 does not utilize passive thermal energy storage when airside power consumption is not included, but rather only uses active TES (e.g., TES tanks) for shifting the waterside power load.

Figure 11:
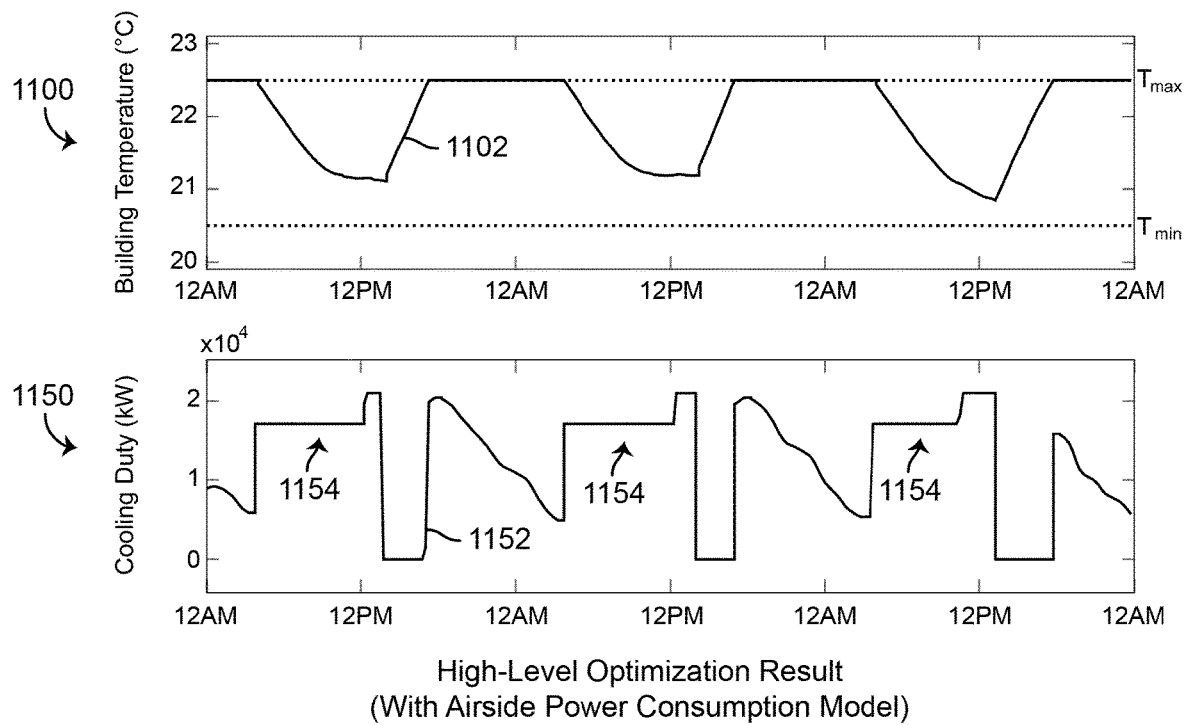
FIG. 11 is a graph of building temperature and cooling duty as a function of time, both of which can be provided as results of the high-level optimization performed by the high-level model predictive controller of FIGS. 6-7 when the cost of airside power consumption is included in the high-level optimization, according to some embodiments.

FIG. 11 shows the results of the high-level optimization performed by high-level MPC 608 when the cost of airside power consumption is included in the high-level optimization function. Graph 1100 illustrates building temperature 1102 (e.g., building temperature $T_b$, building temperature $\hat{T}_b$) as a function of time. Building temperature 1102 can be measured as an output of the building (e.g., using equipment of airside subsystem 632) and/or predicted as a result of the high-level optimization. When airside power consumption is included, high-level MPC 608 may choose to precool the building using passive TES before the peak period when electricity prices are highest.

Graph 1150 illustrates the cooling duty 1152 of airside subsystem 632 (e.g., $\dot{Q}_{c,b}$) as a function of time. Cooling duty 1152 is an example of a load profile which can be optimized by high-level MPC 608 for each airside subsystem and provided to the low-level airside MPC 612-616 for the airside subsystem. Cooling duty 1152 can be calculated by high-level MPC 608 as a result of the optimal building temperature 1102. In some embodiments, high-level MPC 608 uses passive thermal energy storage when airside power consumption is included, which allows high-level MPC 608 to shift the load from peak to non-peak periods. The flat portions 1154 of the cooling duty profile can result from high-level MPC 608 attempting to smooth cooling duty 1152 to reduce the peak demand charge.

Figure 12:
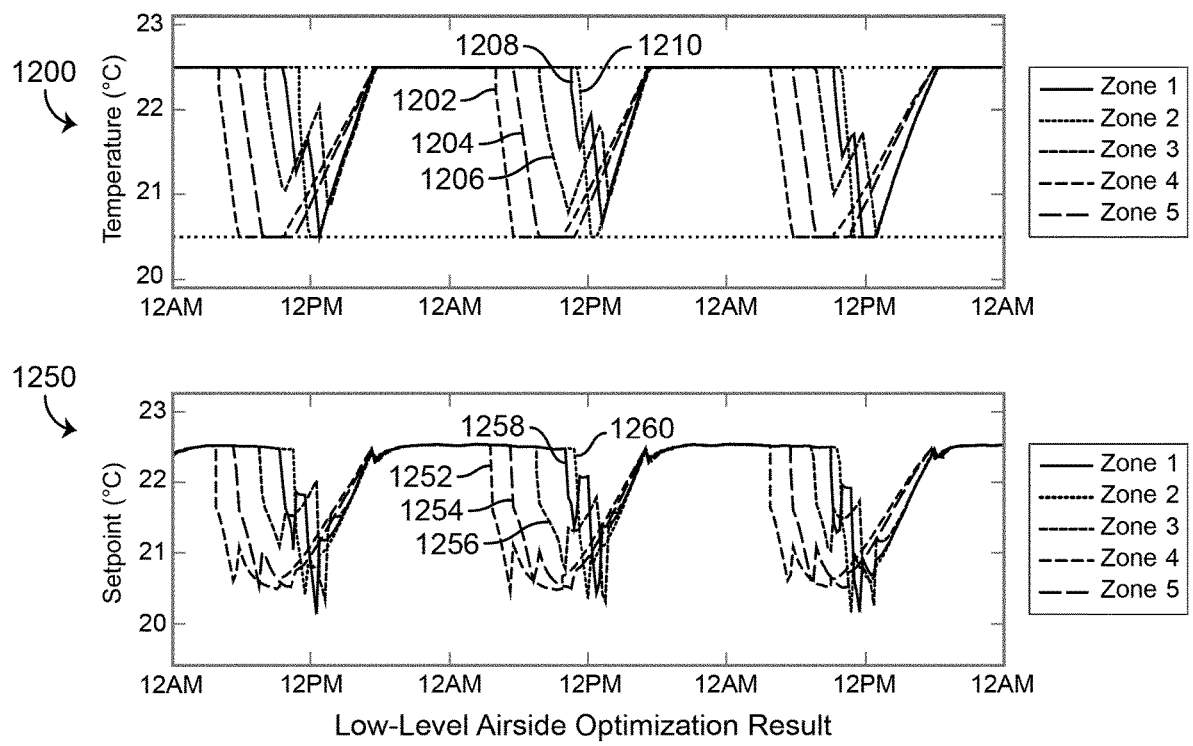
FIG. 12 is a graph of zone temperatures and zone temperature setpoints as a function of time, both of which can be provided as results of a low-level optimization performed by the low-level model predictive controller of FIGS. 6 and 8, according to some embodiments.

FIG. 12 shows the results of the low-level airside optimization performed by low-level airside MPC 612. Graph 1200 illustrates the zone temperatures 1202, 1204, 1206, 1208, and 1210 (e.g., $T_i$) for several building zones as a function of time. Zone temperatures 1202-1210 can be measured as an output of the zones (e.g., using equipment of airside subsystem 632) and/or predicted as a result of the low-level optimization. When precooling occurs, the zone temperatures 1202-1210 begin decreasing at different (e.g., staggered or offset) times to reduce the overall building load at any given time. This is a result of low-level airside MPC 612 complying with the cooling duty limit (e.g., the value of cooling duty 1102 or 1152) received from high-level MPC 608.

Graph 1250 illustrates the temperature setpoints 1252, 1254, 1256, 1258, and 1260 (e.g., $T_{sp,i}$) for several building zones as a function of time. Zone temperature setpoints 1252-1260 can be calculated by low-level airside MPC 612 as a result of the low-level airside optimization. For example, low-level airside MPC 612 can use the cooling duty model defining a relationship between $\dot{Q}_{c,i}$, $T_{sp,i}$, and $T_i$ to determine the appropriate temperature setpoints $T_{sp,i}$ for each building zone. In some embodiments, low-level airside MPC 612 causes the zone temperature setpoints 1252-1260 to begin decreasing at different (e.g., staggered or offset) times to reduce the overall building load at any given time and/or to achieve the temperatures $T_i$ shown in graph 1200.

Figure 13:
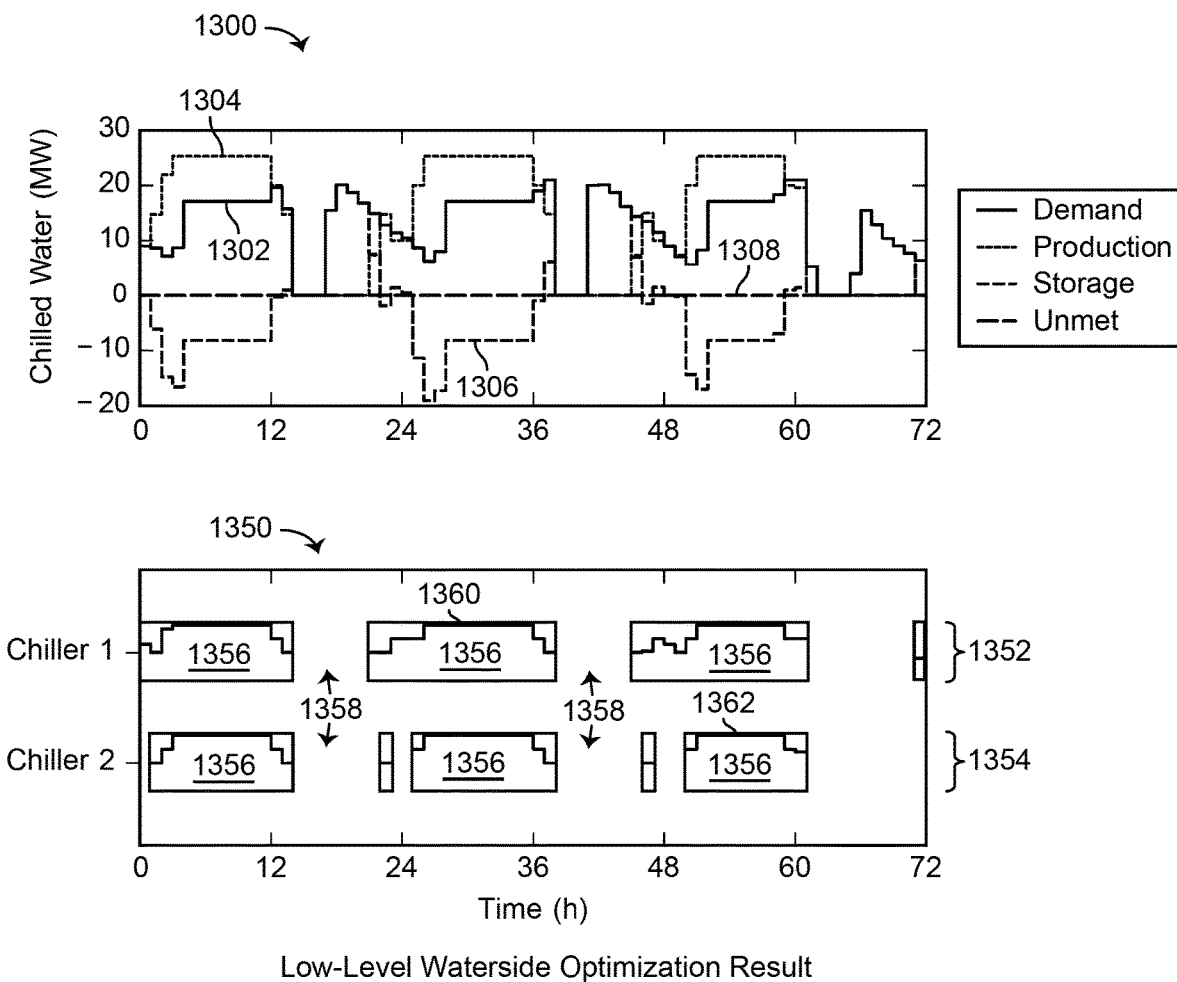
FIG. 13 is a graph of waterside demand, production, thermal energy storage, and waterside equipment utilization as a function of time, representing the performance of the waterside system of FIG. 6 resulting from the high-level optimization and a low-level waterside optimization, according to some embodiments.

FIG. 13 shows the results of the low-level waterside optimization performed by low-level waterside MPC 618. Graph 1300 illustrates how the demand 1302 from the high-level optimization is met using a combination of thermal energy production 1304 from chillers and thermal energy storage 1306 from the TES tank. Thermal energy storage 1306 can be positive to indicate that the TES tank is discharging stored thermal energy or negative to indicate that the TES tank is charging (e.g., filling) using a portion of the thermal energy production 1304. The unmet load 1308 represents an amount of the demand profile 1302 not met by either the production 1304 or the storage 1306. Unmet load 1308 can be assigned a penalty in the waterside optimization function to ensure that unmet loads do not occur unless the waterside equipment 628 cannot meet the total demand 1302.

Graph 1350 illustrates the equipment operating schedules 1352 and 1354 for two chillers used to satisfy the thermal energy production 1304. The regions in boxes 1356 indicate that the corresponding chiller is active, whereas the non-boxed regions 1358 indicate that chiller is not active. The loading fraction of each chiller (e.g., between zero and one) are indicated by load lines 1360 and 1362. With active TES available, the chillers can produce more chilled water when energy prices are low (e.g., overnight) to charge the TES tank. The TES tank can then be discharged when energy prices are high (e.g., during the day) to reduce the overall cost of electricity consumption.

Flow Diagrams

Figure 14:
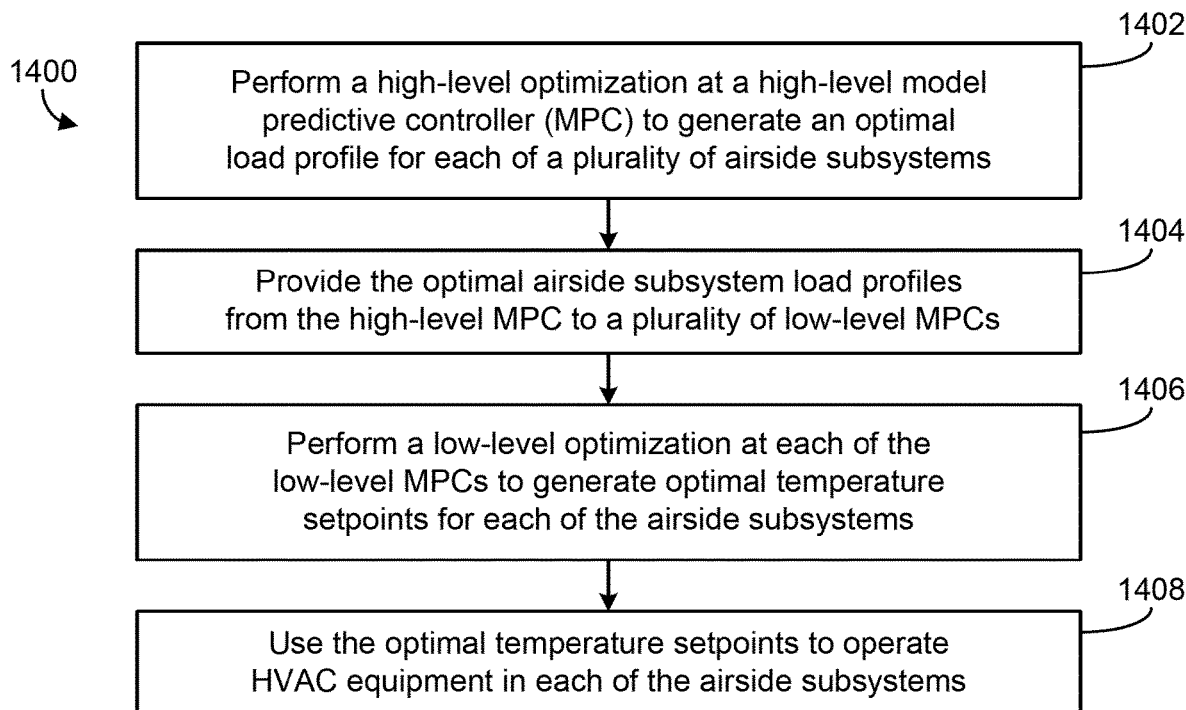
FIG. 14 is a flow diagram of a high-level and distributed low-level model predictive control technique which can be used to optimize energy cost in the MPC system of FIG. 6 when airside subsystem loads are used as constraints in the low-level optimizations, according to some embodiments.

Referring now to FIG. 14, a flow diagram 1400 illustrating a model predictive control technique which can be performed by MPC system 600 is shown, according to some embodiments. Flow diagram 1400 is shown to include performing a high-level optimization at a high-level model predictive controller (MPC) to generate an optimal load profile for each of a plurality of airside subsystems (block 1402). In some embodiments, the high-level optimization is performed by high-level MPC 608, as described with reference to FIGS. 6-7. For example, the high-level optimization can include generating a high-level energy cost function defining the energy cost as a function of a waterside demand profile $\dot{Q}_{HVAC}$. In some embodiments, the waterside demand profile $\dot{Q}_{HVAC}$ indicates a thermal energy production of the waterside system at each of a plurality of time steps k in an optimization period.

In some embodiments, high-level MPC 608 generates an energy cost function that accounts for the per-unit costs of energy consumption in waterside system 30 and the demand charge, but does not account for energy consumption in airside system 50. An example of such an energy cost function is shown in the following equation:

$$\text{Energy Cost} = \sum_{k=0}^{N-1} c_k \eta_{tot} \dot{Q}_{HVAC,k} \Delta + c_{peak} \eta_{tot} \dot{Q}_{peak}$$

The first term of the energy cost function accounts for the per-unit costs (e.g., $/kWh) of energy consumed during each time step k of the optimization period. In some embodiments, $c_k$ is the cost per unit of energy consumed at time step k to satisfy the total waterside demand $\dot{Q}_{HVAC,k}$ at time step k, the parameter $\eta_{tot}$ is the inverse of the coefficient of performance of the aggregate airside/waterside system (e.g., $0.1 \cdot \eta_{tot} \leq 0.25$), and $\Delta$ is the duration of time step k. Accordingly, the term $\eta_{tot} \dot{Q}_{HVAC,k} \Delta$ represents the total amount of energy consumed (e.g., kWh) during time step k to satisfy the waterside demand $\dot{Q}_{HVAC,k}$. Multiplying by the cost $c_k$ per unit energy consumed (e.g., $/kWh) yields the total cost (e.g., $) of the energy consumed during time step k. The energy cost function can include a summation of the energy costs during each time step k to determine the total cost of energy consumption over the optimization period.

The second term of the energy cost function accounts for the demand charge. In some embodiments, $c_{peak}$ is the demand charge rate (e.g., $/kW), $\dot{Q}_{peak}$ is the peak waterside demand during the demand charge period (e.g., the maximum of $\dot{Q}_{HVAC,k}$), and $\eta_{tot}$ is the inverse of the coefficient of performance of the aggregate airside/waterside system.

Accordingly, the term $\eta_{tot}\dot{Q}_{peak}$ represents the peak power consumption to satisfy the peak waterside demand $\dot{Q}_{peak}$. Multiplying by the demand charge rate $c_{peak}$ yields the total cost (e.g., $) of the demand charge.

In some embodiments, high-level MPC 608 generates an energy cost function that accounts for the per-unit costs of energy consumption in waterside system 30, the demand charge, and the energy consumption in airside system 50. An example of such an energy cost function is shown in the following equation:

$$\text{Energy Cost} = \sum_{k=0}^{N-1} c_k \left( \eta_{HVAC} \dot{Q}_{HVAC,k} + \eta_{air} \sum_{b=1}^{n_b} \dot{Q}_{c,b,k} \right) \Delta + c_{peak} \dot{W}_{peak}$$

The first portion of the energy cost function accounts for the per unit costs (e.g., $/kWh) of energy consumed by waterside system 30 during each time step k of the optimization period. In some embodiments, $c_k$ is the cost per unit of energy consumed at time step k, $\Delta$ is the duration of time step k, and $\eta_{HVAC}$ is the inverse of the coefficient of performance of waterside system 30 (e.g., $\eta_{HVAC}$~0.2). The term $\eta_{HVAC}\dot{Q}_{HVAC,k}$ represents the amount of power consumption (e.g., kW) by waterside system 30 during time step k to satisfy the waterside demand $\dot{Q}_{HVAC,k}$. Multiplying by the cost $c_k$ per unit energy consumed (e.g., $/kWh) and the duration $\Delta$ (e.g., hours) yields the total cost (e.g., $) of the energy consumed during time step k by waterside system 30. The first portion of the energy cost function can be summed across all time steps k=0 ... N−1 of the optimization period to determine the total energy consumed by waterside system 30 over the duration of the optimization period.

The second portion of the energy cost function accounts for the per unit costs (e.g., $/kWh) of energy consumed by each airside subsystem (e.g., each building b) during each time step k of the optimization period. As described above, $\eta_{air}$ is the inverse of the coefficient of performance of the airside subsystems (e.g., $\eta_{air}$~0.1) and $\dot{Q}_{c,b,k}$ is the thermal energy load delivered by the airside subsystem for building b at time step k. The term $\eta_{air}\dot{Q}_{c,b,k}$ represents the power consumption $\dot{W}_{air,b}$ of the airside equipment for building b. The second portion of the energy cost function can be summed across all buildings b=1 ... $n_b$ and across all time steps k=0 ... N−1 to determine the total power consumption of all airside subsystems over the duration of the optimization period. Multiplying by the cost $c_k$ per unit energy consumed (e.g., $/kWh) and the duration $\Delta$ (e.g., hours) yields the total cost (e.g., $) of the energy consumed by the airside subsystems over the duration of the optimization period.

The third portion of the energy cost function accounts for the demand charge. In some embodiments, $c_{peak}$ is the demand charge rate (e.g., $/kW) and $\dot{W}_{peak}$ is the peak aggregate airside and waterside power consumption during the applicable demand charge period. Multiplying by the demand charge rate $c_{peak}$ yields the total cost (e.g., $) of the demand charge.

In some embodiments, performing the high-level optimization in block 1402 includes using a waterside demand model to define the waterside demand profile $\dot{Q}_{HVAC}$ as a function of the plurality of airside subsystem load profiles $\dot{Q}_{c,b}$. Each airside subsystem load profile $\dot{Q}_{c,b}$ can indicate a thermal energy allocation to one of the airside subsystems at each of the plurality of time steps.

In some embodiments, the waterside demand model represents the demand on waterside system 30 as a function of the thermal energy load $\dot{Q}_{c,b}$ allocated to each airside subsystem and the amount of thermal energy storage $\dot{Q}_{storage}$ at each time step of the optimization period. An example of such a waterside demand model is shown in the following equation:

$$\dot{Q}_{HVAC,k} = \sum_{b=1}^{b_n} \dot{Q}_{c,b,k} + \dot{Q}_{storage,k}$$

where $\dot{Q}_{HVAC,k}$ is the waterside demand at time step k (e.g., the thermal energy production of waterside system 30 at time step k), $\dot{Q}_{c,b,k}$ is the thermal energy load allocated to building b at time step k, and $\dot{Q}_{storage,k}$ is the amount of thermal energy being stored in the TES tanks during time step k. The previous equation indicates that the total demand $\dot{Q}_{HVAC,k}$ on the waterside system 30 is a summation of the thermal energy loads $\dot{Q}_{c,b,k}$ allocated to each building b and the thermal energy $\dot{Q}_{storage,k}$ being stored in the TES tanks. This equation can be used by high-level MPC 608 as an energy balance constraint to ensure that waterside system 30 generates enough thermal energy to cover the building loads and the thermal energy storage at each time step k.

In some embodiments, the high-level optimization in block 1402 includes generating an airside subsystem temperature model for each of the plurality of airside subsystems. Each airside subsystem temperature model can define a relationship between the thermal energy allocation $\dot{Q}_{c,b}$ to an airside subsystem and a temperature $T_b$ of the airside subsystem. An example of such an airside subsystem temperature model is shown in the following equation:

$$C_b \frac{dT_b}{dt} = -H_b(T_b - T_a) - \dot{Q}_{c,b} + \dot{Q}_{other,b}$$

where $C_b$ and $T_b$ are the thermal capacitance and temperature of the airside subsystem designated by index b, $T_a$ is the ambient air temperature outside airside subsystem b (e.g., outside air temperature), $H_b$ is the heat transfer coefficient between airside subsystem b and the ambient air, $\dot{Q}_{c,b}$ is the amount of cooling applied to the airside subsystem by MPC system 600 (i.e., the amount of heat removed from the airside subsystem), and $\dot{Q}_{other,b}$ is the external load, radiation, or disturbance experienced by the airside subsystem b. If heating is provided to the airside subsystem rather than cooling, the sign on $\dot{Q}_{c,b}$ can be switched from a negative sign to a positive sign.

The high-level optimization can use the building disturbance estimates received from low-level airside controllers 612-616 to identify appropriate values of the external disturbance $\dot{Q}_{other,b}$ for each airside subsystem b at each time step of the optimization period. In some embodiments, the high-level optimization uses the weather forecasts from weather service 604 and/or the load and rate predictions provided by load/rate predictor 602 to determine appropriate values for the ambient air temperature $T_a$ and/or the external disturbance $\dot{Q}_{other,b}$ for each airside subsystem b at each time step of the optimization period. Values of $C_b$ and $H_b$ can be specified as parameters of the airside subsystem b, received from the low-level airside controller for the airside subsystem b, received from a user, retrieved from memory, or otherwise provided to high-level MPC 608. The high-level optimization can include generating a temperature model for each airside subsystem b, where b=1 ... $n_b$ and $n_b$ is the total number of airside subsystems.

In some embodiments, performing the high-level optimization in step 1402 includes optimizing the energy cost and the plurality of airside subsystem load profiles subject to constraints provided by the waterside demand model and each airside subsystem temperature model. The high-level optimization can use the energy cost model, demand charge model, building temperature model, thermal energy storage model, waterside demand model, and optimization constraints to formulate an optimization problem.

In some embodiments, the high-level optimization seeks to minimize the total cost of energy consumed by waterside system 30 (i.e., energy cost and demand charge) subject to the building temperature constraints and other constraints provided by the high-level models described herein. For example, the high-level optimization can formulate the high-level optimization problem as:

$$\min_{x,u,\dot{Q}_{peak}} \sum_{k=0}^{N-1} c_k \eta_{tot} \dot{Q}_{HVAC,k} \Delta + c_{peak} \eta_{tot} \dot{Q}_{peak}$$

subject to the following constraints:

$$C_b \frac{dT_b}{dt} = -H_b(T_b - T_a) - \dot{Q}_{c,b} + \dot{Q}_{other,b}$$

$$\frac{ds}{dt} = -\sigma s + \dot{Q}_{storage}$$

$$\dot{Q}_{HVAC,k} = \sum_{b=1}^{b_n} \dot{Q}_{c,b,k} + \dot{Q}_{storage,k}$$

$$0 \le \dot{Q}_{HVAC,k} \le \dot{Q}_{peak}$$

$$\dot{Q}_{peak,past} \le \dot{Q}_{peak} \le \dot{Q}_{HVAC,max}$$

$$0 \le s_k \le s_{max}$$

$$T_{min} \le T_b \le T_{max}$$

In some embodiments, the high-level optimization seeks to minimize the total cost of energy consumed by the aggregate airside/waterside system subject to the building temperature constraints and other constraints provided by the high-level models described herein. For example, the high-level optimization can formulate the high-level optimization problem as:

$$\min_{x,u,\dot{W}_{peak}} \sum_{k=0}^{N-1} c_k \left( \eta_{HVAC} \dot{Q}_{HVAC,k} + \eta_{air} \sum_{b=1}^{n_b} \dot{Q}_{c,b,k} \right) \Delta + c_{peak} \dot{W}_{peak}$$

subject to the following constraints:

$$C_b \frac{dT_b}{dt} = -H_b(T_b - T_a) - \dot{Q}_{c,b} + \dot{Q}_{other,b}$$

$$\frac{ds}{dt} = -\sigma s + \dot{Q}_{storage}$$

$$\dot{Q}_{HVAC,k} = \sum_{b=1}^{b_n} \dot{Q}_{c,b,k} + \dot{Q}_{storage,k}$$

$$0 \le \left( \eta_{HVAC} \dot{Q}_{HVAC,k} + \eta_{air} \sum_{b=1}^{n_b} \dot{Q}_{c,b,k} \right) \le \dot{W}_{peak}$$

$$\dot{W}_{peak,past} \le \dot{W}_{peak}$$

$$0 \le \dot{Q}_{HVAC,k} \le \dot{Q}_{HVAC,max}$$

$$0 \le s_k \le s_{max}$$

$$T_{min} \le T_b \le T_{max}$$

Still referring to FIG. 14, flow diagram 1400 is shown to include providing the optimal airside subsystem load profiles $\dot{Q}_{c,b}$ from the high-level MPC to a plurality of low-level MPCs (block 1404). Each load profile $\dot{Q}_{c,b}$ can be sent from high-level MPC 608 to one of low-level airside MPCs 612-616, as shown in FIG. 6. In some embodiments, each low-level airside MPC is configured to monitor and control a particular airside subsystem. Each low-level airside MPC can receive the optimal subsystem load profile for the airside subsystem monitored and controlled by that low-level airside MPC.

Flow diagram 1400 is shown to include performing a low-level optimization at each of the low-level MPCs to generate optimal temperature setpoints for each of the airside subsystems (block 1406). In some embodiments, the low-level optimization in block 1406 includes generating a zone temperature model for each zone i of each airside subsystem. The zone temperature model can define a relationship between the temperature $T_i$ of the zone and the thermal energy load profile $\dot{Q}_{c,i}$ for the zone. An example of such a zone temperature model is shown in the following equation:

$$C_i \frac{dT_i}{dt} = -H_i(T_i - T_a) - \sum_{j \ne i} \beta_{ij}(T_i - T_j) - \dot{Q}_{c,i} + \dot{Q}_{other,i}$$

where $C_i$ and $T_i$ are the thermal capacitance and temperature of the building zone designated by zone index i, $T_a$ is the ambient air temperature outside zone i (e.g., outside air temperature), $H_i$ is the heat transfer coefficient between zone i and the ambient air, $\dot{Q}_{c,i}$ is the amount of cooling applied to the building zone i by MPC system 600 (i.e., the amount of heat removed from the zone), and $\dot{Q}_{other,i}$ is the external load, radiation, or disturbance experienced by zone i. If heating is provided to the zone rather than cooling, the sign on $\dot{Q}_{c,i}$ can be switched from a negative sign to a positive sign.

The parameter $\beta_{ij}$ characterizes the degree of coupling between zone i and another zone j (e.g., a building zone adjacent to zone i). If zones i and j are not adjacent and/or do not directly exchange heat with each other, zone temperature modeler 814 can set the value of $\beta_{ij}$ equal to zero. The zone temperature model can include a summation of the heat transfers between building zone i and each other building zone j≠i as a function of the zone temperatures $T_i$ and $T_j$ and the coupling coefficient $\beta_{ij}$. In other embodiments, heat transfer between zones can be accounted for using the external disturbance estimate $\dot{Q}_{other,i}$.

The low-level optimization can include using the zone disturbance estimates received from zone disturbance predictor 824 to identify appropriate values of the external disturbance $\dot{Q}_{other,i}$ for each zone i at each time step of the optimization period. In some embodiments, the low-level optimization uses the weather forecasts from weather service 604 and/or the load and rate predictions provided by load/rate predictor 602 to determine appropriate values for the ambient air temperature $T_a$ and/or the external disturbance $\dot{Q}_{other,i}$ for each zone i at each time step of the optimization period. Values of $C_i$ and $H_i$ can be specified as parameters of the zone i, received from the BMS that manages the building zone i, received from a user, retrieved from memory 808, or otherwise provided to zone temperature modeler 814.

In some embodiments, the low-level optimization in block 1406 includes generating a model of the total amount of thermal energy delivered to the airside subsystem $\dot{Q}_{total}$ (e.g., the total amount of heating or cooling delivered to the building) as a function of the individual zone loads $\dot{Q}_{c,i}$. In some embodiments, the low-level optimization includes modeling the total building load using the following equation:

$$\frac{dQ_{total}}{dt} = \sum_{i=1}^{n_z} \dot{Q}_{c,i}$$

where $Q_{total}$ is the total amount of thermal energy (e.g., heating or cooling) delivered to the airside subsystem and $\dot{Q}_{c,i}$ is the rate at which thermal energy is being delivered (units of power) of a particular zone i. The building load model can sum the thermal energy loads $\dot{Q}_{c,i}$ of each building zone to calculate the total airside subsystem thermal energy load $$\frac{dQ_{total}}{dt},$$

which is the derivative of the total amount of thermal energy $Q_{total}$ delivered to the airside subsystem.

In some embodiments, the low-level optimization includes generating one or more models that define the thermal energy load $\dot{Q}_{c,i}$ of each building zone as a function of the zone temperature $T_i$ and the zone temperature setpoint $T_{sp,i}$ as shown in the following equation:

$$\dot{Q}_{c,i} = f(T_i, T_{sp,i})$$

The models generated by the low-level optimization can be used as optimization constraints to ensure that the thermal energy load $\dot{Q}_{c,i}$ is not reduced to a value that would cause the zone temperature $T_i$ to deviate from an acceptable or comfortable temperature range.

In some embodiments, the low-level optimization in block 1406 seeks to minimize the total amount of thermal energy $Q_{total,N}$ used by the airside subsystem over the optimization period subject to the zone temperature constraints and other constraints provided by the low-level airside models described herein. For example, the low-level optimization can formulate the low-level optimization problem as:

$$\min_{x,u} Q_{total,N}$$

subject to the following constraints:

$$C_i \frac{dT_i}{dt} = -H_i(T_i - T_a) - \sum_{j \neq i} \beta_{i,j}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_{min} \leq T_i \leq T_{max}$$

$$\frac{Q_{total,k+1} - Q_{total,k}}{\Delta} \leq \dot{Q}_{c,b,k}$$

$$Q_{total,k+1} - Q_{total,k} \geq 0$$

$$\dot{Q}_{c,i} = f(T_i, T_{sp,i})$$

where the function $f$ is defined according to the following relationship between $\dot{Q}_{c,i}$, $T_i$, and $T_{i,sp}$ $$\dot{Q}_{c,i} = \dot{Q}_{ss,i} + K_{c,i}\left[\varepsilon_i + \frac{1}{\tau_{I,i}} \int_0^t \varepsilon_i(t')dt'\right]$$

$$\varepsilon_i = T_{sp,i} - T_i$$

Still referring to FIG. 14, flow diagram 1400 is shown to include using the optimal temperature setpoints to operate HVAC equipment in each of the airside subsystems (block 1408). For example, each low-level airside MPC 612-616 can operate the airside HVAC equipment 622-626 of the corresponding airside subsystem 632-636. Airside equipment 622-626 can include some or all of the equipment of airside system 50, airside system 130, and/or airside system 300, as described with reference to FIGS. 1A-1B and FIG. 3. Operating airside equipment 622-626 can include activating or deactivating the equipment, adjusting an operating setpoint, or otherwise controlling the airside equipment.

Figure 15:
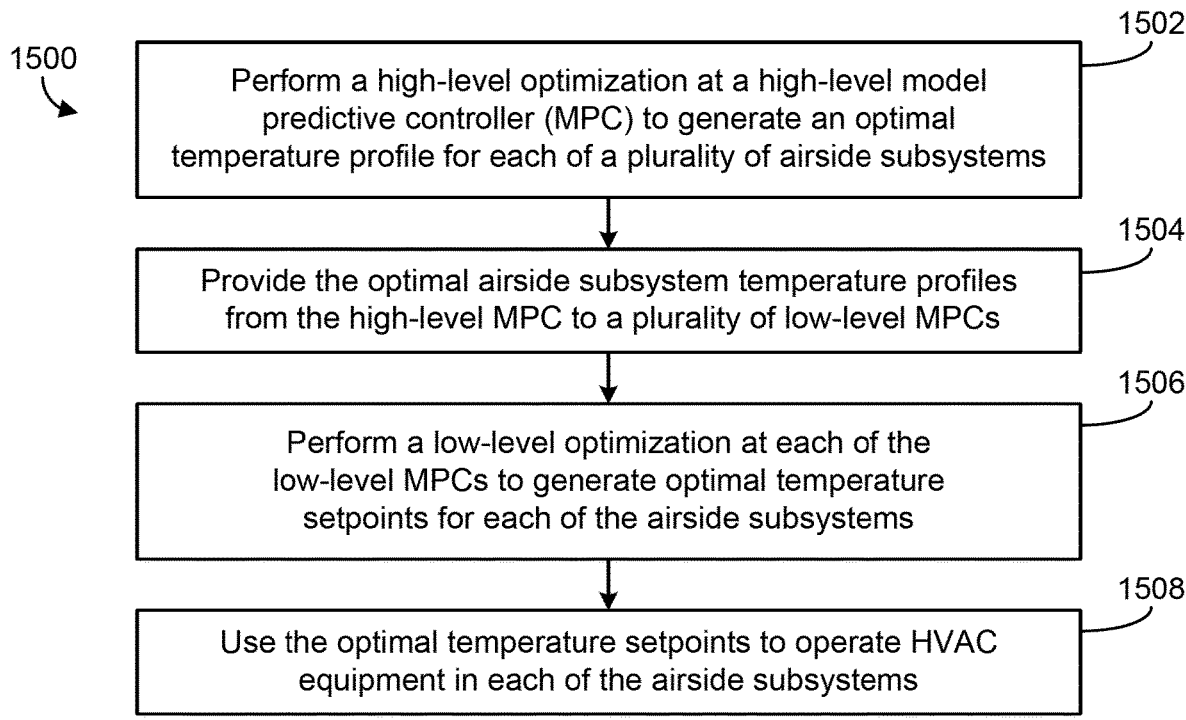
FIG. 15 is another flow diagram of a high-level and distributed low-level model predictive control technique which can be used to optimize energy cost in the MPC system of FIG. 6 when the low-level optimizations track temperature profiles provided by the high-level optimization, according to some embodiments.

Referring now to FIG. 15, a flow diagram 1500 illustrating a model predictive control technique which can be performed by MPC system 600 is shown, according to some embodiments. Flow diagram 1500 is shown to include performing a high-level optimization at a high-level model predictive controller (MPC) to generate an optimal temperature profile for each of a plurality of airside subsystems (block 1502). In some embodiments, the high-level optimization is performed by high-level MPC 608, as described with reference to FIGS. 6-7. The high-level optimization can be the same or similar to the high-level optimization described with reference to FIG. 14.

The high-level optimization in block 1502 can generate an optimal temperature profile $\hat{T}_b$ for each airside subsystem. The optimal temperature profile $\hat{T}_b$ can include a vector of predicted temperature states $\hat{T}_b$ for each low-level airside subsystem 632-636. Each vector of predicted temperature states $\hat{T}_b$ can include a predicted building temperature state $\hat{T}_{b,k}$ for each time step k during the optimization period. Temperature states $\hat{T}_{b,k}$ can be predicted using any of a variety of predictive techniques including, for example, a Kalman filter as described in U.S. Pat. No. 9,235,657.

Flow diagram 1500 is shown to include providing the optimal airside subsystem temperature profiles $\hat{T}_b$ from the high-level MPC to a plurality of low-level MPCs (block 1504). Each subsystem temperature profiles $\hat{T}_b$ can be sent from high-level MPC 608 to one of low-level airside MPCs 612-616. In some embodiments, each low-level airside MPC is configured to monitor and control a particular airside subsystem. Each low-level airside MPC can receive the optimal subsystem temperature profile $\hat{T}_b$ for the airside subsystem monitored and controlled by that low-level airside MPC.

Flow diagram 1500 is shown to include performing a low-level optimization at each of the low-level MPCs to generate optimal temperature setpoints for each of the airside subsystems (block 1506). The low-level optimization in block 1506 can be similar to the low-level optimization in block 1406. However, the low-level optimization in block 1506 can formulate the low-level optimization problem to track the optimal temperatures generated by the high-level optimization in block 1502 rather than minimizing total amount of thermal energy used.

In some embodiments, the low-level optimization in block 1506 can be formulated as:

$$\min_{x,u} \sum_{k=1}^{N} \frac{1}{2} \left\| T_{b,k} - \hat{T}_{b,k} \right\|^2 + \mu Q_{total,N}$$

subject to the following constraints:

$$C_i \frac{dT_i}{dt} = -H_i(T_i - T_a) - \sum_{j \neq i} \beta_{ij}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_{min} \leq T_i \leq T_{max}$$

$$Q_{total,k+1} - Q_{total,k} \geq 0$$

$$\dot{Q}_{c,i} = f(T_i, T_{sp,i})$$

where the function $f$ is defined according to the following relationship between $\dot{Q}_{c,i}$, $T_i$, and $T_{i,sp}$ $$\dot{Q}_{c,i} = \dot{Q}_{ss,i} + K_{c,i} \left[ \varepsilon_i + \frac{1}{\tau_{I,i}} \int_0^\tau \varepsilon_i(t') dt' \right]$$

$$\varepsilon_i = T_{sp,i} - T_i$$

Still referring to FIG. 15, flow diagram 1500 is shown to include using the optimal temperature setpoints to operate HVAC equipment in each of the airside subsystems (block 1508). For example, each low-level airside MPC 612-616 can operate the airside HVAC equipment 622-626 of the corresponding airside subsystem 632-636. Airside equipment 622-626 can include some or all of the equipment of airside system 50, airside system 130, and/or airside system 300, as described with reference to FIGS. 1A-1B and FIG. 3. Operating airside equipment 622-626 can include activating or deactivating the equipment, adjusting an operating setpoint, or otherwise controlling the airside equipment.

Referring generally to FIGS. 16A-25, a model predictive control (MPC) system for a variable refrigerant flow (VRF) system is shown, according to some embodiments. MPC is a control technique that uses a model of a controlled system to relate system inputs (e.g., control actions, setpoints, etc.) to system states and system outputs (e.g., measurements, process variables, etc.). The model can be used to predict the system states and system outputs based on the actions taken by a controller at each time step during an optimization period. At each time step, MPC solves an online optimization problem using the system model to determine a sequence of control actions that achieve an objective (e.g., minimizing tracking error, minimizing energy cost, etc.) while respecting process constraints such as equipment capacity and safety bounds (e.g., temperature constraints, equipment switching constraints, etc.). The first control action in the sequence is implemented and the optimization problem is solved again at the next time step after new measurements are obtained.

The MPC system described herein can optimize (e.g., minimize) the total cost of energy used to provide heating and/or cooling to a building or campus. Numerous studies have shown that MPC outperforms existing control systems due to its ability to forecast into the future and anticipate events before they occur. MPC enables shifting of the energy load from peak hours to off-peak hours by using the mass of the building for passive thermal energy storage (TES). Energy costs can be decreased by concentrating equipment usage to times of low resource prices, all while maintaining comfort limits within each building.

In some embodiments, the MPC system includes a MPC layer and a regulatory layer. The MPC layer can receive measurements from the regulatory layer and provide setpoints to the regulatory layer. The MPC layer can generate optimal values for various decision variables including, for example, zone temperature setpoints, refrigerant flow rates, and equipment on/off decisions. The MPC layer can determine the optimal values of the decision variables using system models such a zone temperature to cooling/heating duty model, a cooling/heating duty to temperature setpoint model, and equipment models. The MPC layer can determine the optimal values of the decision variables by performing an optimization process subject to several constraints. The constraints can include comfort bounds on the zone air temperatures, equipment capacity constraints, refrigerant balance constraints, and rate of change bounds on the equipment of the regulatory layer.

Solving a single MPC problem to determine the optimal values for all of the decision variables can be difficult for large-scale applications. For example, some VRF systems can include thousands of discrete zones and thousands of unique HVAC devices. The discrete decisions (e.g., turning equipment on/off) can result in a mixed integer optimization problem, which further increases complexity. Due to the difficulty and computational complexity of the MPC problem, the MPC layer can decompose the overall MPC problem into smaller, more manageable, optimization problems.

The distributed MPC system can decompose the overall MPC problem into a high-level optimization problem and a low-level optimization problem. The high-level problem can be solved by a high-level model predictive controller to determine a load profile for each of a plurality of low-level indoor subsystems and a demand profile for an outdoor subsystem. The indoor subsystems can include indoor VRF units, whereas the outdoor subsystem can include outdoor VRF units. In some embodiments, the high-level controller uses aggregate low-level models for each indoor subsystem to reduce computational complexity. The high-level controller can determine load profiles that optimize (e.g., minimize) the total operational cost of the MPC system over the optimization period. Each load profile can include a load value for each time step in the optimization period. The high-level controller can provide the load profiles to a plurality of low-level indoor model-predictive controllers. The low-level indoor controllers can use the load profiles as constraints defining maximum permissible load values for each indoor subsystem for each time step in the optimization period.

The low-level optimization problem can be further decomposed into a low-level outdoor optimization problem and one or more low-level indoor optimization problems. Each low-level indoor problem can be solved by one of low-level indoor controllers to determine zone temperature setpoints and/or refrigerant flow setpoints for the indoor VRF units. Each low-level indoor controller can determine the zone temperature setpoints and/or refrigerant flow setpoints that optimize (e.g., minimize) the energy consumption of the corresponding indoor subsystem while maintaining zone temperatures within defined temperature limits and without exceeding the load values provided by the high-level controller. Alternatively, each low-level indoor controller can determine temperature setpoints and/or refrigerant flow setpoints that track the average indoor subsystem temperatures (e.g., predicted subsystem temperature states) from the high-level optimization problem. These and other components of the MPC system are described in greater detail below.

Variable Refrigerant Flow System

Figure 16A:
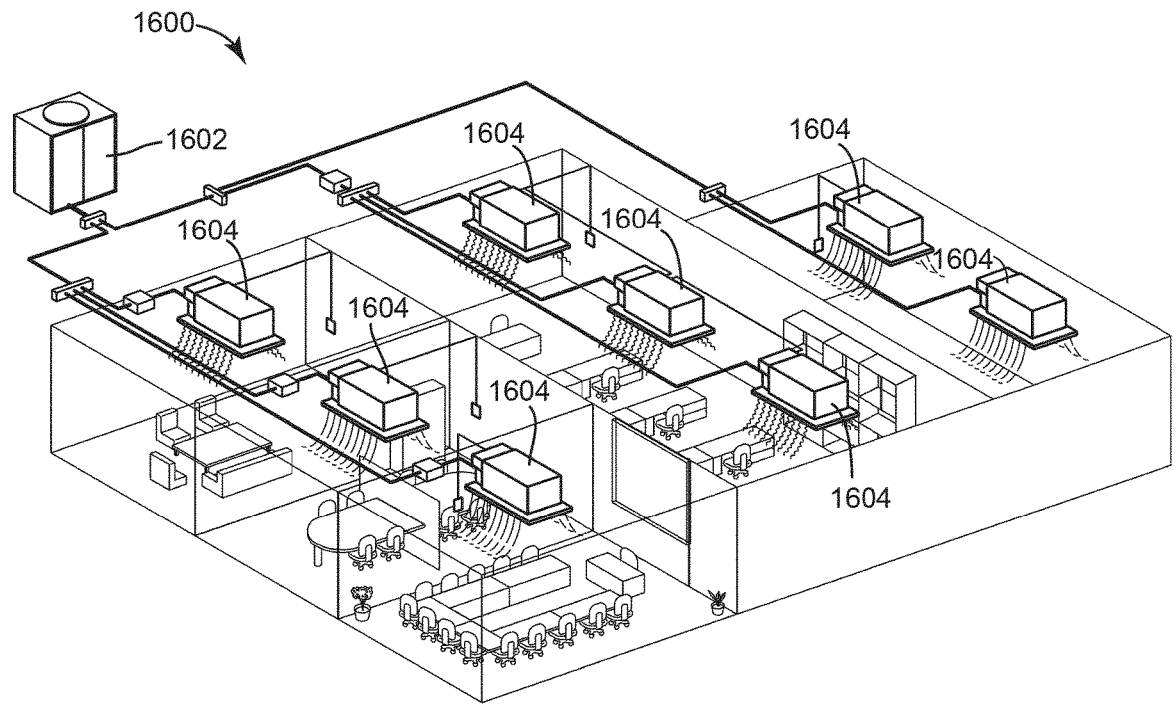
FIGS. 16A-16B are drawings of a variable refrigerant flow (VRF) system having one or more outdoor VRF units and a plurality of indoor VRF units, according to some embodiments.
Figure 16B:
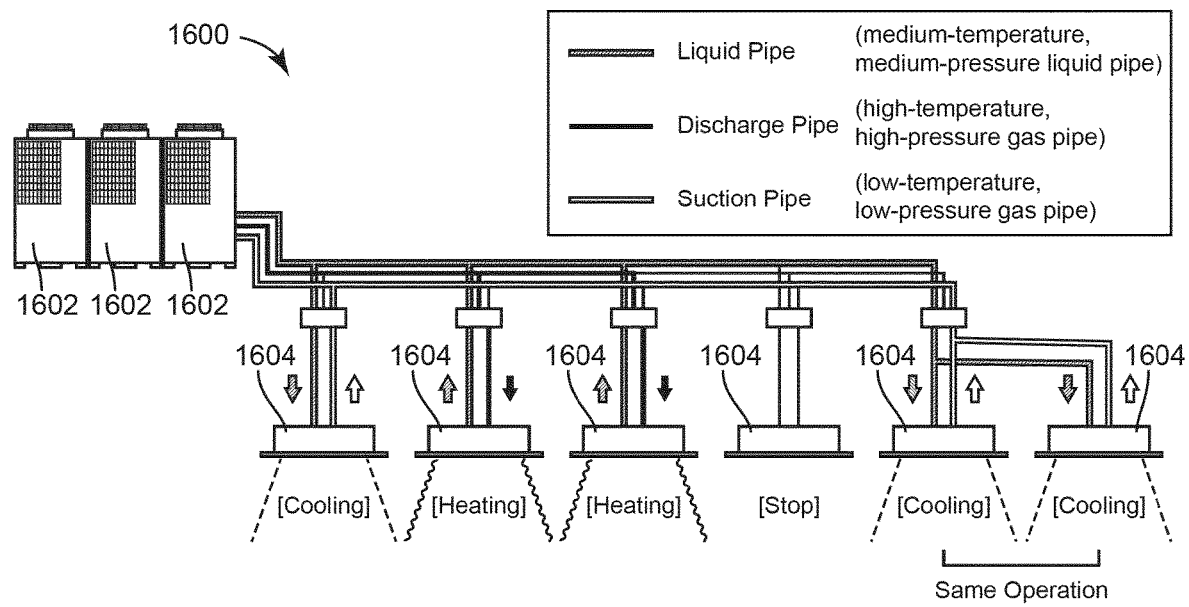

Referring now to FIGS. 16A-16B, a variable refrigerant flow (VRF) system 1600 is shown, according to some embodiments. VRF system 1600 is shown to include a plurality of outdoor VRF units 1602 and a plurality of indoor VRF units 1604. Outdoor VRF units 1602 can be located outside a building and can operate to heat or cool a refrigerant. Outdoor VRF units 1602 can consume electricity to convert refrigerant between liquid, gas, and/or super-heated gas phases. Indoor VRF units 1604 can be distributed throughout various building zones within a building and can receive the heated or cooled refrigerant from outdoor VRF units 1602. Each indoor VRF unit 1604 can provide temperature control for the particular building zone in which the indoor VRF unit is located.

A primary advantage of VRF systems is that some indoor VRF units 1604 can operate in a cooling mode while other indoor VRF units 1604 operate in a heating mode. For example, each of outdoor VRF units 1602 and indoor VRF units 1604 can operate in a heating mode, a cooling mode, or an off mode. Each building zone can be controlled independently and can have different temperature setpoints. In some embodiments, each building has up to three outdoor VRF units 1602 located outside the building (e.g., on a rooftop) and up to 1628 indoor VRF units 1604 distributed throughout the building (e.g., in various building zones).

Many different configurations exist for VRF system 1600. In some embodiments, VRF system 1600 is a two-pipe system in which each outdoor VRF unit 1602 connects to a single refrigerant return line and a single refrigerant outlet line. In a two-pipe system, all of the outdoor VRF units 1602 operate in the same mode since only one of a heated or chilled refrigerant can be provided via the single refrigerant outlet line. In other embodiments, VRF system 1600 is a three-pipe system in which each outdoor VRF unit 1602 connects to a refrigerant return line, a hot refrigerant outlet line, and a cold refrigerant outlet line. In a three-pipe system, both heating and cooling can be provided simultaneously via the dual refrigerant outlet lines. An example of a three-pipe VRF system which can be used for VRF system 1600 is described in detail below.

Figure 17A:
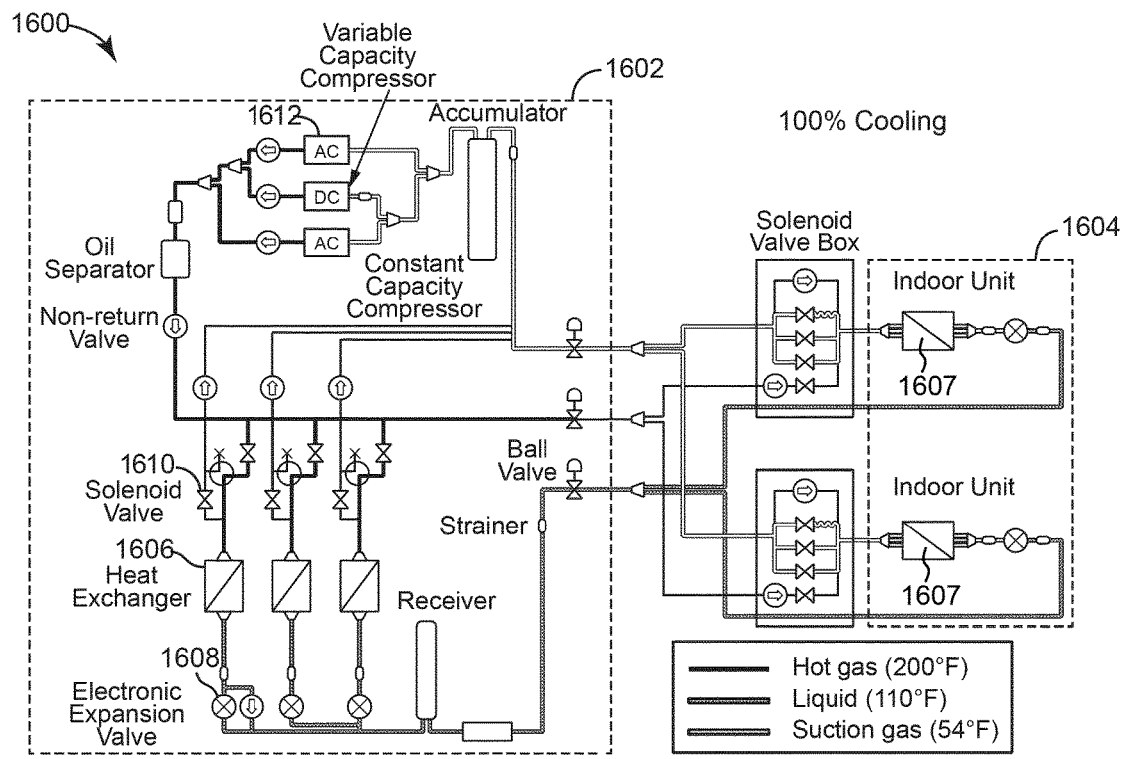
FIG. 17A is a diagram illustrating the operation of the VRF system of FIGS. 16A-16B in a cooling mode, according to some embodiments.
Figure 17B:
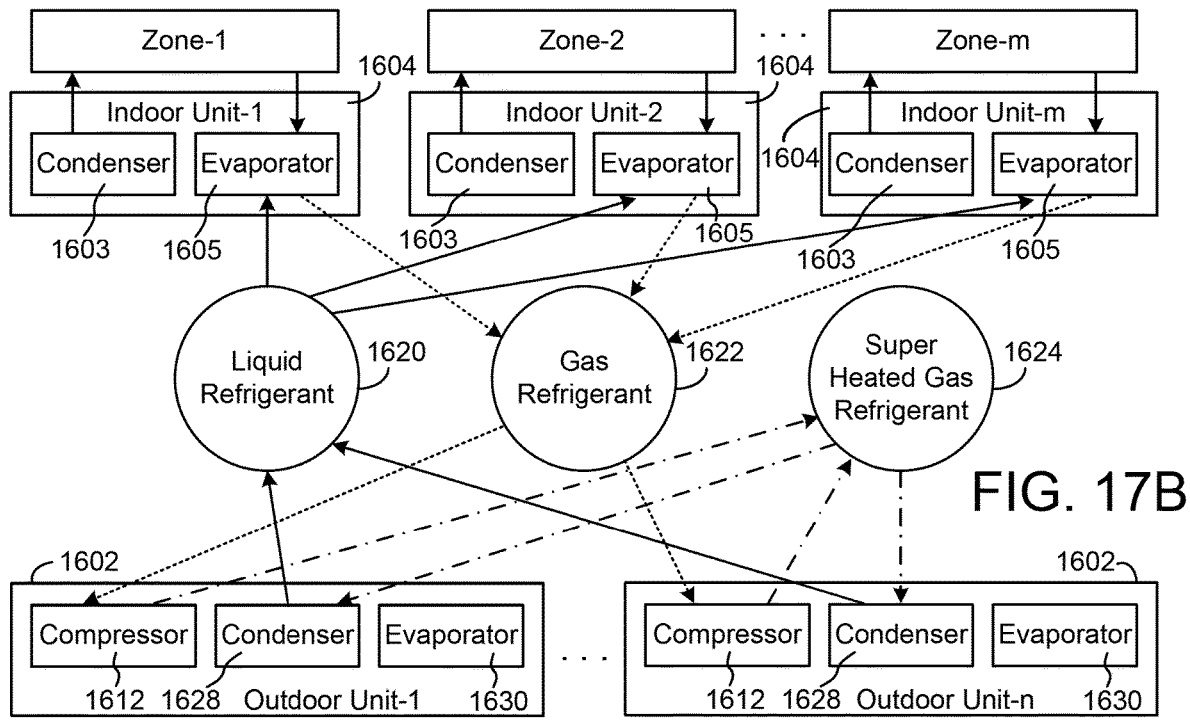
FIG. 17B is a directed graph illustrating the balance of refrigerant states when the VRF system operates in the cooling mode, according to some embodiments.
Figure 18A:
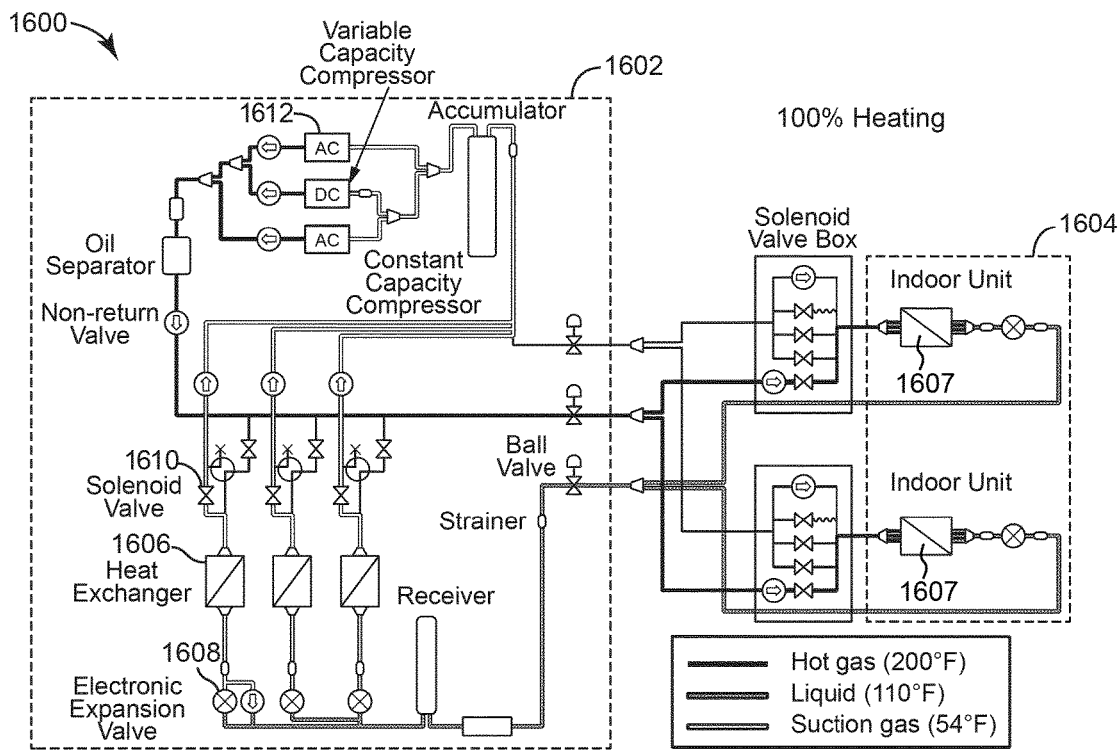
FIG. 18A is a diagram illustrating the operation of the VRF system of FIGS. 16A-16B in a heating mode, according to some embodiments.
Figure 18B:
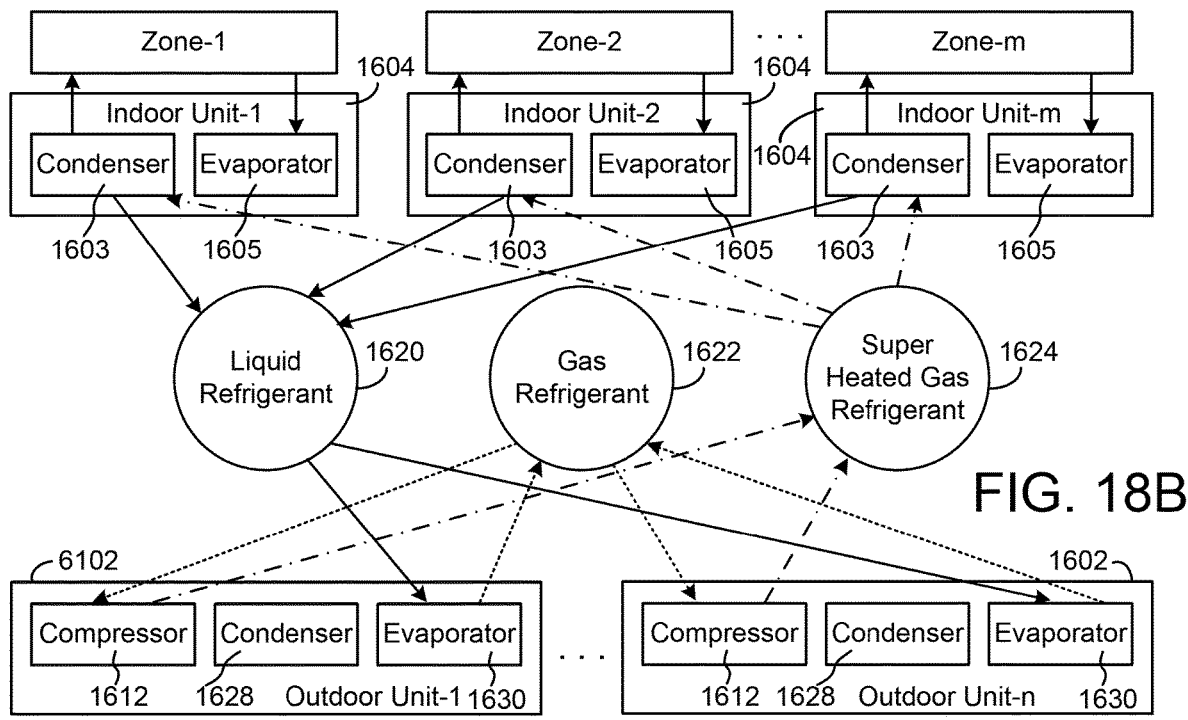
FIG. 18B is a directed graph illustrating the balance of refrigerant states when the VRF system operates in the heating mode, according to some embodiments.
Figure 19A:
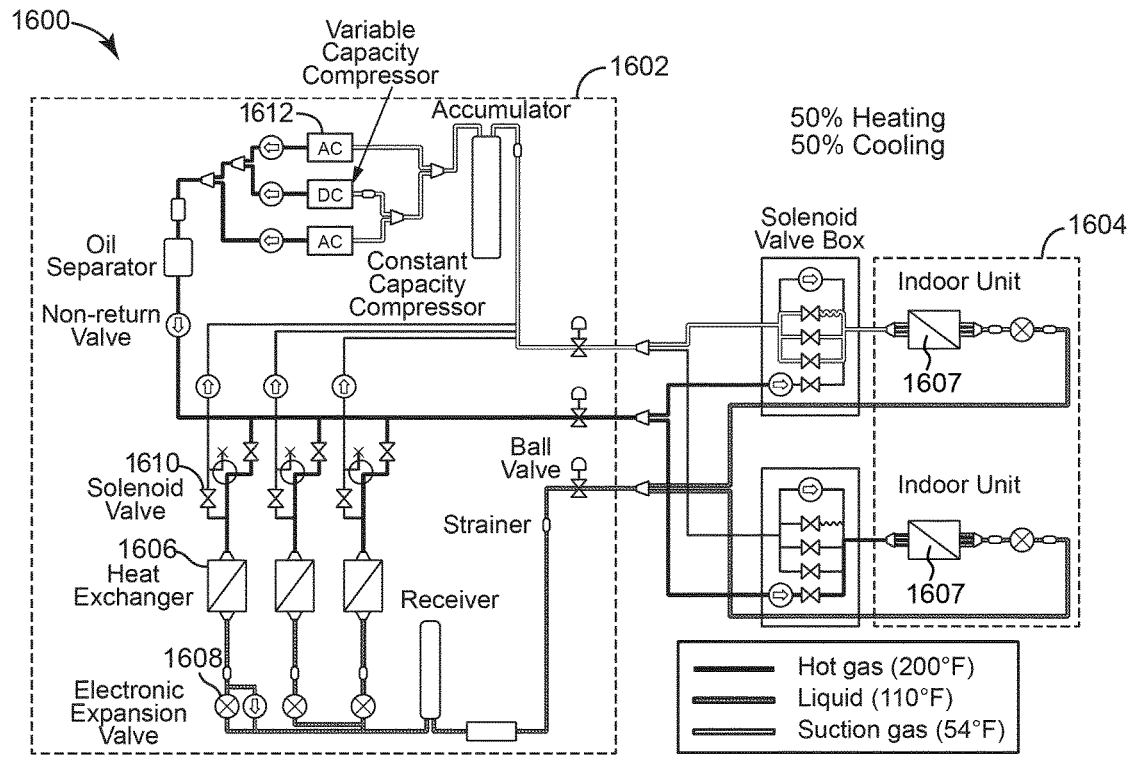
FIG. 19A is a diagram illustrating the operation of the VRF system of FIGS. 16A-16B in a combined heating and cooling mode, according to some embodiments.
Figure 19B:
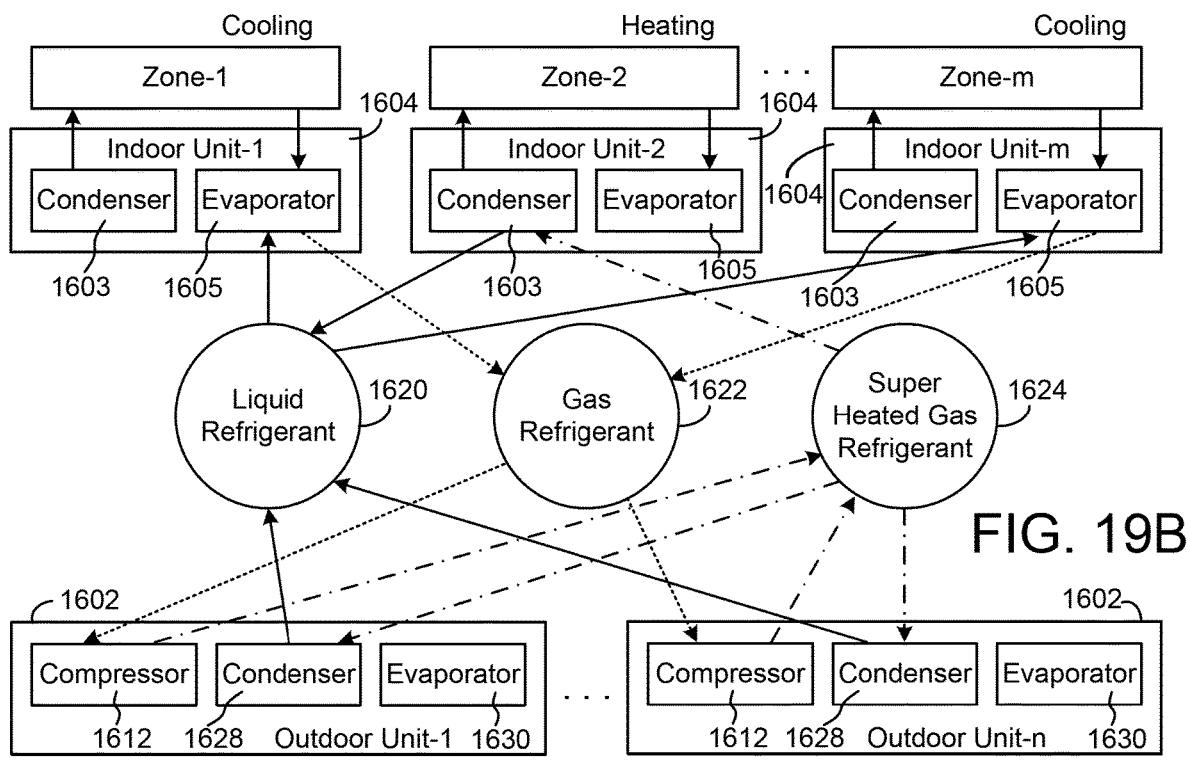
FIG. 19B is a directed graph illustrating the balance of refrigerant states when the VRF system operates in the combined heating and cooling mode, according to some embodiments.

Referring now to FIGS. 17A-19B, several diagrams illustrating the operation of VRF system 1600 in a cooling mode, a heating mode, and a combined heating/cooling mode are shown, according to some embodiments. Each outdoor VRF unit 1602 may include one or more heat exchangers 1606 (as shown in FIGS. 17A, 18A, and 19A). When outdoor VRF units 1602 operate in a cooling mode, heat exchangers 1606 can operate as condensers 1628 (as shown in FIGS. 17B and 19B) to provide cooling for the refrigerant. When outdoor VRF units 1602 operate in a heating mode, heat exchangers 1606 can be operated as evaporators 1630 (as shown in FIG. 18B) to provide heating for the refrigerant. It is contemplated that condensers 1628 and evaporators 1630 may exist as separate devices within outdoor VRF units 1602 or may exist as heat exchangers 1606 which can be operated as both condensers 1628 and evaporators 1630 depending on the mode of operation of outdoor VRF units 1602. Although only two outdoor VRF units 1602 are shown, it should be understood that VRF system 1600 can include any number n of outdoor VRF units 1602.

Each indoor VRF unit 1604 may include one or more heat exchangers 1607 (as shown in FIGS. 17A, 18A, and 19A) When indoor VRF units 1604 operate in a cooling mode, heat exchangers 1607 can operate as evaporators 1605 (as shown in FIGS. 17B and 19B) to provide cooling for the air delivered to the building zones. When indoor VRF units 1604 operate in a heating mode, heat exchangers 1607 can be operated as condensers 1603 (as shown in FIG. 18B) to provide heating for the air delivered to the building zones. It is contemplated that condensers 1603 and evaporators 1605 may exist as separate devices within indoor VRF units 1604 or may exist as heat exchangers 1607 which can be operated as both condensers 1603 and evaporators 1605 depending on the mode of operation of indoor VRF units 1604. Although only three indoor VRF units 1604 are shown, it should be understood that VRF system 1600 can include any number m of indoor VRF units 1604.

Referring particularly to FIGS. 17A-17B, the operation of VRF system 1600 in the cooling mode is shown, according to some embodiments. In the cooling mode, heat exchangers 1606 of outdoor VRF units 1602 operate as condensers 1628 to condense a superheated gas refrigerant 1624 into a liquid refrigerant 1620. The liquid refrigerant 1620 from heat exchangers 1606 flows through the expansion valves (EEV) 1608 and on to heat exchangers 1607 of indoor VRF units 1604. In the cooling mode, heat exchangers 1607 operate as evaporators 1605 to evaporate the liquid refrigerant 1620 to a gas refrigerant 1622, thereby absorbing heat from the air within the building zones and providing cooling for the building zones. Solenoid valves 1610 allow for the gas refrigerant 1622 to return to one or more compressors 1612 of outdoor units 1602. Compressors 1612 compress the gas refrigerant 1622 to create a superheated gas refrigerant 1624, which is provided to condensers 1628.

Referring now to FIGS. 18A-18B, the operation of VRF system 1600 in the heating mode is shown, according to some embodiments. In the heating mode, heat exchangers 1606 of outdoor VRF units 1602 operate as evaporators 1630 to evaporate the liquid refrigerant 1620 from the indoor VRF units 1604. Heat exchangers 1606 transfer heat into the liquid refrigerant 1620, thereby causing the liquid refrigerant 1620 to evaporate and form a gas refrigerant 1622. The gas refrigerant 1622 is provided to compressors 1612, which compress the gas refrigerant 1622 to form a superheated gas refrigerant 1624. The superheated gas refrigerant 1624 is then provided to heat exchangers 1607 of indoor VRF units 1604. Heat exchangers 1607 operate as condensers 1602 to condense the superheated gas refrigerant 1624 by transferring heat from the superheated gas refrigerant 1624 to the building zones, thereby causing the superheated gas refrigerant 1624 to lose heat and become the liquid refrigerant 1620. The liquid refrigerant 1620 is then returned to heat exchangers 1606 outdoor VRF units 1602.

Referring now to FIGS. 19A-19B, the operation of VRF system 1600 in a combined heating and cooling mode is shown, according to some embodiments. In the combined heating/cooling model, some indoor and outdoor VRF units 1602-1604 operate in a heating mode while other indoor and outdoor VRF units 1602-1604 operate in a cooling mode. For example, indoor VRF unit-2 is shown operating in a heating mode, whereas indoor VRF unit-1 and indoor VRF unit-m are shown operating in the cooling mode. Both outdoor VRF unit-1 and outdoor VRF unit-n are shown operating in the cooling mode.

The operation of outdoor VRF units 1602 in the cooling mode can be the same as previously described with reference to FIGS. 17A-17B. For example, outdoor VRF units 1602 can receive the gas refrigerant 1622 and condense the gas refrigerant 1622 into a liquid refrigerant 1620. The liquid refrigerant 1620 can be routed to indoor VRF unit-1 and indoor VRF unit-m to provide cooling for zone-1 and zone-m. Heat exchangers 1607 of indoor VRF unit-1 and indoor VRF unit-m operate as evaporators 1605, by absorbing heat from building zone-1 and building zone-m, thereby causing the liquid refrigerant 1620 to become a gas refrigerant 1622. The gas refrigerant 1622 is then delivered to compressors 1612 of outdoor VRF units 16022. Compressors 1612 compress the gas refrigerant 1622 to form a superheated gas refrigerant 1624. The superheated gas refrigerant 1624 can be provided to heat exchangers 1606 of outdoor VRF units 1602, which operate as condensers 1628 to condense the gas refrigerant 1622 to liquid refrigerant 1620. The superheated gas refrigerant 1624 can also be provided to indoor VRF unit-2 and used to provide heating to building zone-2.

The operation of indoor VRF unit-2 in the heating mode can be the same as previously described with reference to FIGS. 18A-18B. For example, heat exchanger 1607 of indoor VRF unit-2 can operate as a condenser 1603 by rejecting heat from the superheated gas refrigerant 1624 to building zone-2, thereby causing the superheated gas refrigerant 1624 to become a liquid refrigerant 1620. The liquid refrigerant 1620 can be routed to heat exchangers 1607 of indoor VRF unit-1 and indoor VRF unit-m, which operate as evaporators 1605 to absorb heat from building zone-1 and building zone-m, as previously described.

In any of the operating modes, VRF system 1600 can operate to ensure that the refrigerant states remain balanced. For example, when operating in the cooling mode, VRF system 1600 can operate outdoor VRF units 1602 and indoor VRF units 1604 to ensure that outdoor VRF units 1602 convert the gas refrigerant 1622 to the liquid refrigerant 1620 at the same rate that indoor VRF units 1604 convert the liquid refrigerant 1620 to the gas refrigerant 1622. Similarly, when operating in the heating mode, VRF system 1600 can operate outdoor VRF units 1602 and indoor VRF units 1604 to ensure that outdoor VRF units 1602 convert the liquid refrigerant 1620 to the superheated gas refrigerant 1624 at the same rate that indoor VRF units 1604 convert the superheated gas refrigerant 1624 to the liquid refrigerant 1620.

In each of the operating modes, VRF system 1600 can operate outdoor VRF units 1602 and indoor VRF units 1604 to ensure that the amount of each refrigerant state produced (e.g., liquid refrigerant 1620, gas refrigerant 1622, and superheated gas refrigerant 1624) by outdoor VRF units 1602 and indoor VRF units 1604 is equal to the amount of each refrigerant state consumed by outdoor VRF units 1602 and indoor VRF units 1604. In other words, VRF system 1600 can balance the rates at which refrigerant is added and removed from each of the refrigerant states. In some embodiments, VRF system 1600 imposes mass balance constraints or volume balance constraints to ensure that the net amount of refrigerant in each of the refrigerant states remains balanced at each time step of an optimization period.

In some embodiments, VRF system 1600 is controlled using a predictive energy cost optimization framework. For example, VRF system 1600 can include one or more controllers which perform a high-level optimization and a low-level optimization. The high-level optimization can seek to optimize the electricity usage costs plus the peak electricity charge (i.e., the electricity demand charge) across the entire VRF system 1600 subject to several system constraints by manipulating the requested cooling or heating duty delivered to each zone and the operation modes of the indoor and outdoor VRF units 1602-1604. The constraints imposed in the high-level optimization can include system constraints such as the balance of refrigerant states (as previously described) and zone temperature constraints. The zone temperature constraints can require the temperature of each building zone to be maintained within an acceptable temperature range to maintain comfort of the occupants.

The low-level optimization can use the requested heating and cooling duty for each building zone computed by the high-level optimization as input data to the low-level optimization. The low-level optimization can manipulate the zone temperature setpoints for the various building zones such that the zone heating and cooling duties track the requested heating or cooling duty profile computed in the high-level optimization.

In some embodiments, the low-level optimization is distributed across several low-level model predictive controllers, each of which can operate to determine the temperature setpoints for a particular building zone. For example, the control system can include a high-level model predictive controller (MPC) and several low-level MPCs. The high-level MPC can determine an optimal load profile for each of the building zones and can distribute the optimal load profiles to the low-level MPCs for the building zones. Each low-level MPC can be configured to control a particular building zone and can receive the load profile for the corresponding building zone from the high-level MPC. Each low-level MPC can determine optimal temperature setpoints for the corresponding building zone using the load profile from the high-level MPC. An example of such a distributed implementation is described in greater detail with reference to FIG. 21.

Figure 20:
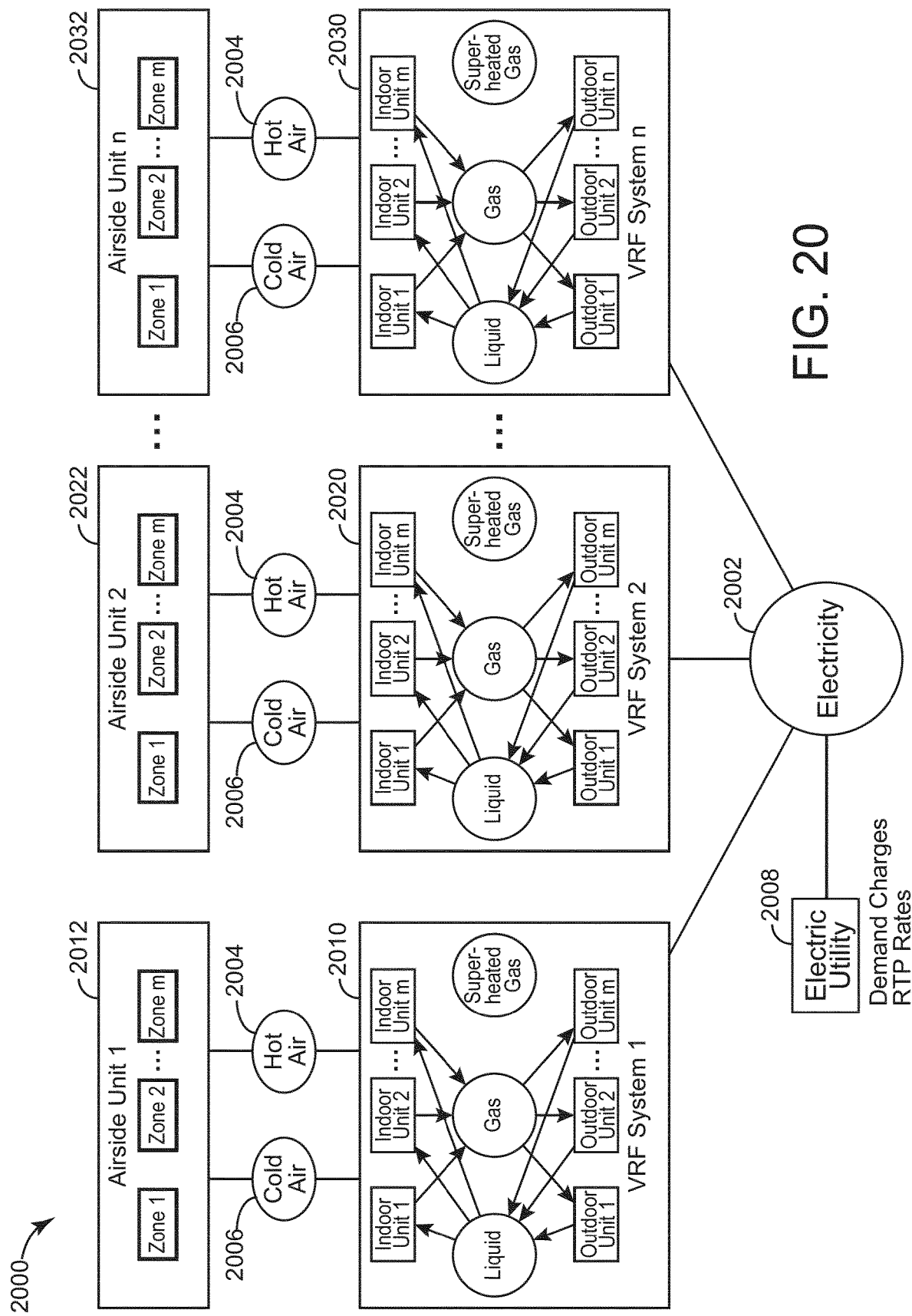
FIG. 20 is a block diagram of a control system for multiple VRF systems, according to some embodiments.

Referring now to FIG. 20, a block diagram of a control system 2000 for multiple VRF systems 2010, 2022, and 2032 is shown, according to some embodiments. Each of VRF systems 2010-2032 can include some or all of the components and/or features of VRF system 1600, as described with reference to FIGS. 16A-19B. The optimization framework described above can be extended to a larger system including multiple VRF systems 2010-2032 by introducing an additional control layer (e.g., a supervisory layer) operating above the high-level and low-level optimization framework. For example, the predictive cost optimization controller can act as a coordinator to coordinate the electricity usage of multiple VRF systems 2010-2032 over time such that the multiple VRF systems 2010-2032 achieve an optimal energy cost performance (e.g., minimum total energy cost for the entire set of VRF systems 2010-2032).

In various embodiments, the cost optimization performed by the predictive cost optimization controller may account for energy cost (e.g., $/kWh of electricity consumed), demand charge (e.g., $/kW of peak power consumption), peak load contribution cost, and/or monetary incentives from participating in incentive-based demand response (IBDR) programs. Several examples of a cost optimization which can be performed by the predictive cost optimization controller are described in detail in U.S. patent application Ser. No. 15/405,236 filed Jan. 12, 2017, U.S. patent application Ser. No. 15/405,234 filed Jan. 12, 2017, U.S. patent application Ser. No. 15/426,962 filed Feb. 7, 2017, and U.S. patent application Ser. No. 15/473,496 filed Mar. 29, 2017. The entire disclosure of each of these patent applications is incorporated by reference herein.

In the supervisory layer, each of the individual VRF systems 2010-2032 can be represented as a single asset that converts electricity 2002 from an electric utility 2008 into either hot air 2004 or cold air 2006 that is required by the building zones. Hot air 2004 and cold air 2006 can be delivered to airside units 2012, 2022, and 2032 that provide heating and/or cooling for the building zones served by airside units 2012, 2022, and 2032. Hot air 2004 and cold air 2006 can be treated as resources produced by VRF systems 2010-2032, whereas electricity 2002 can be treated as a resource consumed by VRF systems 2010-2032. The relationship between resource production and electricity consumption by each VRF system 2010-2032 may be defined by a system performance curve for each VRF system 2010-2032. The system performance curves can be used in the supervisory layer as constraints on the cost optimization performed by the predictive cost optimization controller to ensure that VRF systems 2010-2032 operate to generate sufficient hot air 2004 and cold air 2006 for the building zones.

The amount of hot air 2004 and cold air 2006 to be produced by each of VRF systems 2010-2032 at each time step of an optimization period can be determined by the predictive cost optimization controller by performing an asset allocation process. Several examples of an asset allocation process which can be performed by the predictive cost optimization controller are described in detail in U.S. patent application Ser. No. 15/405,236, U.S. patent application Ser. No. 15/405,234, U.S. patent application Ser. No. 15/426,962, and U.S. patent application Ser. No. 15/473,496.

Distributed Model Predictive Control System

Figure 21:
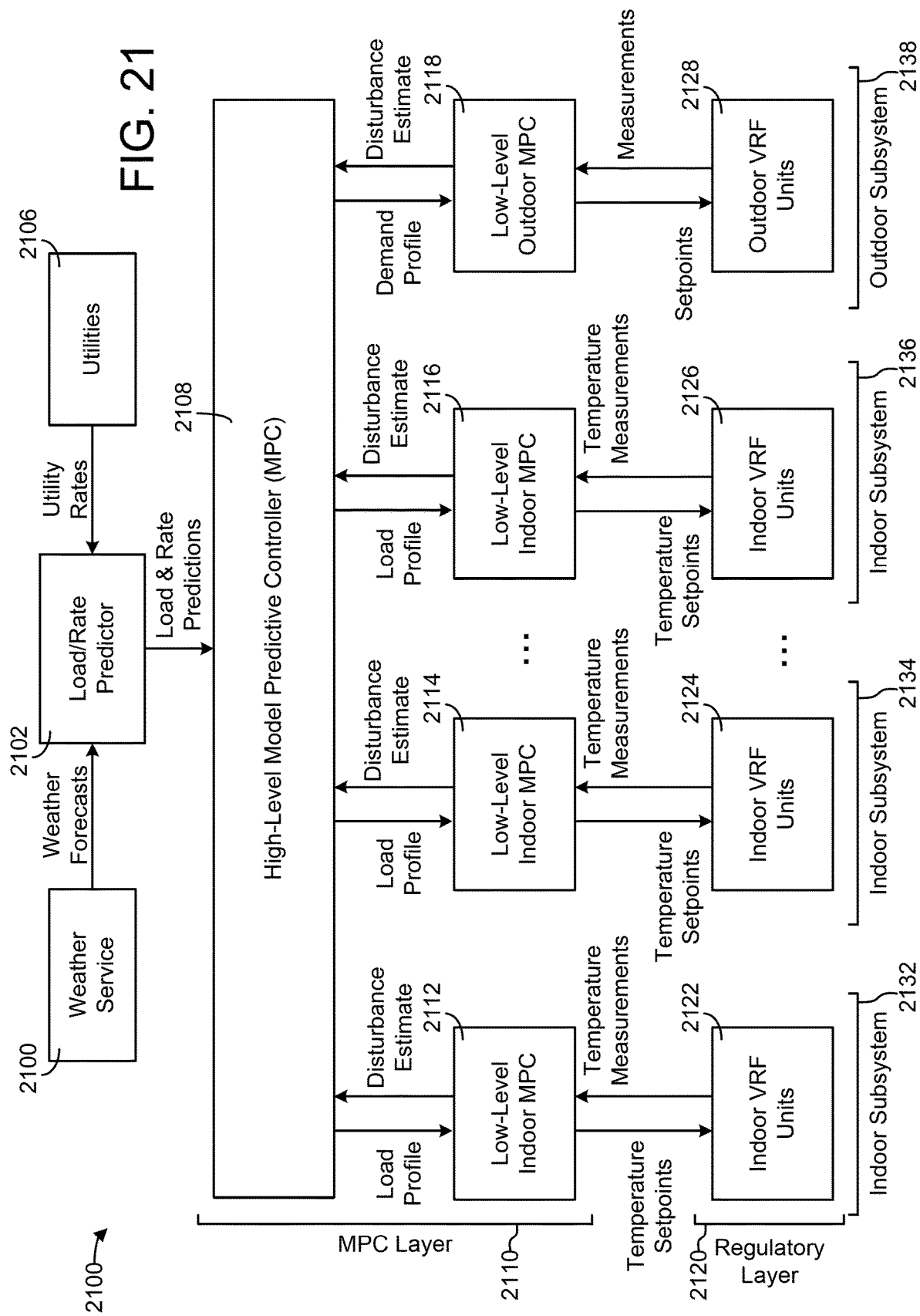
FIG. 21 is a block diagram of a distributed model predictive control system with a high-level model-predictive controller, several low-level indoor model predictive controllers, and a low-level outdoor model predictive controller, according to some embodiments.

Referring now to FIG. 21, a block diagram of a distributed model predictive control (MPC) system 2100 is shown, according to some embodiments. MPC system 2100 uses a MPC technique to determine optimal setpoints for the equipment of a VRF system (e.g., VRF system 1600) over a time horizon. MPC system 2100 can be used in combination with VRF system 1600, as described with reference to FIGS. 16A-20. For example, MPC system 2100 can determine optimal temperature setpoints for indoor VRF units 1604 and optimal load setpoints for outdoor VRF units 1602.

MPC is a control technique that uses a model of a controlled system to relate system inputs (e.g., control actions, setpoints, etc.) to system states and system outputs (e.g., measurements, process variables, etc.). The model can be used to predict the system states and system outputs based on the actions taken by a controller at each time step during an optimization period. At each time step, MPC solves an online optimization problem using the system model to determine a sequence of control actions that achieve an objective (e.g., minimizing tracking error, minimizing energy cost, etc.) while respecting process constraints such as equipment capacity and safety bounds (e.g., temperature constraints, equipment switching constraints, etc.). The first control action in the sequence is implemented and the optimization problem is solved again at the next time step after new measurements are obtained.

In economic MPC, the objective in the optimization problem is often to minimize total cost, as defined by a cost function. Numerous studies have shown that MPC outperforms existing control systems due to its ability to forecast into the future and anticipate events before they occur. MPC enables shifting of the energy load from peak hours to off-peak hours by using the mass of the building for passive thermal energy storage (TES). Energy costs can be decreased by concentrating equipment usage to times of low resource prices, all while maintaining comfort limits within each building.

Still referring to FIG. 21, distributed MPC system 2100 is shown to include a MPC layer 2110 and a regulatory layer 2120. MPC layer 2110 is shown to include a high-level model predictive controller 2108 and several low-level model predictive controllers 2112-2118. Controllers 2112, 2114, and 2116 are shown as low-level indoor model predictive controllers, whereas controller 2118 is shown as a low-level outdoor model predictive controller. MPC layer 2110 can be configured to determine and provide optimal temperature setpoints and equipment operating setpoints to the equipment of regulatory layer 2120. In some embodiments, MPC layer 2110 can be retrofit to any existing VRF system to provide setpoint optimization for the equipment of the VRF system.

Regulatory layer 2120 is shown to include indoor VRF units 2122-2126 and outdoor VRF units 2128. Indoor VRF units 2122-2126 can include some or all of indoor VRF units 1604, whereas outdoor VRF units 2128 can include some or all of outdoor VRF units 1602. In some embodiments, regulatory layer 2120 can include PID controllers, operable equipment (e.g., outdoor VRF units, indoor VRF units, pumps, fans, valves, etc.), and/or other systems or devices configured to control a process variable to a setpoint.

In some embodiments, distributed MPC system 2100 includes a load/rate predictor 2102. Load/rate predictor 2102 can provide MPC layer 2110 with load and rate predictions including, for example, disturbance forecasts, electricity prices, demand charge prices, and outside air temperatures. Load/rate predictor 2102 is shown receiving weather forecasts from a weather service 2104. In some embodiments, load/rate predictor 2102 generates the disturbance forecasts as a function of the weather forecasts. In some embodiments, load/rate predictor 2102 uses feedback from regulatory layer 2120 to generate the disturbance forecasts. Feedback from regulatory layer 2120 can include various types of sensory inputs (e.g., temperature, flow, humidity, enthalpy, etc.) or other data relating to the controlled building or campus (e.g., building occupancy data, building electric load, etc.). In some embodiments, load/rate predictor 2102 generates a disturbance forecast including a predicted disturbance value for each time step within the optimization period.

In some embodiments, load/rate predictor 2102 uses a deterministic plus stochastic model trained from historical load data to generate the disturbance forecast. Load/rate predictor 2102 can use any of a variety of prediction methods to generate the disturbance forecast (e.g., linear regression for the deterministic portion and an autoregressive model for the stochastic portion). Load/rate predictor 2102 can predict one or more different types of disturbances for the building or campus. For example, load/rate predictor 2102 can predict a thermal load resulting from heat transfer between the air within a building and the outside air through the walls of the building. Load/rate predictor 2102 can predict a thermal load resulting from internal heat generation within the building (e.g., heat generated by electronics in the building, heat generated by building occupants, etc.). In some embodiments, load/rate predictor 2102 makes load/rate predictions using the techniques described in U.S. patent application Ser. No. 14/717,593, titled "Building Management System for Forecasting Time Series Values of Building Variables" and filed May 20, 2015, the entire disclosure of which is incorporated by reference herein.

Load/rate predictor 2102 is shown receiving utility rates from utilities 2106. Utility rates can indicate a cost or price per unit of a resource (e.g., electricity, natural gas, water, etc.) provided by utilities 2106 at each time step in the optimization period. In some embodiments, the utility rates are time-variable rates. For example, the price of electricity can be higher at certain times of day or days of the week (e.g., during high demand periods) and lower at other times of day or days of the week (e.g., during low demand periods). The utility rates can define various time periods and a cost per unit of a resource during each time period. Utility rates can be actual rates received from utilities 2106 or predicted utility rates estimated by load/rate predictor 2102.

In some embodiments, the utility rates include demand charges for one or more resources provided by utilities 2106. A demand charge can define a separate cost imposed by utilities 2106 based on the maximum usage of a particular resource (e.g., maximum energy consumption) during a demand charge period. The utility rates can define various demand charge periods and one or more demand charges associated with each demand charge period. In some instances, demand charge periods can overlap partially or completely with each other and/or with the optimization period. Advantageously, MPC layer 2110 can account for demand charges in the high-level optimization process performed by high-level model predictive controller 2108. Utilities 2106 can be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 2102 can store the predicted loads and the utility rates in memory and/or provide the predicted loads and the utility rates to high-level MPC 2108.

MPC layer 2110 can receive measurements from regulatory layer 2120 and provide setpoints to regulatory layer 2120. MPC layer 2110 can generate optimal values for various decision variables including, for example, zone temperature setpoints, variable refrigerant flow setpoints, operating mode setpoints (e.g., heating or cooling), and/or equipment on/off decisions. MPC layer 2110 can determine the optimal values of the decision variables using system models such a zone temperature to cooling/heating duty model, a cooling/heating duty to temperature setpoint model, and equipment models. MPC layer 2110 can determine the optimal values of the decision variables by performing an optimization process subject to several constraints. The constraints can include comfort bounds on the zone air temperatures, equipment capacity constraints, refrigerant state balance constraints, and rate of change bounds on the equipment of regulatory layer 2120.

As discussed above, solving a single MPC problem to determine the optimal values of the decision variables can be difficult for large-scale applications. For example, a building or building system can include thousands of discrete zones and thousands of unique HVAC devices. The discrete decisions (e.g., turning equipment on/off) can result in a mixed integer optimization problem, which further increases complexity. Due to the difficulty and computational complexity of the MPC problem, MPC layer 2110 can decompose the overall MPC problem into smaller, more manageable, optimization problems.

As shown in FIG. 21, distributed MPC system 2100 can decompose the overall MPC problem into a high-level optimization problem and a low-level optimization problem. The high-level problem can be solved by high-level controller 2108 to determine a load profile for each indoor subsystem 2132-2136 and a demand profile for outdoor subsystem 2138. In some embodiments, high-level controller 2108 uses aggregate low-level models for each indoor subsystem 2132-2136 to reduce computational complexity. High-level controller 2108 can determine load profiles that optimize (e.g., minimize) the total operational cost of MPC system 2100 over the optimization period. Each load profile can include a load value for each time step in the optimization period. Low-level indoor controllers 2112-2116 can use the load profiles as constraints defining maximum permissible load values for each indoor subsystem 2132-2136 for each time step in the optimization period. High-level controller 2108 can provide the load profiles to each of the low-level indoor controller 2112-2116. The high-level optimization performed by high-level controller 2108 is described in greater detail with reference to FIG. 22.

The low-level optimization problem can be further decomposed into a low-level outdoor optimization problem and one or more low-level indoor optimization problems. Each low-level indoor problem can be solved by one of low-level indoor controllers 2112-2116 to determine zone temperature setpoints for the indoor VRF units 2122-2126 of each indoor subsystem 2132-2136. Each low-level indoor controller 2112-2116 can determine the zone temperature setpoints that optimize (e.g., minimize) the energy consumption of the corresponding indoor subsystem 2132-2136 while maintaining zone temperatures within defined temperature limits and without exceeding the load values provided by high-level controller 2108. Alternatively, each low-level indoor controller 2112-2116 can determine temperature setpoints that track the average indoor subsystem temperatures (e.g., predicted subsystem temperature states) from the high-level optimization problem. The low-level optimization performed by low-level controllers 2112-2116 is described in greater detail with reference to FIG. 23.

The low-level outdoor problem can be solved by low-level outdoor controller 2118. In some embodiments, the low-level outdoor problem is a mixed-integer linear program. Low-level outdoor controller 2118 can determine optimal setpoints for outdoor VRF units 2128 that minimize operating cost while meeting the demand profile from high-level controller 2108. Decision variables optimized by low-level outdoor controller 2118 can include, for example, equipment on/off states, thermal loads for chillers, compressor setpoints, flow rates for pumps, and setpoints for other auxiliary outdoor equipment. Low-level outdoor controller 2118 can use the demand profile from high-level controller 2108 as an input specifying the overall demand to be met by outdoor VRF units 2128 at each time step of the optimization period.

In some embodiments, low-level outdoor controller 2118 decomposes the low-level outdoor optimization problem into a first outdoor optimization problem and a second outdoor optimization problem. The first outdoor optimization problem can allocate the demand specified by high-level controller 2108 across multiple outdoor VRF units of the outdoor subsystem. The second outdoor optimization problem can be decomposed into a mixed-integer optimization problem for each subplant to determine optimal equipment on/off states and equipment setpoints for outdoor VRF units 2128. An example of an optimization technique which can be used by low-level outdoor controller 2118 is described in detail in U.S. patent application Ser. No. 14/634,609 filed Feb. 27, 2015, the entire disclosure of which is incorporated by reference herein.

As shown in FIG. 21, each low-level indoor model predictive controller 2112-2116 can control a subsystem 2132-2136 of the entire VRF system 1600. Each low-level indoor controller 2112-2116 can perform a separate indoor optimization process to determine optimal temperature setpoints for the indoor VRF units 2122-2126 of the corresponding indoor subsystem 2132-2136. Each indoor subsystem 2132-2136 can include one or more indoor VRF units, each of which can be configured to deliver air to one or more building zones.

In some embodiments, high-level controller 2108 uses an aggregate model of each indoor subsystem 2132-2136 and allocates a thermal energy load to each indoor subsystem 2132-2136. Low-level indoor controllers 2112-2116 can use more detailed zone-level models during the low-level optimization processes to determine the optimal temperature setpoints for each building zone of the corresponding indoor subsystem. Decomposing the VRF system 1600 into separate indoor subsystems 2132-2136 can improve computational performance and substantially decrease the amount of time required to solve the low-level MPC problems. For example, all of the low-level MPC problems can be solved within a few minutes.

In some embodiments, each indoor subsystem 2132-2136 represents a separate building. Significant coupling between indoor subsystems 2132-2136 (e.g., heat exchange between subsystems 2132-2136) can affect performance since low-level controllers 2112-2116 are not required to coordinate their solutions. One way to decompose VRF system 1600 to guarantee that there is no coupling between subsystems 2132-2136 is to decompose by building since separate buildings do not exchange heat with one another. For this reason, it may be desirable to select indoor subsystems 2132-2136 so that each indoor subsystem 2132-2136 represents a separate building. Each indoor subsystem 2132-2136 can include multiple zones (e.g., rooms or spaces within the building), each of which can be controlled by a separate indoor VRF unit. In other embodiments, each indoor subsystem 2132-2136 can represent a single building zone, a collection of zones within a building, or even multiple buildings.

In MPC system 2100, high-level model predictive controller 2108 determines the thermal energy loads to allocate to each indoor subsystem 2132-2136 (e.g., each building or each zone) and the demand profile for outdoor subsystem 2138. Each indoor subsystem 2132-2136 can include a separate low-level indoor controller 2112-2116 that computes the temperature setpoints or variable refrigerant flow rates for each zone in that indoor subsystem 2132-2136 (e.g., setpoints for each indoor VRF unit in the building). The low-level indoor problem can be solved in a distributed manner. The low-level indoor problem can be easily extended to handle large industrial and campus-wide implementations without increasing computational complexity.

Distributed MPC system 2100 provides several advantages over alternative control strategies. For example, high-level controller 2108 can coordinate operation low-level indoor subsystems 2132-2136 via the load profiles provided to each low-level controller 2112-2116. By including a demand charge in the high-level objective function, high-level controller 2108 can generate load profiles which stager the operation of low-level indoor subsystems 2132-2136. In other words, high-level controller 2108 can generate load profiles which ensure that low-level indoor subsystems 2132-2136 do not all consume power at the same time. This allows high-level controller 2108 to coordinate operation of low-level indoor subsystems 2132-2136 and account for the demand charge without requiring communication between low-level indoor controllers 2112-2116. The coupling caused by the presence of a single outdoor subsystem 2138 for all indoor subsystems 2132-2136 is also addressed by high-level controller 2108. Hence, the low-level control problems are completely decoupled such that iterations and communication between low-level controllers 2112-2116 are not required.

Data communication between MPC layer 2110 and regulatory layer 2120 can also be greatly reduced. For example, data communication between MPC layer 2110 and regulatory layer 2120 can be limited to measurements and setpoints, as shown in FIG. 21. This allows MPC system 2100 to be integrated with any existing BMS. High level controller 2108 can use aggregate models of each indoor subsystem 2132-2136 and outdoor subsystem 2138 to reduce computational complexity during the high-level optimization. Each low-level indoor controller 2112-2116 can provide high-level controller 2108 with an aggregate disturbance estimate, an aggregate temperature, and aggregate system parameters (e.g., thermal capacitance, heat transfer coefficient, etc.) for the corresponding indoor subsystem 2132-2136.

Distributed MPC system 2100 can be used to control a variety of different systems including, for example, a chiller plant, air handling units, rooftop units, variable refrigerant flow systems, airside systems, waterside systems, building management systems, and/or other types of systems for which power consumption or thermal energy loads can be allocated to different subsystems. Most building temperature regulation methods do not consider detailed models of VRF equipment or integer decision variables, which decreases the fidelity of energy cost calculations. However, MPC system 2100 can include integer variables in the optimization problem to determine when to turn equipment on and off rather than relying on heuristics.

High-Level Model Predictive Controller

Figure 22:
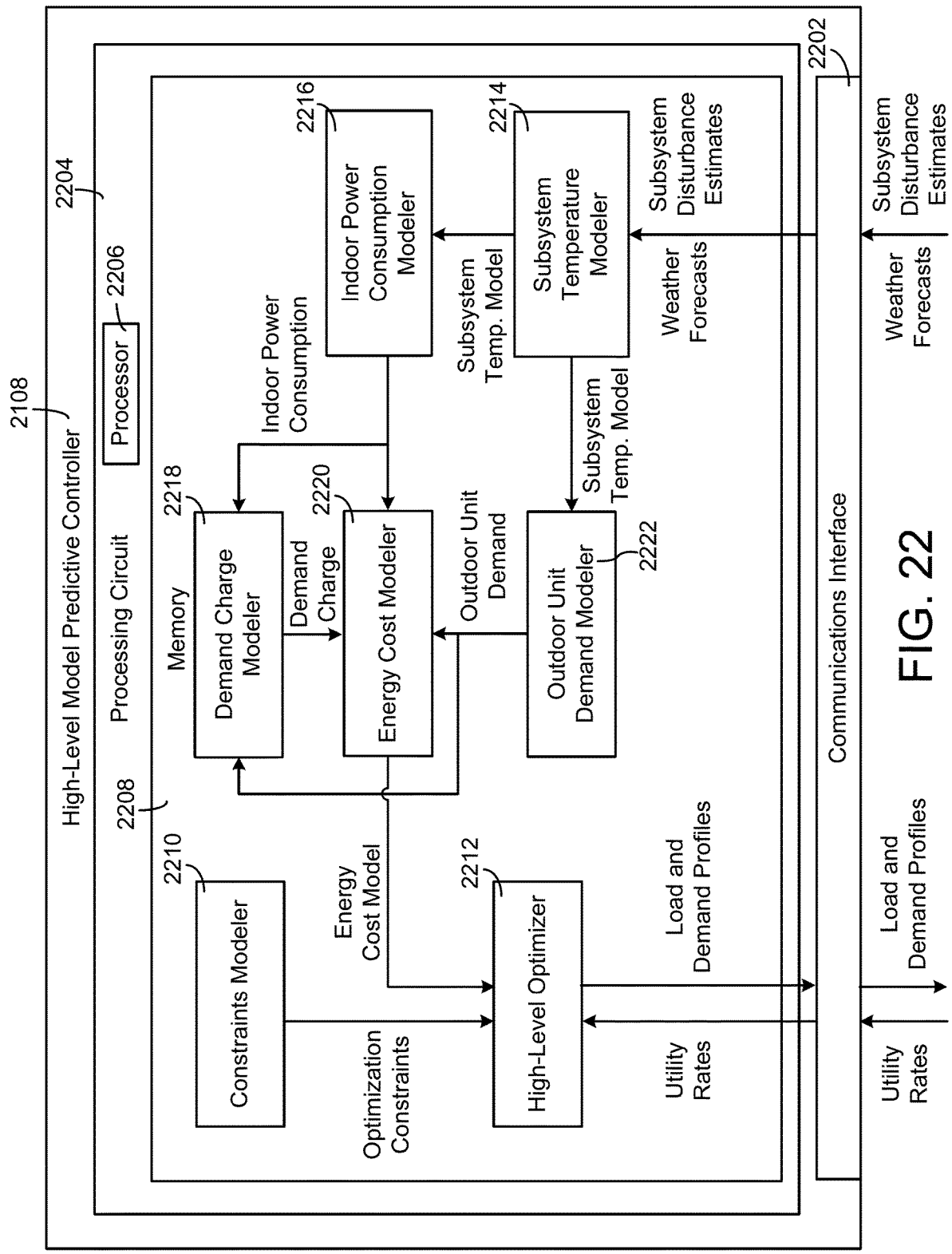
FIG. 22 is a block diagram illustrating the high-level model predictive controller of FIG. 21 in greater detail, according to some embodiments.

Referring now to FIG. 22, a block diagram illustrating high-level model predictive controller (MPC) 2108 in greater detail is shown, according to some embodiments. High-level MPC 2108 is shown a communications interface 2202 and a processing circuit 2204. Communications interface 2202 can include wired or wireless interfaces (e.g., jacks, antennas, transmitters, receivers, transceivers, wire terminals, etc.) for conducting data communications with various systems, devices, or networks. For example, communications interface 2202 can include an Ethernet card and port for sending and receiving data via an Ethernet-based communications network and/or a WiFi transceiver for communicating via a wireless communications network. Communications interface 2202 can be configured to communicate via local area networks or wide area networks (e.g., the Internet, a building WAN, etc.) and may use a variety of communications protocols (e.g., BACnet, IP, LON, etc.).

Communications interface 2202 can be a network interface configured to facilitate electronic data communications between high-level MPC 2108 and various external systems or devices (e.g., weather service 2104, utilities 2106, low-level controllers 2112-2118, BMS equipment, etc.). For example, high-level MPC 2108 can receive weather forecasts from weather service 2104, utility rates from utilities 2106, and/or load and rate predictions from load/rate predictor 2102. High-level MPC 2108 can receive measurements from the BMS indicating one or more measured states of the controlled building or campus (e.g., temperature, humidity, electric loads, etc.) and one or more states of outdoor subsystem 2138 (e.g., equipment status, power consumption, equipment availability, etc.).

High-level MPC 2108 can receive indoor subsystem disturbance estimates from each low-level indoor controller 2112-2116. The indoor subsystem disturbance estimates can indicate an estimated thermal energy load for each indoor subsystem 2132-2136. High-level MPC 2108 can receive aggregate system curves, aggregate subsystem parameters, and/or coefficients of performance from each low-level controller 2112-2118. High-level MPC 2108 can use the information received at communications interface 2202 to generate load profiles for each indoor subsystem 2132-2136 and a demand profile for outdoor subsystem 2138. High-level MPC 2108 can provide the load profiles and the demand profile to low-level controllers 2112-2118.

Processing circuit 2204 is shown to include a processor 2206 and memory 2208. Processor 2206 can be a general purpose or specific purpose processor, an application specific integrated circuit (ASIC), one or more field programmable gate arrays (FPGAs), a group of processing components, or other suitable processing components. Processor 2206 can be configured to execute computer code or instructions stored in memory 2208 or received from other computer readable media (e.g., CDROM, network storage, a remote server, etc.).

Memory 2208 can include one or more devices (e.g., memory units, memory devices, storage devices, etc.) for storing data and/or computer code for completing and/or facilitating the various processes described in the present disclosure. Memory 2208 can include random access memory (RAM), read-only memory (ROM), hard drive storage, temporary storage, non-volatile memory, flash memory, optical memory, or any other suitable memory for storing software objects and/or computer instructions. Memory 2208 can include database components, object code components, script components, or any other type of information structure for supporting the various activities and information structures described in the present disclosure. Memory 2208 can be communicably connected to processor 2206 via processing circuit 2204 and can include computer code for executing (e.g., by processor 2206) one or more processes described herein. When processor 2206 executes instructions stored in memory 2208, processor 2206 generally configures high-level MPC 2108 (and more particularly processing circuit 2204) to complete such activities.

Still referring to FIG. 22, high-level MPC 2108 is shown to include a subsystem temperature modeler 2214. Subsystem temperature modeler 2214 can generate a temperature model for each indoor subsystem 2132-2136. The temperature models generated by subsystem temperature modeler 2214 can be referred to as building temperature models under the assumption that each indoor subsystem 2132-2136 represents a separate building. However, the temperature models generated by subsystem temperature modeler 2214 can be temperature models for other types of subsystems if indoor subsystems 2132-2136 represent other types of spaces. Subsystem temperature modeler 2214 can generate a temperature model for each indoor subsystem. Although only three indoor subsystems 2132-2136 are shown in FIG. 21, it should be understood that any number of buildings and indoor subsystems 2132-2136 may be present. In general, subsystem temperature modeler 2214 can generate $n_b$ indoor subsystem temperature models, where $n_b$ is the total number of buildings and/or indoor subsystems 2132-2136.

In some embodiments, subsystem temperature modeler 2214 models the temperature of each indoor subsystem using a building heat transfer model. The dynamics of heating or cooling a single building zone are described by the energy balance:

$$C\frac{dT}{dt} = -H(T - T_a) - \dot{Q}_c + \dot{Q}_{other}$$

where C is the thermal capacitance of the building zone, H is the ambient heat transfer coefficient for the building zone, T is the temperature of the building zone, $T_a$ is the ambient temperature outside the building zone (e.g., the outside air temperature), $\dot{Q}_c$ is the amount of cooling applied to the building zone (i.e., the cooling load), and $\dot{Q}_{other}$ is the external load, radiation, or other disturbance experienced by the building zone. In the previous equation, $\dot{Q}_c$ represents heat transfer out of the building zone (i.e., cooling) by the HVAC system and therefore has a negative sign. However, if heating is applied to the building zone rather than cooling, the sign on $\dot{Q}_c$ can be switched to a positive sign such that $\dot{Q}_c$ represents the amount of heating applied to the building zone by the HVAC system (i.e., the heating load).

The previous equation combines all mass and air properties of the building zone into a single zone temperature. Other heat transfer models which can be used by subsystem temperature modeler 2214 include the following air and mass zone models:

$$C_z\frac{dT_z}{dt} = H_{az}(T_a - T_z) + H_{mz}(T_m - T_z) - \dot{Q}_c + \dot{Q}_{other}$$

$$C_m\frac{dT_m}{dt} = H_{mz}(T_z - T_m)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by subsystem temperature modeler 2214 include the following air, shallow mass, and deep mass zone models:

$$C_z\frac{dT_z}{dt} = H_{az}(T_a - T_z) + H_{sz}(T_s - T_z) - \dot{Q}_c + \dot{Q}_{other}$$

$$C_s \frac{dT_s}{dt} = H_{sz}(T_z - T_s) + H_{ds}(T_d - T_s)$$

$$C_d \frac{dT_d}{dt} = H_{ds}(T_s - T_d)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, subsystem temperature modeler 2214 models the temperature of each indoor subsystem using the following subsystem temperature model:

$$C_b \frac{dT_b}{dt} = -H_b(T_b - T_a) - \dot{Q}_{c,b} + \dot{Q}_{other,b}$$

where $C_b$ and $T_b$ are the thermal capacitance and temperature of the indoor subsystem designated by index b, $T_a$ is the ambient air temperature outside indoor subsystem b (e.g., outside air temperature), $H_b$ is the heat transfer coefficient between indoor subsystem b and the ambient air, $\dot{Q}_{c,b}$ is the amount of cooling applied to the indoor subsystem by MPC system 2100 (i.e., the amount of heat removed from the indoor subsystem), and $\dot{Q}_{other,b}$ is the external load, radiation, or disturbance experienced by indoor subsystem b. If heating is provided to the indoor subsystem rather than cooling, the sign on $\dot{Q}_{c,b}$ can be switched from a negative sign to a positive sign.

Subsystem temperature modeler 2214 can use the indoor subsystem disturbance estimates received from low-level indoor controllers 2112-2116 to identify appropriate values of the external disturbance $\dot{Q}_{other,b}$ for each indoor subsystem b at each time step of the optimization period. In some embodiments, subsystem temperature modeler 2214 uses the weather forecasts from weather service 2104 and/or the load and rate predictions provided by load/rate predictor 2102 to determine appropriate values for the ambient air temperature $T_a$ and/or the external disturbance $\dot{Q}_{other,b}$ for each indoor subsystem b at each time step of the optimization period. Values of $C_b$ and $H_b$ can be specified as parameters of the indoor subsystem b, received from the low-level indoor controller for the indoor subsystem b, received from a user, retrieved from memory 2208, or otherwise provided to subsystem temperature modeler 2214. Subsystem temperature modeler 2214 can generate a indoor subsystem temperature model for each indoor subsystem b, where $b=1 \ldots n_b$ and $n_b$ is the total number of indoor subsystems.

High level MPC 2108 is shown to include an outdoor unit demand modeler 2222. Outdoor unit demand modeler 2222 can generate a model representing the demand on outdoor subsystem 2138 as a function of the thermal energy load $\dot{Q}_{c,b}$ allocated to each indoor subsystem b at each time step of the optimization period. In some embodiments, outdoor unit demand modeler 2222 uses the following equation to model outdoor unit demand:

$$\dot{Q}_{HVAC,k} = \sum_{b=1}^{b_n} \dot{Q}_{c,b,k}$$

where $\dot{Q}_{HVAC,k}$ is the outdoor unit demand at time step k (e.g., the thermal energy or refrigerant state allocation of outdoor subsystem 2138 at time step k) and $\dot{Q}_{c,b,k}$ is the thermal energy load allocated to indoor subsystem b at time step k. The previous equation indicates that the total demand $\dot{Q}_{HVAC,k}$ on the outdoor subsystem 2138 is a summation of the thermal energy loads $\dot{Q}_{c,b,k}$ allocated to each indoor subsystem b. This equation can be used by high level MPC 2108 as an energy balance constraint to ensure that outdoor subsystem 2138 generates enough thermal energy to cover the indoor subsystem at each time step k.

High level MPC 2108 is shown to include a constraints modeler 2210. Constraints modeler 2210 can generate and impose optimization constraints on the optimization procedure performed by high-level optimizer 2212. Constraints imposed by constraints modeler 2210 can include, for example, equipment capacity constraints and indoor subsystem temperature constraints. In some embodiments, constraints modeler 2210 imposes the following constraint:

$$\dot{Q}_{HVAC,k} \leq \dot{Q}_{HVAC,max}$$

to ensure that the outdoor unit demand $\dot{Q}_{HVAC,k}$ at each time step k is less than or equal to the maximum capacity $\dot{Q}_{HVAC,max}$ of outdoor subsystem 2138.

In some embodiments, constraints modeler 2210 imposes constraints on the indoor subsystem temperature $T_b$. For example, constraints modeler 2210 can constrain the indoor subsystem temperature $T_b$ between a minimum temperature $T_{min}$ and a maximum temperature $T_{max}$ as shown in the following equation:

$$T_{min} \leq T_b \leq T_{max}$$

where the values of $T_{min}$ and $T_{max}$ can be adjusted based on the temperature setpoints of the indoor subsystem. In some embodiments, constraints modeler 2210 automatically adjusts the values of $T_{min}$ and $T_{max}$ based on information received from the low-level indoor controller and/or BMS for the indoor subsystem. For example, constraints modeler 2210 can use a temperature setpoint schedule and/or occupancy schedule for the indoor subsystem to automatically adjust the values of $T_{min}$ and $T_{max}$ for each time step k. This allows constraints modeler 2210 to use temperature limits based on the time-varying setpoint temperature range for the indoor subsystem so that the indoor subsystem temperature $T_b$ is maintained within time-appropriate temperature limits $T_{min}$ and $T_{max}$.

Still referring to FIG. 22, high-level MPC 2108 is shown to include an energy cost modeler 2220 and a demand charge modeler 2218. Energy cost modeler 2220 can generate an energy cost model representing the cost of energy consumed by MPC system 2100. The cost of energy can include both a per-unit cost of energy resources (e.g., electricity, water, natural gas, etc.) consumed by MPC system 2100 during the optimization period and a demand charge based on the maximum power consumption. The demand charge component of the energy cost model can be modeled by demand charge modeler 2218 and enforced via demand charge constraints. In some embodiments, the energy cost model accounts for only the energy resources consumed by outdoor subsystem 2138. In other embodiments, the energy cost model also accounts for the power consumption of indoor subsystems 2122-2126, which can be modeled by indoor power consumption modeler 2216. Examples of both scenarios are described below.

Example 1: Energy Cost Model without Indoor Power Consumption

In some embodiments, energy cost modeler 2220 generates an energy cost model that accounts for the energy consumption of outdoor subsystem 2138 without including indoor power consumption. For example, energy cost modeler 2220 can model total energy cost during the optimization period using the following equation:

$$\sum_{k=0}^{N-1} c_k \eta_{tot} \dot{Q}_{HVAC,k} \Delta + c_{peak} \eta_{tot} \dot{Q}_{peak}$$

The first term of the energy cost model accounts for the per unit costs (e.g., $/kWh) of energy consumed during each time step k of the optimization period. In some embodiments, $c_k$ is the cost per unit of energy consumed at time step k to satisfy the total outdoor unit demand $\dot{Q}_{HVAC,k}$ at time step k, the parameter $\eta_{tot}$ is the inverse of the coefficient of performance of the aggregate VRF subsystem (e.g., $0.1 \leq \eta_{tot} \leq 0.25$), and $\Delta$ is the duration of time step k. Accordingly, the term $\eta_{tot} \dot{Q}_{HVAC,k} \Delta$ represents the total amount of energy consumed (e.g., kWh) during time step k to satisfy the outdoor unit demand $\dot{Q}_{HVAC,k}$. Multiplying by the cost $c_k$ per unit energy consumed (e.g., $/kWh) yields the total cost (e.g., $) of the energy consumed during time step k. The energy cost model can include a summation of the energy costs during each time step k to determine the total cost of energy consumption over the optimization period.

The second term of the energy cost model accounts for the demand charge. In some embodiments, $c_{peak}$ is the demand charge rate (e.g., $/kW), $\dot{Q}_{peak}$ is the peak outdoor unit demand during the demand charge period (e.g., the maximum of $\dot{Q}_{HVAC,k}$), and $\eta_{tot}$ is the inverse of the coefficient of performance of the aggregate VRF subsystem. Accordingly, the term $\eta_{tot} \dot{Q}_{peak}$ represents the peak power consumption to satisfy the peak outdoor unit demand $\dot{Q}_{peak}$. Multiplying by the demand charge rate $c_{peak}$ yields the total cost (e.g., $) of the demand charge.

In some embodiments, demand charge modeler 2218 generates demand charge constraints to ensure that $\dot{Q}_{peak}$ has the appropriate value. If the demand charge period is contained entirely within the optimization period (e.g., between time steps k=0 and k=N−1), then the appropriate value of $\dot{Q}_{peak}$ is simply the maximum of $\dot{Q}_{HVAC,k}$ during the optimization period. Demand charge modeler 2218 can implement the following demand charge constraint:

$$0 \leq \dot{Q}_{HVAC,k} \leq \dot{Q}_{peak}$$

to ensure that the peak outdoor unit demand $\dot{Q}_{peak}$ is always greater than or equal to the outdoor unit demand $\dot{Q}_{HVAC,k}$ at each time step. This forces the peak outdoor unit demand $\dot{Q}_{peak}$ to be at least as large as the maximum outdoor unit demand during the optimization period.

If the demand charge period begins before the optimization period, it is possible that the maximum value of $\dot{Q}_{HVAC,k}$ during the demand charge period occurred prior to the beginning of the optimization period. Demand charge modeler 2218 can implement the following demand charge constraint:

$$\dot{Q}_{peak,past} \leq \dot{Q}_{peak}$$

to ensure that the peak outdoor unit demand $\dot{Q}_{peak}$ is always greater than or equal to the maximum outdoor unit demand $\dot{Q}_{peak,past}$ that occurred during the same demand charge period, even if the maximum outdoor unit demand occurred prior to the beginning of the current optimization period. In some embodiments, demand charge modeler 2218 updates $\dot{Q}_{peak,past}$ each time a new maximum outdoor unit demand is set to ensure that the energy cost model accurately represents the demand charge imposed by the power utility.

High-level optimizer 2212 can use the energy cost model, demand charge model, indoor subsystem temperature model, outdoor unit demand model, and optimization constraints to formulate an optimization problem. In some embodiments, high-level optimizer 2212 seeks to minimize the total cost of energy consumed by outdoor subsystem 2138 (i.e., energy cost and demand charge) subject to the indoor subsystem temperature constraints and other constraints provided by the high-level models described herein. For example, high-level optimizer 2212 can formulate the high-level optimization problem as:

$$\min_{x, u, \dot{Q}_{peak}} \sum_{k=0}^{N-1} c_k \eta_{tot} \dot{Q}_{HVAC,k} \Delta + c_{peak} \eta_{tot} \dot{Q}_{peak}$$

subject to the following constraints:

$$C_b \frac{dT_b}{dt} = -H_b(T_b - T_a) - \dot{Q}_{c,b} + \dot{Q}_{other,b}$$

$$\dot{Q}_{HVAC,k} = \sum_{b=1}^{b_n} \dot{Q}_{c,b,k}$$

$$0 \leq \dot{Q}_{HVAC,k} \leq \dot{Q}_{peak}$$

$$\dot{Q}_{peak,past} \leq \dot{Q}_{peak} \leq \dot{Q}_{HVAC,max}$$

$$T_{min} \leq T_b \leq T_{max}$$

and any refrigerant balance constraints needed to ensure that the amount of refrigerant in each state (e.g., liquid, gas, superheated gas, etc.) remains balanced at each time step k.

In some embodiments, high-level optimizer 2212 converts one or more of the above-identified models and/or constraints to state-space form for use in the high-level optimization problem. For example, high-level optimizer 2212 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. Table 1 illustrates the variables that can be included in each of these vectors:

TABLE 1

| Variables in High-Level Optimization | | |
|---|---|---|
| States | $x = [T_b]^T$ | $n = n_b$ |
| Inputs | $u = [\dot{Q}_{c,b}]^T$ | $m = n_b$ |

TABLE 1-continued

Variables in High-Level Optimization

| Measurements | $y = [T_b]^T$ | $p = n_b$ |
|---|---|---|
| Disturbances | $d = [T_a \ \dot{Q}_{other,b}]^T$ | $n_d = n_b + 1$ |

As shown in Table 1, the system states vector x includes the indoor subsystem temperature $T_b$. In some embodiments, the system states vector x includes a indoor subsystem temperature $T_b$ for each of the $n_b$ indoor subsystems such that the total number n of variables in the system states vector x is equal to $n_b$. The inputs vector u can include the thermal energy load $\dot{Q}_{c,b}$ allocated to each indoor subsystem b. In some embodiments, the inputs vector u includes a thermal energy load $\dot{Q}_{c,b}$ for each of the $n_b$ indoor subsystems such that the total number m of variables in the inputs vector u is equal to $n_b$. The disturbance vector d can include the ambient air temperature $T_a$ and the estimated disturbance $\dot{Q}_{other,b}$ for each indoor subsystem. In some embodiments, the disturbances vector d includes an estimated disturbance $\dot{Q}_{other,b}$ for each of the $n_b$ indoor subsystems and a single ambient air temperature $T_a$ such that the total number $n_d$ of variables in the disturbances vector d is equal to $n_b+1$.

In some embodiments, the measurements vector y is the same as the system states vector x. This indicates that all of the system states are directly measured (i.e., $y_k=x_k$) and the values of the C and D matrices in the state-space model are C=1 and D=0. In other embodiments, the system states x can be constructed or predicted from the measurements y. For example, high-level MPC 2108 can use a Kalman filter or other predictive technique to construct the system states x from the measurements y. Accordingly, the system states x can be replaced with $\hat{T}_b$, where the hat notation indicates that such states are predicted. The values of the A, B, C, and D, matrices in the state-space representation can be identified using a system identification technique. Examples of state prediction and system identification techniques which can be used by high-level MPC 2108 are described in detail in U.S. Pat. No. 9,235,657 titled "System Identification and Model Development" and filed Mar. 13, 2013, the entire disclosure of which is incorporated by reference herein.

Example 2: Energy Cost Model with Indoor Power Consumption

In some embodiments, energy cost modeler 2220 generates an energy cost model that accounts for both the energy consumption of outdoor subsystem 2138 and the energy consumption of indoor subsystems 2122-2126. For example, the energy cost model can account for the power $\dot{W}_{air,b}$ consumed by fans and other types of equipment in indoor VRF units 2122-2126 to deliver the allocated thermal energy load $\dot{Q}_{c,b}$ to the indoor subsystem. In some embodiments, the power consumption $\dot{W}_{air,b}$ of each indoor subsystem 2132-2136 is a function of the thermal energy load $\dot{Q}_{c,b}$ allocated to that indoor subsystem.

Indoor power consumption modeler 2216 can generate an indoor power consumption model which relates indoor power consumption $\dot{W}_{air,b}$ to thermal energy load $\dot{Q}_{c,b}$. In some embodiments, indoor power consumption modeler 2216 models indoor power consumption using the following equation:

$$\dot{W}_{air,b} = \eta_{air} \dot{Q}_{c,b}$$

where $\dot{W}_{air,b}$ is the amount of power consumed by the indoor VRF units 2122 of indoor subsystem b to deliver the thermal energy load $\dot{Q}_{c,b}$. The conversion factor $\eta_{air}$ can be a function of the coefficient of performance of the indoor VRF units 2122 (e.g., an inverse of the coefficient of performance). In some embodiments, $\eta_{air}$ is a constant, which indicates that the relationship between indoor power consumption $\dot{W}_{air,b}$ and thermal energy load $\dot{Q}_{c,b}$ is linear. In other embodiments, $\eta_{air}$ can be calculated by indoor power consumption modeler 2216 as a nonlinear function of load and other parameters using operating data.

In some embodiments, indoor power consumption modeler 2216 calculates the conversion factor $\eta_{air}$ as a function of various system parameters such as the type of indoor VRF unit in the indoor subsystem, the time of day, comfort bounds, ambient conditions, chilled water supply temperature, chilled water supply flow rate, and/or other parameters that characterize indoor subsystems 2132-2136 or any of the indoor subsystems 2132-2136. For example, indoor power consumption modeler 2216 can collect operating data from indoor VRF units 2122 and/or low-level indoor controller 2112 and use the operating data to determine an appropriate value of $\eta_{air}$.

In some embodiments, indoor power consumption modeler 2216 calculates $\eta_{air}$ as a function of the thermal energy load $\dot{Q}_c$ and individual fan power models. For example, air at 20° C. can have a density $\rho_{air}$ and heat capacity $C_{p,air}$ as shown in the following equations:

$$\rho_{air} = 1.205 \frac{\text{kg}}{\text{m}^3}$$

$$C_{p,air} = 1.005 \frac{\text{kJ}}{\text{kg} \cdot \text{K}}$$

The thermal energy load $\dot{Q}_c$ provided by an airflow can be represented using the following model:

$$\dot{Q}_c = \dot{m}_{air} C_{p,air} \Delta T$$

$$\dot{Q}_c = \rho_{air} \dot{V}_{air} C_{p,air}(T_{room} - T_{supply})$$

$$\frac{\dot{Q}_c}{\dot{V}_{air}} = \rho_{air} C_{p,air}(T_{room} - T_{supply})$$

where $\dot{V}_{air}$ is the volumetric flow rate of supply air into a building zone, $T_{room}$ is the temperature of the building zone, and $T_{supply}$ is the temperature of the supply air. Assuming that the supply air temperature $T_{supply}$ is approximately 55° F. and the room air temperature $T_{room}$ is approximately 72° F., indoor power consumption modeler 2216 can calculate the thermal energy load per unit volume of airflow (e.g., the cooling capacity of the air) as follows:

$$\frac{\dot{Q}_c}{\dot{V}_{air}} = \left(1.205 \frac{\text{kg}}{\text{m}^3}\right)\left(1.005 \frac{\text{kJ}}{\text{kg} \cdot \text{K}}\right)(72° \text{ F.} - 55° \text{ F.})\left(\frac{5 \text{ K}}{9° \text{ F.}}\right)$$

$$\frac{\dot{Q}_c}{\dot{V}_{air}} = 11.437 \frac{\text{kJ}}{\text{m}^3}$$

Indoor power consumption modeler 2216 can use this value of cooling capacity $\dot{Q}_c/\dot{V}_{air}$ and the estimated power consumption per unit volume of a typical indoor VRF unit fan to estimate the value of $\eta_{air}$. For example, typical HVAC fans consume approximately 1 horsepower (hp) to provide between 16000 cubic feet per minute (CFM) and 12000 CFM of airflow. These values can be converted to metric values as follows:

$$\left(\frac{1 \text{ hp}}{16000 \text{ CFM} - 12000 \text{ CFM}}\right)\left(\frac{2118.9 \text{ CFM}}{1 \text{ m}^3/\text{s}}\right)\left(\frac{0.7457 \text{ kW}}{\text{hp}}\right) =$$

$$1.05 \frac{\text{kJ}}{\text{m}^3} - 1.58 \frac{\text{kJ}}{\text{m}^3}$$

Substituting these values into the indoor power consumption model yields:

$$\frac{\dot{W}_{air}}{\dot{V}_{air}} = \eta_{air} \frac{\dot{Q}_c}{\dot{V}_{air}}$$

$$1.05 \frac{\text{kJ}}{\text{m}^3} - 1.58 \frac{\text{kJ}}{\text{m}^3} = \eta_{air} 11.437 \frac{\text{kJ}}{\text{m}^3}$$

$$\eta_{air} = 0.091 - 0.14$$

which indicates that the indoor power consumption $\dot{W}_{air,b}$ of each indoor subsystem 2132-2136 is approximately 10% of the thermal energy load $\dot{Q}_{c,b}$ delivered by the indoor subsystem.

Given that indoor power consumption $\dot{W}_{air,b}$ can be modeled as $\eta_{air}\dot{Q}_{c,b}$, energy cost modeler 2220 can model total energy cost during the optimization period using the following equation:

$$\sum_{k=0}^{N-1} c_k \left( \eta_{HVAC} \dot{Q}_{HVAC,k} + \eta_{air} \sum_{b=1}^{n_b} \dot{Q}_{c,b,k} \right) \Delta + c_{peak} \dot{W}_{peak}$$

The first portion of the energy cost model accounts for the per unit costs (e.g., $/kWh) of energy consumed by outdoor subsystem 2138 during each time step k of the optimization period. In some embodiments, $c_k$ is the cost per unit of energy consumed at time step k, $\Delta$ is the duration of time step k, and $\eta_{HVAC}$ is the inverse of the coefficient of performance of outdoor subsystem 2138 (e.g., $\eta_{HVAC}$~0.2). The term HVAC HVAC,k represents the amount of power consumption (e.g., kW) by outdoor subsystem 2138 during time step k to satisfy the outdoor unit demand $\dot{Q}_{HVAC,k}$. Multiplying by the cost $c_k$ per unit energy consumed (e.g., $/kWh) and the duration $\Delta$ (e.g., hours) yields the total cost (e.g., $) of the energy consumed during time step k by outdoor subsystem 2138. The first portion of the energy cost model can be summed across all time steps k=0 . . . N−1 of the optimization period to determine the total energy consumed by outdoor subsystem 2138 over the duration of the optimization period.

The second portion of the energy cost model accounts for the per unit costs (e.g., $/kWh) of energy consumed by each indoor subsystem during each time step k of the optimization period. As described above, $\eta_{air}$ is the inverse of the coefficient of performance of the indoor subsystems (e.g., $\eta_{air}$~0.1) and $\dot{Q}_{c,b,k}$ is the thermal energy load delivered by the indoor subsystem b at time step k. The term $\eta_{air}\dot{Q}_{c,b,k}$ represents the power consumption $\dot{W}_{air,b}$ of the indoor VRF units for subsystem b. The second portion of the energy cost model can be summed across all indoor subsystems b=1 . . . $n_b$ and across all time steps k=0 . . . N−1 to determine the total power consumption of all indoor subsystems over the duration of the optimization period. Multiplying by the cost $c_k$ per unit energy consumed (e.g., $/kWh) and the duration $\Delta$ (e.g., hours) yields the total cost (e.g., $) of the energy consumed by the indoor subsystems over the duration of the optimization period.

The third portion of the energy cost model accounts for the demand charge. In some embodiments, $c_{peak}$ is the demand charge rate (e.g., $/kW) and $\dot{W}_{peak}$ is the peak aggregate indoor and outdoor power consumption during the applicable demand charge period. Multiplying by the demand charge rate $c_{peak}$ yields the total cost (e.g., $) of the demand charge. In some embodiments, demand charge modeler 2218 generates demand charge constraints to ensure that $\dot{W}_{peak}$ has the appropriate value. If the demand charge period is contained entirely within the optimization period (e.g., between time steps k=0 and k=N−1), then the appropriate value of $\dot{W}_{peak}$ is the maximum of the combined indoor/outdoor power consumption at any time step k during the optimization period. Demand charge modeler 2218 can implement the following demand charge constraint:

$$0 \leq \left( \eta_{HVAC} \dot{Q}_{HVAC,k} + \eta_{air} \sum_{b=1}^{n_b} \dot{Q}_{c,b,k} \right) \leq \dot{W}_{peak}$$

to ensure that the peak power consumption $\dot{W}_{peak}$ is always greater than or equal to the sum of the outdoor power consumption $\eta_{HVAC}\dot{Q}_{HVAC,k}$ and the indoor power consumption $\eta_{air}\Sigma_{b=1}^{n_b}\dot{Q}_{c,b,k}$ at each time step. This forces the peak power consumption $\dot{W}_{peak}$ to be at least as large as the maximum combined indoor/outdoor power consumption during the optimization period.

If the demand charge period begins before the optimization period, it is possible that the maximum peak power consumption during the demand charge period occurred prior to the beginning of the optimization period. Demand charge modeler 2218 can implement the following demand charge constraint:

$$\dot{W}_{peak,past} \leq \dot{W}_{peak}$$

to ensure that the peak power consumption $\dot{W}_{peak}$ is always greater than or equal to the maximum power consumption $\dot{W}_{peak,past}$ that occurred during the same demand charge period, even if the maximum power consumption occurred prior to the beginning of the current optimization period. In some embodiments, demand charge modeler 2218 updates $\dot{W}_{peak,past}$ each time a new maximum power consumption is set to ensure that the energy cost model accurately represents the demand charge imposed by the power utility.

High-level optimizer 2212 can use the energy cost model, indoor power consumption model, demand charge model, indoor subsystem temperature model, outdoor unit demand model, and optimization constraints to formulate an optimization problem. In some embodiments, high-level optimizer 2212 seeks to minimize the total cost of energy consumed by the aggregate VRF system subject to the indoor subsystem temperature constraints and other constraints provided by the high-level models described herein. For example, high-level optimizer 2212 can formulate the high-level optimization problem as:

$$\min_{x,u,\dot{W}_{peak}} \sum_{k=0}^{N-1} c_k \left( \eta_{HVAC} \dot{Q}_{HVAC,k} + \eta_{air} \sum_{b=1}^{n_b} \dot{Q}_{c,b,k} \right) \Delta + c_{peak} \dot{W}_{peak}$$

subject to the following constraints:

$$C_b \frac{dT_b}{dt} = -H_b(T_b - T_a) - \dot{Q}_{c,b} + \dot{Q}_{other,b}$$

$$\dot{Q}_{HVAC,k} = \sum_{b=1}^{b_n} \dot{Q}_{c,b,k}$$

$$0 \leq \left( \eta_{HVAC} \dot{Q}_{HVAC,k} + \eta_{air} \sum_{b=1}^{n_b} \dot{Q}_{c,b,k} \right) \leq \dot{W}_{peak}$$

$$\dot{W}_{peak,past} \leq \dot{W}_{peak}$$

$$0 \leq \dot{Q}_{HVAC,k} \leq \dot{Q}_{HVAC,max}$$

$$T_{min} \leq T_b \leq T_{max}$$

and any refrigerant balance constraints, as previously described.

In some embodiments, high-level optimizer 2212 converts one or more of the above-identified models and/or constraints to state-space form for use in the high-level optimization problem. For example, high-level optimizer 2212 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. The variables included in each vector can be the same as shown in Table 1 above.

High-level optimizer 2212 can perform an optimization procedure to determine optimal values for each the input variables in the vector u at each time step k of the optimization period. For example, high-level optimizer 2212 can determine optimal values for each of the thermal energy loads $\dot{Q}_{c,b,k}$ allocated to each indoor subsystem b at each time step k at each time step k. Each set of thermal energy loads $\dot{Q}_{c,b}$, with the same indoor subsystem index b forms a load profile for a particular indoor subsystem and includes a load value for each time step k in the optimization period. High-level optimizer 2212 can provide the indoor subsystem load profiles to the low-level indoor controllers 2112-2116.

In some embodiments, high-level optimizer 2212 generates a vector of predicted temperature states $\hat{T}_b$ for each low-level indoor subsystem 2132-2136. Each vector of predicted temperature states $\hat{T}_b$ can include a predicted temperature state $\hat{T}_{b,k}$ for each time step k during the optimization period. Temperature states $\hat{T}_{b,k}$ can be predicted using any of a variety of predictive techniques including, for example, a Kalman filter as described in U.S. Pat. No. 9,235,657. High-level optimizer 2212 can provide each vector of predicted temperature states $\hat{T}_b$ to the low-level indoor controller 2112-2116 for the corresponding low-level indoor subsystem 2132-2136. In some embodiments, low-level indoor controllers 2112-2116 use the predicted temperature states $\hat{T}_b$ to generate zone temperature setpoints that track the predicted temperature states $\hat{T}_{b,k}$ at each time step k.

In some embodiments, high-level optimizer 2212 calculates the total demand $\dot{Q}_{HVAC,k}$ on outdoor subsystem 2138 at each time step k as a summation of the indoor subsystem thermal energy loads $\dot{Q}_{c,b,k}$ at time step k. The set of outdoor unit demand values forms a demand profile for outdoor subsystem 2138 and includes a demand value for each time step k in the optimization period. The demand value $\dot{Q}_{HVAC,k}$ for a particular time step k represents the total demand which must be satisfied by outdoor subsystem 2138 at that time step k. High-level optimizer 2212 can provide the outdoor unit demand profile to low-level outdoor controller 2118.

Low-Level Indoor Model Predictive Controller

Figure 23:
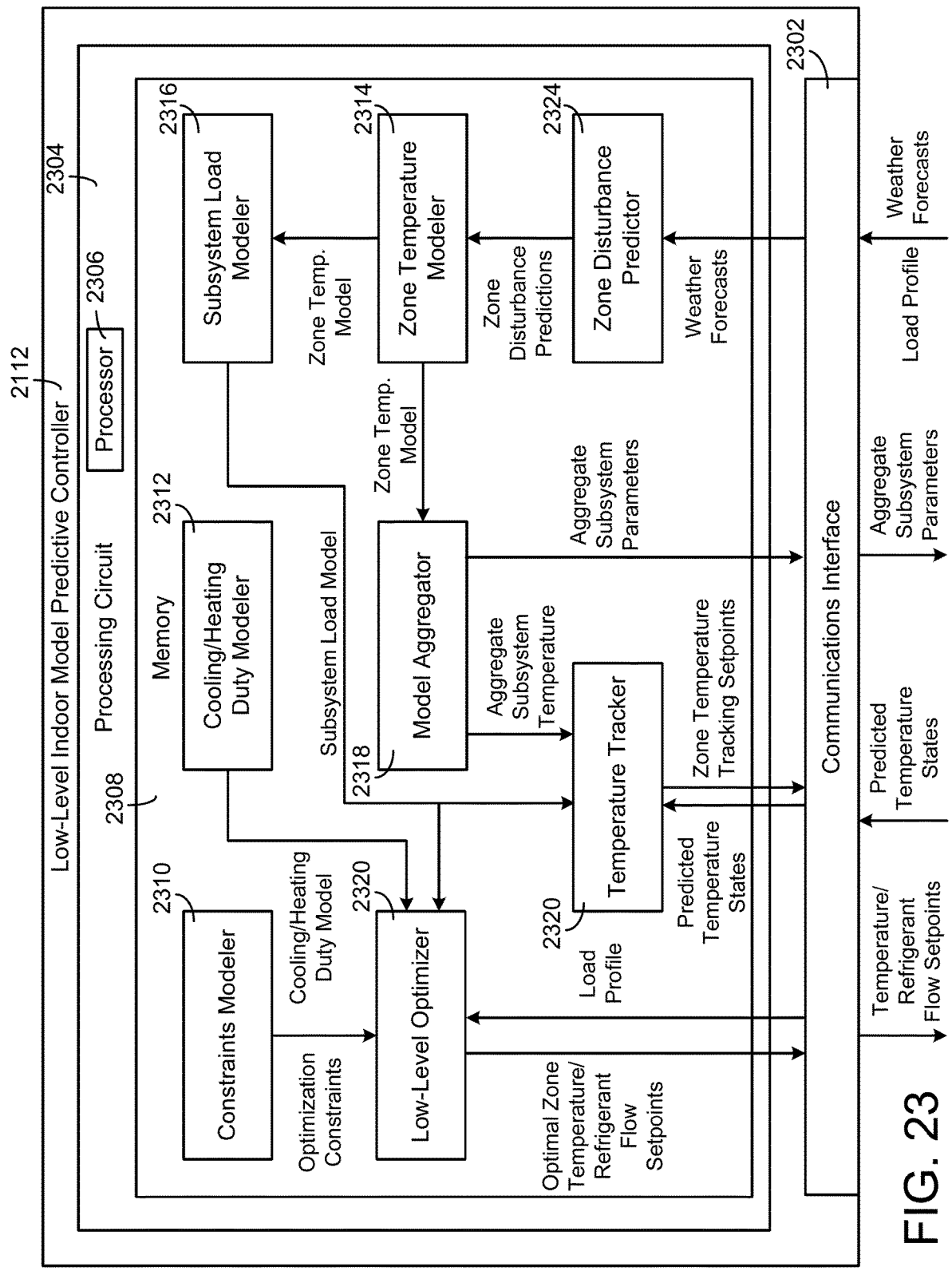
FIG. 23 is a block diagram illustrating one of the low-level indoor model predictive controllers of FIG. 21 in greater detail, according to some embodiments.

Referring now to FIG. 23, a block diagram illustrating low-level indoor model predictive controller (MPC) 2112 in greater detail is shown, according to some embodiments. Although only one low-level indoor MPC 2112 is shown in detail, it should be understood that any other low-level indoor MPCs in control system 2100 (e.g., low-level indoor MPCs 2114-2116) can include some or all of the same components as low-level indoor MPC 2112. Control system 2100 can include any number of low-level indoor MPCs, each of which can operate independently to monitor and control a separate low-level indoor subsystem (e.g., indoor subsystems 2132-2136).

Low-level indoor MPC 2112 is shown a communications interface 2302 and a processing circuit 2304. Communications interface 2302 can include wired or wireless interfaces (e.g., jacks, antennas, transmitters, receivers, transceivers, wire terminals, etc.) for conducting data communications with various systems, devices, or networks. For example, communications interface 2302 can include an Ethernet card and port for sending and receiving data via an Ethernet-based communications network and/or a WiFi transceiver for communicating via a wireless communications network. Communications interface 2302 can be configured to communicate via local area networks or wide area networks (e.g., the Internet, a building WAN, etc.) and may use a variety of communications protocols (e.g., BACnet, IP, LON, etc.).

Communications interface 2302 can be a network interface configured to facilitate electronic data communications between low-level indoor MPC 2112 and various external systems or devices (e.g., weather service 2104, high-level MPC 2108, indoor VRF units 2122, etc.). For example, low-level indoor MPC 2112 can receive weather forecasts from weather service 2104 and/or load predictions from load/rate predictor 2102. Low-level indoor MPC 2112 can receive measurements from the BMS indicating one or more measured states of the controlled building or campus (e.g., temperature, humidity, electric loads, etc.) and one or more states of indoor subsystem 2132 (e.g., equipment status, power consumption, equipment availability, etc.). Low-level indoor MPC 2112 can receive predicted temperature states and/or a load profile from high-level MPC 2108. Low-level indoor MPC 2112 can use the information received at communications interface 2302 to generate zone temperature setpoints each zone of low-level indoor subsystem 2132 and/or refrigerant flow setpoints for each indoor VRF unit of low-level indoor subsystem 2132. Low-level indoor MPC 2112 can provide the zone temperature setpoints and/or refrigerant flow setpoints to indoor VRF units 2122.

Processing circuit 2304 is shown to include a processor 2306 and memory 2308. Processor 2306 can be a general purpose or specific purpose processor, an application specific integrated circuit (ASIC), one or more field programmable gate arrays (FPGAs), a group of processing components, or other suitable processing components. Processor 2306 can be configured to execute computer code or instructions stored in memory 2308 or received from other computer readable media (e.g., CDROM, network storage, a remote server, etc.).

Memory 2308 can include one or more devices (e.g., memory units, memory devices, storage devices, etc.) for storing data and/or computer code for completing and/or facilitating the various processes described in the present disclosure. Memory 2308 can include random access memory (RAM), read-only memory (ROM), hard drive storage, temporary storage, non-volatile memory, flash memory, optical memory, or any other suitable memory for storing software objects and/or computer instructions. Memory 2308 can include database components, object code components, script components, or any other type of information structure for supporting the various activities and information structures described in the present disclosure. Memory 2308 can be communicably connected to processor 2306 via processing circuit 2304 and can include computer code for executing (e.g., by processor 2306) one or more processes described herein. When processor 2306 executes instructions stored in memory 2308, processor 2306 generally configures low-level indoor MPC 2112 (and more particularly processing circuit 2304) to complete such activities.

Still referring to FIG. 23, low-level indoor MPC 2112 is shown to include a zone disturbance predictor 2324. Zone disturbance predictor 2324 can generate a disturbance forecast for each zone i of indoor subsystem 2132. Throughout this disclosure, the index i is used to denote individual zones, where i=1 ... $n_z$ and $n_z$ is the total number of zones in a given indoor subsystem. In some embodiments, each zone i is uniquely associated with a particular indoor VRF unit configured to control the temperature of the zone i. Accordingly, the index i can also denote individual indoor VRF units. The disturbance forecast for zone i can include a vector of disturbance values $\dot{Q}_{other,i}$, where each element of the vector $\dot{Q}_{other,i}$ includes a predicted disturbance value $\dot{Q}_{other,i,k}$ for a particular time step k of the optimization period.

Zone disturbance predictor 2324 is shown receiving weather forecasts from a weather service 2104. In some embodiments, zone disturbance predictor 2324 generates the disturbance forecasts as a function of the weather forecasts. In some embodiments, zone disturbance predictor 2324 uses feedback from regulatory layer 2120 to generate the disturbance forecasts. Feedback from regulatory layer 2120 can include various types of sensory inputs (e.g., temperature, flow, humidity, enthalpy, etc.) or other data relating to the controlled building or campus (e.g., building occupancy data, building electric load, etc.). In some embodiments, zone disturbance predictor 2324 uses a deterministic plus stochastic model trained from historical load data to generate the disturbance forecasts. Zone disturbance predictor 2324 can use any of a variety of prediction methods to generate the disturbance forecasts (e.g., linear regression for the deterministic portion and an autoregressive model for the stochastic portion).

Zone disturbance predictor 2324 can predict one or more different types of disturbances for each building zone i. For example, zone disturbance predictor 2324 can predict a thermal load resulting from heat transfer between the air within building zone i and outside air through the walls of the building. Zone disturbance predictor 2324 can predict a thermal load resulting from internal heat generation within the building zone (e.g., heat generated by electronics in the building zone, heat generated by zone occupants, etc.). In some embodiments, zone disturbance predictor 2324 makes disturbance predictions using the predictive techniques described in U.S. patent application Ser. No. 14/717,593.

Still referring to FIG. 23, low-level indoor MPC 2112 is shown to include a zone temperature modeler 2314. Zone temperature modeler 2314 can generate a temperature model for each building zone i of indoor subsystem 2132. Indoor subsystem 2132 can have any number of zones. In some embodiments, the temperature of each zone can be independently controlled and/or adjusted. Some building zones can exchange heat with each other (e.g., if the building zones are adjacent to one another), whereas other building zones do not directly exchange energy. In general, zone temperature modeler 2314 can generate $n_z$ zone temperature models, where $n_z$ is the total number of zones in indoor subsystem 2132.

In some embodiments, zone temperature modeler 2314 models the temperature of each building zone using a zone heat transfer model. The dynamics of heating or cooling a single building zone are described by the energy balance:

$$C\frac{dT}{dt} = -H(T - T_a) - \dot{Q}_c + \dot{Q}_{other}$$

where C is the thermal capacitance of the building zone, H is the ambient heat transfer coefficient for the building zone, T is the temperature of the building zone, $T_a$ is the ambient temperature outside the building zone (e.g., the outside air temperature), $\dot{Q}_c$ is the amount of cooling applied to the building zone (i.e., the cooling load), and $\dot{Q}_{other}$ is the external load, radiation, or other disturbance experienced by the building zone. In the previous equation, $\dot{Q}_c$ represents heat transfer out of the building zone (i.e., cooling) by the HVAC system and therefore has a negative sign. However, if heating is applied to the building zone rather than cooling, the sign on $\dot{Q}_c$ can be switched to a positive sign such that $\dot{Q}_c$ represents the amount of heating applied to the building zone by the HVAC system (i.e., the heating load).

The previous equation combines all mass and air properties of the building zone into a single zone temperature. Other heat transfer models which can be used by zone temperature modeler 2314 include the following air and mass zone models:

$$C_z\frac{dT_z}{dt} = H_{az}(T_a - T_z) + H_{mz}(T_m - T_z) - \dot{Q}_c + \dot{Q}_{other}$$

$$C_m\frac{dT_m}{dt} = H_{mz}(T_z - T_m)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by zone temperature modeler 2314 include the following air, shallow mass, and deep mass zone models:

$$C_z \frac{dT_z}{dt} = H_{az}(T_a - T_z) + H_{sz}(T_s - T_Z) - \dot{Q}_c + \dot{Q}_{other}$$

$$C_s \frac{dT_s}{dt} = H_{sz}(T_Z - T_s) + H_{ds}(T_d - T_s)$$

$$C_d \frac{dT_d}{dt} = H_{ds}(T_s - T_d)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, zone temperature modeler 2314 models the temperature of each building zone using the following zone temperature model:

$$c_i \frac{dT_i}{dt} = -H_i(T_i - T_a) - \sum_{j \neq i} \beta_{ij}(T_i - T_j) - \dot{Q}_{c,i} + \dot{Q}_{other,i}$$

where $C_i$ and $T_i$ are the thermal capacitance and temperature of the building zone designated by zone index i, $T_a$ is the ambient air temperature outside zone i (e.g., outside air temperature), $H_i$ is the heat transfer coefficient between zone i and the ambient air, $\dot{Q}_{c,i}$ is the amount of cooling applied to the building zone i by MPC system 2100 (i.e., the amount of heat removed from the zone), and $\dot{Q}_{other,i}$ is the external load, radiation, or disturbance experienced by zone i. If heating is provided to the zone rather than cooling, the sign on $\dot{Q}_{c,i}$ can be switched from a negative sign to a positive sign.

The parameter $\beta_{ij}$ characterizes the degree of coupling between zone i and another zone j (e.g., a building zone adjacent to zone i). If zones i and j are not adjacent and/or do not directly exchange heat with each other, zone temperature modeler 2314 can set the value of $\beta_{ij}$ equal to zero. The zone temperature model can include a summation of the heat transfers between building zone i and each other building zone j≠i as a function of the zone temperatures $T_i$ and $T_j$ and the coupling coefficient $\beta_{ij}$. In other embodiments, heat transfer between zones can be accounted for using the external disturbance estimate $\dot{Q}_{other,i}$.

Zone temperature modeler 2314 can use the zone disturbance estimates received from zone disturbance predictor 2324 to identify appropriate values of the external disturbance $\dot{Q}_{other}$ for each zone i at each time step of the optimization period. In some embodiments, zone temperature modeler 2314 uses the weather forecasts from weather service 2104 and/or the load and rate predictions provided by load/rate predictor 2102 to determine appropriate values for the ambient air temperature $T_a$ and/or the external disturbance $\dot{Q}_{other,i}$ for each zone i at each time step of the optimization period. Values of $C_i$ and $H_i$ can be specified as parameters of the zone i, received from the BMS that manages the building zone i, received from a user, retrieved from memory 2308, or otherwise provided to zone temperature modeler 2314. Zone temperature modeler 2314 can generate a zone temperature model for each zone i, where i=1 . . . $n_z$ and $n_z$ is the total number of zones.

Still referring to FIG. 23, low-level indoor MPC 2112 is shown to include a subsystem load modeler 2316. Subsystem load modeler 2316 can generate a model of the total amount of thermal energy delivered to the indoor subsystem $Q_{total}$ (e.g., the total amount of heating or cooling delivered to the subsystem) as a function of the individual zone loads $\dot{Q}_{c,i}$. In some embodiments, subsystem load modeler 2316 models the total subsystem load using the following equation:

$$\frac{dQ_{total}}{dt} = \sum_{i=1}^{n_z} \dot{Q}_{c,i}$$

where $Q_{total}$ is the total amount of thermal energy (e.g., heating or cooling) delivered to the indoor subsystem and $\dot{Q}_{c,i}$ is the rate at which thermal energy is being delivered (units of power) of a particular zone i. The indoor subsystem load model can sum the thermal energy loads $\dot{Q}_{c,i}$ of each building zone to calculate the total indoor subsystem thermal energy load $$\frac{dQ_{total}}{dt},$$

which is the derivative of the total amount of thermal energy $Q_{total}$ delivered to the indoor subsystem.

Low-level indoor MPC 2112 is shown to include a cooling/heating duty modeler 2320. Cooling/heating duty modeler 2320 can generate one or more models that define the thermal energy load $\dot{Q}_{c,i}$ of each building zone as a function of the zone temperature $T_i$ and a zone setpoint $u_i$ as shown in the following equation:

$$\dot{Q}_{c,i} = f(T_i, u_i)$$

The models generated by cooling/heating duty modeler 2320 can be used as optimization constraints to ensure that the thermal energy load $\dot{Q}_{c,i}$ is not reduced to a value that would cause the zone temperature $T_i$ to deviate from an acceptable or comfortable temperature range.

In some embodiments, the zone setpoint $u_i$ includes an operating mode setpoint $z_i$ (e.g., heating or cooling) and a refrigerant flow setpoint $m_i$. For example, the zone setpoint $u_i$ can be represented as follows:

$$u_i = \begin{bmatrix} z_i \\ m_i \end{bmatrix}$$

where the variable $z_i$ denotes the operating mode of the indoor VRF unit for building zone i and the variable $m_i$ denotes the refrigerant flow rate setpoint for the indoor VRF unit for building zone i. In some embodiments, the operating mode $z_i$ is a binary variable, as shown in the following equation:

$$z_i = \begin{cases} 1 & \text{Cooling} \\ 0 & \text{Heating(Not Cooling)} \end{cases}$$

where a value of $z_i=1$ indicates that the operating mode is cooling, whereas a value of $z_i=0$ indicates that the operating mode is heating or not cooling.

In some embodiments, cooling/heating duty modeler 2320 relates zone thermal energy load $\dot{Q}_{c,i}$ (i.e., the cooling duty or heating duty of building zone i) to refrigerant flow $m_i$ using the following model:

$$\dot{Q}_{c,i} = \begin{cases} \alpha_{i,c}(T_i) \cdot m_i & \text{if } z_i = 1 \\ \alpha_{i,h}(T_i) \cdot m_i & \text{if } z_i = 0 \end{cases}$$

where $\alpha_{i,c}(T_i)$ is a conversion factor between zone cooling duty (i.e., zone thermal energy load $\dot{Q}_{c,i}$ when the operating mode is cooling) and the refrigerant flow $m_i$, and $\alpha_{i,h}(T_i)$ is a conversion factor between zone heating duty (i.e., zone thermal energy load $\dot{Q}_{c,i}$ when the operating mode is heating) and the refrigerant flow $m_i$. In some embodiments, both conversion factors $\alpha_{i,c}(T_i)$ and $\alpha_{i,h}(T_i)$ are a function of the zone temperature $T_i$. The relationships between zone temperature $T_i$ and the conversion factors $\alpha_{i,c}(T_i)$ and $\alpha_{i,h}(T_i)$ can be predefined such that cooling/heating duty modeler 2320 can calculate the values of $\alpha_{i,c}(T_i)$ and $\alpha_{i,h}(T_i)$ based on a measured or estimated zone temperature $T_i$. In other embodiments, one or both conversion factors $\alpha_{i,c}(T_i)$ and $\alpha_{i,h}(T_i)$ can have constant values, in which case the cooling/heating duty model can be formulated as a mixed integer linear program (MILP).

In some embodiments, the zone setpoint $u_i$ is a zone temperature setpoint $T_{sp,i}$. Cooling/heating duty modeler 2320 can relate zone thermal energy load $\dot{Q}_{c,i}$ to the zone temperature $T_i$ and the zone temperature setpoint $T_{sp,i}$ using multiple models. For example, cooling/heating duty modeler 2320 can use a model of the zone regulatory controller to determine the control action performed by the controller as a function of the zone temperature $T_i$ and the zone temperature setpoint $T_{sp,i}$. An example of such a zone regulatory controller model is shown in the following equation:

$$v_{air,i} = f_1(T_i, T_{sp,i})$$

where $v_{air,i}$ is the rate of airflow to building zone i (i.e., the control action). The function $f_1$ can be identified from data. For example, cooling/heating duty modeler 2320 can collect measurements of $v_{air,i}$ and $T_i$ and identify the corresponding value of $T_{sp,i}$. Cooling/heating duty modeler 2320 can perform a system identification process using the collected values of $v_{air,i}$, $T_i$, and $T_{sp,i}$ as training data to determine the function $f_1$ that defines the relationship between such variables.

Cooling/heating duty modeler 2320 can use an energy balance model relating the control action $v_{air,i}$ to the zone thermal energy load $\dot{Q}_{c,i}$, as shown in the following equation:

$$\dot{Q}_{c,i} = f_2(v_{air,i})$$

where the function $f_2$ can be identified from training data. Cooling/heating duty modeler 2320 can perform a system identification process using collected values of $v_{air,i}$ and $\dot{Q}_{c,i}$ to determine the function $f_2$ that defines the relationship between such variables.

In some embodiments, a linear relationship exists between $\dot{Q}_{c,i}$ and $v_{air,i}$. Assuming an ideal proportional-integral (PI) controller and a linear relationship between $\dot{Q}_{c,i}$ and $v_{air,i}$, a simplified linear controller model can be used to define the thermal energy load $\dot{Q}_{c,i}$ of each building zone as a function of the zone temperature $T_i$ and the zone temperature setpoint $T_{sp,i}$. An example of such a model is shown in the following equations:

$$\dot{Q}_{c,i} = \dot{Q}_{ss,i} + K_{c,i}\left[\varepsilon_i + \frac{1}{\tau_{I,i}}\int_0^t \varepsilon_i(t')dt'\right]$$

$$\varepsilon_i = T_{sp,i} - T_i$$

where $\dot{Q}_{ss,i}$ is the steady-state rate of heating or cooling rate, $K_{c,i}$ is the scaled zone PI controller proportional gain, $\tau_{I,i}$ is the zone PI controller integral time, and $\varepsilon_i$ is the setpoint error (i.e., the difference between the zone temperature setpoint $T_{i,sp}$ and the zone temperature $T_{sp}$). Saturation can be represented by constraints on $\dot{Q}_{c,i}$. If a linear model is not sufficiently accurate to model the PI controller and heat transfer in the indoor VRF unit for zone i, a nonlinear heating/cooling duty model can be used instead.

Advantageously, modeling the regulatory controllers (e.g., zone PI controllers) in the low-level optimization problem allows low-level indoor MPC 2112 to use the dynamics of the regulatory controllers when determining the optimal temperature setpoints. In some embodiments, the responses of the regulatory controllers can be sluggish. For example, it can take some zones up to an hour to reach a new temperature setpoint. Using the dynamics of the regulatory controllers in the low-level MPC problem allows low-level indoor MPC 2112 to consider the time between control action and effect such that optimal temperature setpoints can be selected in view of time-varying energy prices.

Still referring to FIG. 23, low-level indoor MPC 2112 is shown to include a constraints modeler 2310. Constraints modeler 2310 can generate and impose optimization constraints on the optimization procedure performed by low-level optimizer 2312. Constraints imposed by constraints modeler 2310 can include, for example, equipment capacity constraints and zone temperature constraints. In some embodiments, constraints modeler 2310 imposes constraints on the zone temperature $T_i$. For example, constraints modeler 2310 can constrain the zone temperature $T_i$ between a minimum temperature $T_{min}$ and a maximum temperature $T_{max}$ as shown in the following equation:

$$T_{min} \leq T_i \leq T_{max}$$

where the values of $T_{min}$ and $T_{max}$ can be adjusted based on the temperature setpoints of the indoor subsystem.

In some embodiments, constraints modeler 2310 automatically adjusts the values of $T_{min}$ and $T_{max}$ based on information received from the BMS for the building zone. For example, constraints modeler 2310 can use a temperature setpoint schedule and/or occupancy schedule for the building zone to automatically adjust the values of $T_{min}$ and $T_{max}$ for each time step k. This allows constraints modeler 2310 to use temperature limits based on the time-varying setpoint temperature range for the zone so that the zone temperature $T_i$ is maintained within time-appropriate temperature limits $T_{min}$ and $T_{max}$.

In some embodiments, constraints modeler 2310 imposes a constraint to ensure that the total indoor subsystem load during any time step k is no greater than the thermal energy load allocated to the indoor subsystem by high-level MPC 2108. For example, constraints modeler 2310 can impose the constraint:

$$\frac{Q_{total,k+1} - Q_{total,k}}{\Delta} \leq \dot{Q}_{c,b,k}$$

where $Q_{total,k+1}$ is the total indoor subsystem energy consumed at time step k+1, $Q_{total,k}$ is the total indoor subsystem energy consumed at time step k, $\dot{Q}_{c,b,k}$ is the thermal energy load allocated to the indoor subsystem b by high-level MPC 2108, and $\Delta$ is the duration of each time step. The left side of the equation represents the indoor subsystem thermal energy load during time step k (i.e., the change in total thermal energy delivered between consecutive time steps divided by the time step duration), whereas the right side of the equation represents the thermal energy load allocated to indoor subsystem b during time step k by high-level MPC 2108.

In some embodiments, constraints modeler 2310 imposes an additional constraint to ensure that the total amount of thermal energy delivered does not decrease between consecutive time steps, as shown in the following equation:

$$Q_{total,k+1} - Q_{total,k} \geq 0$$

Since $Q_{total,k+1}$ is a summation of the amount of thermal energy delivered up to time step k+1, this constraint prevents low-level optimizer 2312 from selecting a negative value for the thermal energy load $\dot{Q}_{c,i}$ at time step k. In other words, the rate at which thermal energy is delivered (i.e., $\dot{Q}_{c,i}$) can add to the total amount of thermal energy delivered over the optimization period, but cannot subtract from the total amount of thermal energy delivered.

Low-level optimizer 2312 can use the zone temperature models, indoor subsystem load model, cooling/heating duty model, and optimization constraints to formulate an optimization problem. In some embodiments, the low-level optimization problem seeks to minimize the total amount of thermal energy $Q_{total,N}$ used by the indoor subsystem 2132 over the optimization period subject to the zone temperature constraints and other constraints provided by the low-level models described herein. For example, low-level optimizer 2312 can formulate the low-level optimization problem as:

$$\min_{x,u} Q_{total,N}$$

subject to the following constraints:

$$c_i \frac{dT_i}{dt} = -H_i(T_i - T_a) - \sum_{j \neq i} \beta_{ij}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_{min} \leq T_i \leq T_{max}$$

$$\frac{Q_{total,k+1} - Q_{total,k}}{\Delta} \leq \dot{Q}_{c,b,k}$$

$$Q_{total,k+1} - Q_{total,k} \geq 0$$

$$\dot{Q}_{c,i} = f(T_i, u_i)$$

where the function $f$ is defined according to relationships between the zone thermal energy load $\dot{Q}_{c,i}$ and the zone setpoint $u_i$ (e.g., zone temperature setpoint $T_{sp,i}$ or operating mode $z_i$ and refrigerant flow rate $m_i$) as previously described.

In some embodiments, low-level optimizer 2312 converts one or more of the above-identified models and/or constraints to state-space form for use in the low-level optimization problem. For example, low-level optimizer 2312 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. Table 2 illustrates the variables that can be included in each of these vectors:

TABLE 2

| Variables in Low-Level Optimization | | |
|---|---|---|
| States | $x = [T_i \; \bar{\epsilon}i \; Q_{total}]^T$ | $n = 2n_z + 1$ |
| Inputs | $u = [u_i]^T$ | $m = n_z$ |
| Measurements | $y = [T_i \; Q_{total}]^T$ | $p = n_z + 1$ |
| Disturbances | $d = [T_a \; \dot{Q}_{other,i} \; \dot{Q}_{ss,i}]^T$ | $n_d = 2n_z + 1$ |

As shown in Table 2, the system states vector x includes the zone temperature $T_i$, the integral of the zone tracking error $\bar{\epsilon}_i$, and the total thermal energy delivered to the indoor subsystem. In some embodiments, the system states vector x includes a zone temperature $T_i$ and an integrated zone tracking error $\bar{\epsilon}_i$ for each of the $n_z$ zones and single total thermal energy value such that the total number n of variables in the system states vector x is equal to $2n_z+1$. The inputs vector u can include the zone setpoint $u_i$ (e.g., zone temperature setpoint $T_{sp,i}$ or operating mode $z_i$ and refrigerant flow rate $m_i$). In some embodiments, the inputs vector u includes a zone setpoint $u_i$ for each of the $n_z$ zones such that the total number m of variables in the inputs vector u is equal to $n_z$.

In some embodiments, the measurements vector y is the same as the system states vector x, but without the integrated zone tracking error $\bar{\epsilon}_i$. This indicates that the zone temperature $T_i$ and the total amount of thermal energy delivered $Q_{total}$, are directly measured. The value of the integrated zone tracking error $\bar{\epsilon}_i$ can be calculated from the difference between $T_{i,sp}$ and $T_i$. The disturbance vector d can include the ambient air temperature $T_a$, the estimated disturbance $\dot{Q}_{other}$ for each zone, and the steady-state rate of heating/cooling $\dot{Q}_{ss,i}$ for each zone. In some embodiments, the disturbances vector d includes an estimated disturbance $\dot{Q}_{other,i}$ and a steady-state rate of heating/cooling $\dot{Q}_{ss,i}$ for each of the $n_z$ indoor subsystems and a single ambient air temperature $T_a$ such that the total number $n_d$ of variables in the disturbances vector d is equal to $n_z+1$.

In some embodiments, the system states x can be constructed or predicted from the measurements y. For example, low-level indoor MPC 2112 can use a Kalman filter or other predictive technique to construct the system states x from the measurements y. The values of the A, B, C, and D, matrices in the state-space representation can be identified using a system identification technique. Examples of state prediction and system identification techniques which can be used by low-level indoor MPC 2112 are described in detail in U.S. Pat. No. 9,235,657.

Still referring to FIG. 23, low-level indoor MPC 2112 is shown to include a model aggregator 2318. Model aggregator 2318 can generate aggregate values for various indoor subsystem parameters and/or variables used in the low-level optimization. For example, model aggregator 2318 can generate an aggregate subsystem temperature $T_b$ for the low-level indoor subsystem by aggregating the individual zone temperatures $T_i$ of each zone in the subsystem. In some embodiments, model aggregator 2318 generates the aggregate subsystem temperature $T_b$ using the following equation:

$$T_b = \frac{\sum_{i=1}^{n_z} C_i T_i}{\sum_{i=1}^{n_z} C_i}$$

where $C_i$ is the thermal capacitance of zone i and $T_i$ is the temperature of zone i. The numerator of the previous equation represents the total amount of heat in the subsystem, whereas the denominator represents the total thermal capacitance of the subsystem. Both quantities are summed across all subsystem zones i=1 ... $n_z$. Model aggregator 2318 can divide the total amount of heat by the total thermal capacitance to estimate an average subsystem temperature $T_b$. Model aggregator 2318 can calculate an aggregate subsystem temperature $T_{b,k}$ for each time step k of the optimization period.

Model aggregator 2318 can calculate aggregate values for other subsystem parameters or variables such as the subsystem thermal capacitance $C_b$, the subsystem heat transfer coefficient $H_b$, and the estimated subsystem disturbance $\dot{Q}_{other,b}$. In some embodiments, model aggregator 2318 calculates the aggregate values for these variables and parameters using the following equations:

$$C_b = \sum_{i=1}^{n_z} C_i$$

$$H_b = \sum_{i=1}^{n_z} H_i$$

$$\dot{Q}_{other,b} = \sum_{i=1}^{n_z} \dot{Q}_{other,i}$$

where the subsystem thermal capacitance $C_b$ is the summation of the zone thermal capacitance $C_i$ values for each subsystem zone, the subsystem heat transfer coefficient $H_b$ is the summation of the zone heat transfer coefficients $H_i$ values for each subsystem zone, and the estimated subsystem disturbance $\dot{Q}_{other,b}$ is the summation of the estimated subsystem disturbances $\dot{Q}_{other,i}$ for each subsystem zone. Model aggregator 2318 can calculate aggregate values of $C_{b,k}$, $H_{b,k}$, and $\dot{Q}_{other,b,k}$ or each time step k of the optimization period.

In some embodiments, model aggregator 2318 provides the aggregate subsystem parameters and variables $T_b$, $C_b$, $H_b$, and $\dot{Q}_{other,b}$ to high-level MPC 2108. High-level MPC 2108 can use such values as inputs to the high-level models, constraints, and optimization function used in the high-level optimization. Advantageously, the model aggregation performed by model aggregator 2318 helps to reduce the amount of information exchanged between each low-level indoor MPC 2112-2116 and high-level MPC 2108. For example, each low-level indoor MPC 2112-2116 can provide high-level MPC 2108 with the aggregate values described above rather than individual values of such variables and parameters for each building zone.

Still referring to FIG. 23, low-level indoor MPC 2112 is shown to include a temperature tracker 2322. In some embodiments, temperature tracker 2322 performs an alternative optimization which can supplement or replace the low-level optimization performed by low-level optimizer 2312. Rather than minimizing the total thermal energy $Q_{total,N}$ used by the low-level indoor subsystem, temperature tracker 2322 can generate zone temperature setpoints $T_{sp,i}$ which track the predicted subsystem temperature states $\hat{T}_{b,k}$ generated by high-level MPC 2108 as a result of the high-level optimization. For example, high-level MPC 2108 can calculate the subsystem temperature states $\hat{T}_{b,k}$ for each low-level indoor subsystem 2132-2136 predicted to result from the load profiles generated by high-level MPC 2108. As described above, the predicted temperature states $\hat{T}_{b,k}$ can be calculated using a Kalman filter or any other type of state prediction technique. High-level MPC 2108 can provide the predicted temperature states $\hat{T}_{b,k}$ to each low-level indoor MPC 2112-2116 for use in the temperature tracking process.

Temperature tracker 2322 is shown receiving the predicted temperature states $\hat{T}_b$ via communications interface 2302. Temperature tracker 2322 can also receive the aggregate subsystem temperatures $T_{b,k}$ generated by model aggregator 2318. Temperature tracker 2322 can formulate an objective function which seeks to minimize the error between the aggregate subsystem temperatures $T_{b,k}$ and the predicted temperature states $\hat{T}_{b,k}$, as shown in the following equation:

$$\sum_{k=1}^{N} \frac{1}{2} \|T_{b,k} - \hat{T}_{b,k}\|^2 + \mu Q_{total,N}$$

where $\mu$ is a small penalty factor applied to the total amount of thermal energy $Q_{total,N}$ used by the indoor subsystem over the optimization period. The value of $\mu$ can be adjusted to increase or decrease the weight assigned to the total amount of thermal energy $Q_{total,N}$ relative to the temperature tracking error.

Temperature tracker 2322 can use the previous equation as the objective function in an optimization procedure to determine optimal values for the zone temperature setpoints $T_{sp,i}$. The optimization performed by temperature tracker 2322 can be similar to the optimization performed by low-level optimizer 2312, with the exception that temperature tracker 2322 is not constrained by the load profile provided by high-level MPC 2108 and seeks to optimize a different objective function. For example, temperature tracker 2322 can minimize the objective function:

$$\min_{x,u} \sum_{k=1}^{N} \frac{1}{2} \|T_{b,k} - \hat{T}_{b,k}\|^2 + \mu Q_{total,N}$$

subject to the following constraints:

$$c_i \frac{dT_i}{dt} = -H_i(T_i - T_a) - \sum_{j \neq i} \beta_{ij}(T_i - T_j) - \dot{Q}_{c,i} + \dot{Q}_{other,i}$$

-continued $$\frac{dQ_{total}}{dt} = \sum_{i=1}^{n_z} \dot{Q}_{c,i}$$

$$T_b = \frac{\sum_{i=1}^{n_z} C_i T_i}{\sum_{i=1}^{n_z} C_i}$$

$$T_{min} \leq T_i \leq T_{max}$$

$$Q_{total,k+1} - Q_{total,k} \geq 0$$

$$\dot{Q}_{c,i} = f(T_i, u_i)$$

where the function $f$ is defined according to relationships between the zone thermal energy load $\dot{Q}_{c,i}$ and the zone setpoint $u_i$ (e.g., zone temperature setpoint $T_{sp,i}$, or operating mode $z_i$ and refrigerant flow rate $m_i$) as previously described.

In some embodiments, temperature tracker 2322 converts one or more of the above-identified models and/or constraints to state-space form for use in the low-level optimization problem. For example, temperature tracker 2322 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. The variables included in each vector can be the same as shown in Table 2 above.

Flow Diagrams

Figure 24:
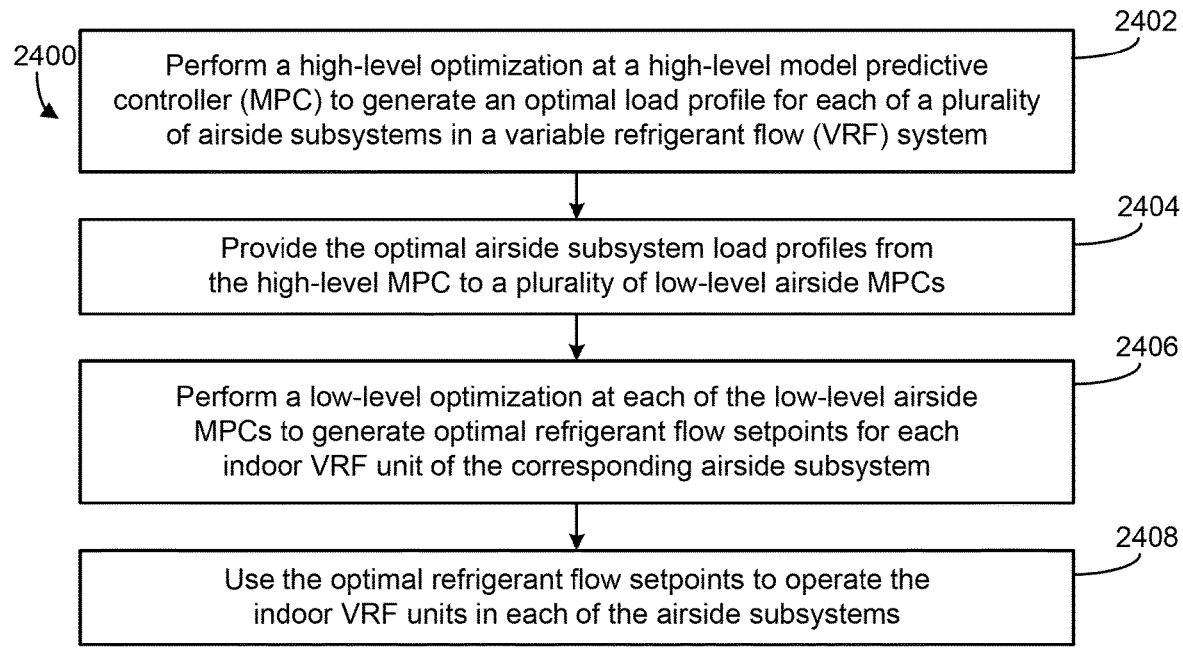
FIG. 24 is a flow diagram of a high-level and distributed low-level model predictive control technique which can be used to optimize energy cost in the MPC system of FIG. 21 when indoor subsystem loads are used as constraints in the low-level optimizations, according to some embodiments.

Referring now to FIG. 24, a flow diagram 2400 illustrating a model predictive control technique which can be performed by MPC system 2100 is shown, according to some embodiments. Flow diagram 2400 is shown to include performing a high-level optimization at a high-level model predictive controller (MPC) to generate an optimal load profile for each of a plurality of indoor subsystems in a variable refrigerant flow (VRF) system (block 2402). In some embodiments, the high-level optimization is performed by high-level MPC 2108, as described with reference to FIGS. 21-22. For example, the high-level optimization can include generating a high-level energy cost function defining the energy cost as a function of a outdoor unit demand profile $\dot{Q}_{HVAC}$. In some embodiments, the outdoor unit demand profile $\dot{Q}_{HVAC}$ indicates a thermal energy or refrigerant state allocation of the outdoor subsystem at each of a plurality of time steps k in an optimization period.

In some embodiments, high-level MPC 2108 generates an energy cost function that accounts for the per-unit costs of energy consumption in outdoor subsystem 2138 and the demand charge, but does not account for energy consumption in indoor subsystems 2132-2136. An example of such an energy cost function is shown in the following equation:

$$\text{Energy Cost} = \sum_{k=0}^{N-1} c_k \eta_{tot} \dot{Q}_{HVAC,k} \Delta + c_{peak} \eta_{tot} \dot{Q}_{peak}$$

The first term of the energy cost function accounts for the per-unit costs (e.g., $/kWh) of energy consumed during each time step k of the optimization period. In some embodiments, $c_k$ is the cost per unit of energy consumed at time step k to satisfy the total outdoor unit demand $\dot{Q}_{HVAC,k}$ at time step k, the parameter $\eta_{tot}$ is the inverse of the coefficient of performance of the aggregate VRF system (e.g., $0.1 \leq \eta_{tot} \leq 0.25$), and $\Delta$ is the duration of time step k. Accordingly, the term $\eta_{tot} \dot{Q}_{HVAC,k} \Delta$ represents the total amount of energy consumed (e.g., kWh) during time step k to satisfy the outdoor unit demand $\dot{Q}_{HVAC,k}$. Multiplying by the cost $c_k$ per unit energy consumed (e.g., $/kWh) yields the total cost (e.g., $) of the energy consumed during time step k. The energy cost function can include a summation of the energy costs during each time step k to determine the total cost of energy consumption over the optimization period.

The second term of the energy cost function accounts for the demand charge. In some embodiments, $c_{peak}$ is the demand charge rate (e.g., $/kW), $\dot{Q}_{peak}$ is the peak outdoor unit demand during the demand charge period (e.g., the maximum of $\dot{Q}_{HVAC,k}$), and $\eta_{tot}$ is the inverse of the coefficient of performance of the aggregate VRF system. Accordingly, the term $\eta_{tot} \dot{Q}_{peak}$ represents the peak power consumption to satisfy the peak outdoor unit demand $\dot{Q}_{peak}$. Multiplying by the demand charge rate $c_{peak}$ yields the total cost (e.g., $) of the demand charge.

In some embodiments, high-level MPC 2108 generates an energy cost function that accounts for the per-unit costs of energy consumption in outdoor subsystem 2138, the demand charge, and the energy consumption in indoor subsystems 2132-2136. An example of such an energy cost function is shown in the following equation:

$$\text{Energy Cost} = \sum_{k=0}^{N-1} c_k \left( \eta_{HVAC} \dot{Q}_{HVAC,k} + \eta_{air} \sum_{b=1}^{n_b} \dot{Q}_{c,b,k} \right) \Delta + c_{peak} \dot{W}_{peak}$$

The first portion of the energy cost function accounts for the per unit costs (e.g., $/kWh) of energy consumed by outdoor subsystem 2138 during each time step k of the optimization period. In some embodiments, $c_k$ is the cost per unit of energy consumed at time step k, $\Delta$ is the duration of time step k, and $\eta_{HVAC}$ is the inverse of the coefficient of performance of outdoor subsystem 2138 (e.g., $\eta_{HVAC} \sim 0.2$). The term HVAC HVAC,k represents the amount of power consumption (e.g., kW) by outdoor subsystem 2138 during time step k to satisfy the outdoor unit demand $\dot{Q}_{HVAC,k}$. Multiplying by the cost $c_k$ per unit energy consumed (e.g., $/kWh) and the duration $\Delta$ (e.g., hours) yields the total cost (e.g., $) of the energy consumed during time step k by outdoor subsystem 2138. The first portion of the energy cost function can be summed across all time steps k=0 . . . N−1 of the optimization period to determine the total energy consumed by outdoor subsystem 2138 over the duration of the optimization period.

The second portion of the energy cost function accounts for the per unit costs (e.g., $/kWh) of energy consumed by each indoor subsystem during each time step k of the optimization period. As described above, $\eta_{air}$ is the inverse of the coefficient of performance of the indoor subsystems (e.g., $\eta_{air} \sim 0.1$) and $\dot{Q}_{c,b,k}$ is the thermal energy load delivered by the indoor subsystem for indoor subsystem b at time step k. The term $\eta_{air} \dot{Q}_{c,b,k}$ represents the power consumption $\dot{W}_{air,b}$ of the indoor VRF units for indoor subsystem b. The second portion of the energy cost function can be summed across all indoor subsystems $b=1 \ldots n_b$ and across all time steps $k=0 \ldots N-1$ to determine the total power consumption of all indoor subsystems over the duration of the optimization period. Multiplying by the cost $c_k$ per unit energy consumed (e.g., $/kWh) and the duration $\Delta$ (e.g., hours) yields the total cost (e.g., $) of the energy consumed by the indoor subsystems over the duration of the optimization period.

The third portion of the energy cost function accounts for the demand charge. In some embodiments, $c_{peak}$ is the demand charge rate (e.g., $/kW) and $\dot{W}_{peak}$ is the peak aggregate power consumption during the applicable demand charge period. Multiplying by the demand charge rate $c_{peak}$ yields the total cost (e.g., $) of the demand charge.

In some embodiments, performing the high-level optimization in block 2402 includes using a outdoor unit demand model to define the outdoor unit demand profile $\dot{Q}_{HVAC}$ as a function of the plurality of indoor subsystem load profiles $\dot{Q}_{c,b}$. Each indoor subsystem load profile $\dot{Q}_{c,b}$ can indicate a thermal energy allocation to one of the indoor subsystems at each of the plurality of time steps.

In some embodiments, the outdoor unit demand model represents the demand on outdoor subsystem 2138 as a function of the thermal energy load $\dot{Q}_{c,b}$ allocated to each indoor subsystem at each time step of the optimization period. An example of such an outdoor unit demand model is shown in the following equation:

$$\dot{Q}_{HVAC,k} = \sum_{b=1}^{b_n} \dot{Q}_{c,b,k}$$

where $\dot{Q}_{HVAC,k}$ is the outdoor unit demand at time step k (e.g., the thermal energy or refrigerant state allocation of outdoor subsystem 2138 at time step k), $\dot{Q}_{c,b,k}$ is the thermal energy load allocated to indoor subsystem b at time step k, and $\dot{Q}_{storage,k}$ is the amount of thermal energy being stored in the TES tanks during time step k. The previous equation indicates that the total demand $\dot{Q}_{HVAC,k}$ on the outdoor subsystem 2138 is a summation of the thermal energy loads $\dot{Q}_{c,b,k}$ allocated to each indoor subsystem b. This equation can be used by high-level MPC 2108 as an energy balance constraint to ensure that outdoor subsystem 2138 generates enough thermal energy to cover the indoor subsystem loads at each time step k.

In some embodiments, the high-level optimization in block 2402 includes generating an indoor subsystem temperature model for each of the plurality of indoor subsystems. Each indoor subsystem temperature model can define a relationship between the thermal energy allocation $\dot{Q}_{c,b}$ to an indoor subsystem and a temperature $T_b$ of the indoor subsystem. An example of such an indoor subsystem temperature model is shown in the following equation:

$$C_b \frac{dT_b}{dt} = -H_b(T_b - T_a) - \dot{Q}_{c,b} + \dot{Q}_{other,b}$$

where $C_b$ and $T_b$ are the thermal capacitance and temperature of the indoor subsystem designated by index b, $T_a$ is the ambient air temperature outside indoor subsystem b (e.g., outside air temperature), $H_b$ is the heat transfer coefficient between indoor subsystem b and the ambient air, $\dot{Q}_{c,b}$ is the amount of cooling applied to the indoor subsystem by MPC system 2100 (i.e., the amount of heat removed from the indoor subsystem), and $\dot{Q}_{other,b}$ is the external load, radiation, or disturbance experienced by the indoor subsystem b. If heating is provided to the indoor subsystem rather than cooling, the sign on $\dot{Q}_{c,b}$ can be switched from a negative sign to a positive sign.

The high-level optimization can use the indoor subsystem disturbance estimates received from low-level indoor controllers 2112-2116 to identify appropriate values of the external disturbance $\dot{Q}_{other,b}$ for each indoor subsystem b at each time step of the optimization period. In some embodiments, the high-level optimization uses the weather forecasts from weather service 2104 and/or the load and rate predictions provided by load/rate predictor 2102 to determine appropriate values for the ambient air temperature $T_a$ and/or the external disturbance $\dot{Q}_{other,b}$ for each indoor subsystem b at each time step of the optimization period. Values of $C_b$ and $H_b$ can be specified as parameters of the indoor subsystem b, received from the low-level indoor controller for the indoor subsystem b, received from a user, retrieved from memory, or otherwise provided to high-level MPC 2108. The high-level optimization can include generating a temperature model for each indoor subsystem b, where $b=1 \ldots n_b$ and $n_b$ is the total number of indoor subsystems.

In some embodiments, performing the high-level optimization in block 2402 includes optimizing the energy cost and the plurality of indoor subsystem load profiles subject to constraints provided by the outdoor unit demand model and each indoor subsystem temperature model. The high-level optimization can use the energy cost model, demand charge model, indoor subsystem temperature model, outdoor unit demand model, and optimization constraints to formulate an optimization problem.

In some embodiments, the high-level optimization seeks to minimize the total cost of energy consumed by outdoor subsystem 2138 (i.e., energy cost and demand charge) subject to the indoor subsystem temperature constraints and other constraints provided by the high-level models described herein. For example, the high-level optimization can formulate the high-level optimization problem as:

$$\min_{x,u,\dot{Q}_{peak}} \sum_{k=0}^{N-1} c_k \eta_{tot} \dot{Q}_{HVAC,k} \Delta + c_{peak} \eta_{tot} \dot{Q}_{peak}$$

subject to the following constraints:

$$C_b \frac{dT_b}{dt} = -H_b(T_b - T_a) - \dot{Q}_{c,b} + \dot{Q}_{other,b}$$

$$\frac{ds}{dt} = -\sigma s + \dot{Q}_{storage}$$

$$\dot{Q}_{HVAC,k} = \sum_{b=1}^{b_n} \dot{Q}_{c,b,k} + \dot{Q}_{storage,k}$$

$$0 \le \dot{Q}_{HVAC,k} \le \dot{Q}_{peak}$$

$$\dot{Q}_{peak,past} \le \dot{Q}_{peak} \le \dot{Q}_{HVAC,max}$$

$$0 \le s_k \le s_{max}$$

$$T_{min} \le T_b \le T_{max}$$

In some embodiments, the high-level optimization seeks to minimize the total cost of energy consumed by the aggregate VRF system subject to the indoor subsystem temperature constraints and other constraints provided by the high-level models described herein. For example, the high-level optimization can formulate the high-level optimization problem as:

$$\min_{x,u,\dot{W}_{peak}} \sum_{k=0}^{N-1} c_k \left( \eta_{HVAC} \dot{Q}_{HVAC,k} + \eta_{air} \sum_{b=1}^{n_b} \dot{Q}_{c,b,k} \right) \Delta + c_{peak} \dot{W}_{peak}$$

subject to the following constraints:

$$C_b \frac{dT_b}{dt} = -H_b(T_b - T_a) - \dot{Q}_{c,b} + \dot{Q}_{other,b}$$

$$\frac{ds}{dt} = -\sigma s + \dot{Q}_{storage}$$

$$\dot{Q}_{HVAC,k} = \sum_{b=1}^{b_n} \dot{Q}_{c,b,k} + \dot{Q}_{storage,k}$$

$$0 \leq \left( \eta_{HVAC} \dot{Q}_{HVAC,k} + \eta_{air} \sum_{b=1}^{n_b} \dot{Q}_{c,b,k} \right) \leq \dot{W}_{peak}$$

$$\dot{W}_{peak,past} \leq \dot{W}_{peak}$$

$$0 \leq \dot{Q}_{HVAC,k} \leq \dot{Q}_{HVAC,max}$$

$$0 \leq s_k \leq s_{max}$$

$$T_{min} \leq T_b \leq T_{max}$$

Still referring to FIG. 24, flow diagram 2400 is shown to include providing the optimal indoor subsystem load profiles $\dot{Q}_{c,b}$ from the high-level MPC to a plurality of low-level indoor MPCs (block 2404). Each load profile $\dot{Q}_{c,b}$ can be sent from high-level MPC 2108 to one of low-level indoor MPCs 2112-2116, as shown in FIG. 21. In some embodiments, each low-level indoor MPC is configured to monitor and control a particular indoor subsystem. Each low-level indoor MPC can receive the optimal subsystem load profile for the indoor subsystem monitored and controlled by that low-level indoor MPC.

Flow diagram 2400 is shown to include performing a low-level optimization at each of the low-level indoor MPCs to generate optimal refrigerant flow setpoints for each indoor VRF unit of the indoor subsystem (block 2406). In some embodiments, the low-level optimization in block 2406 includes generating a zone temperature model for each zone i of each indoor subsystem. The zone temperature model can define a relationship between the temperature $T_i$ of the zone and the thermal energy load profile $\dot{Q}_{c,i}$ for the zone. An example of such a zone temperature model is shown in the following equation:

$$c_i \frac{dT_i}{dt} = -H_i(T_i - T_a) - \sum_{j \neq i} \beta_{i,j}(T_i - T_j) - \dot{Q}_{c,i} + \dot{Q}_{other,i}$$

where $C_i$ and $T_i$ are the thermal capacitance and temperature of the building zone designated by zone index i, $T_a$ is the ambient air temperature outside zone i (e.g., outside air temperature), $H_i$ is the heat transfer coefficient between zone i and the ambient air, $\dot{Q}_{c,i}$ is the amount of cooling applied to the building zone i by MPC system 2100 (i.e., the amount of heat removed from the zone), and $\dot{Q}_{other,i}$ is the external load, radiation, or disturbance experienced by zone i. If heating is provided to the zone rather than cooling, the sign on $\dot{Q}_{c,i}$ can be switched from a negative sign to a positive sign.

The parameter $\beta_{ij}$ characterizes the degree of coupling between zone i and another zone j (e.g., a building zone adjacent to zone i). If zones i and j are not adjacent and/or do not directly exchange heat with each other, zone temperature modeler 2314 can set the value of $\beta_{ij}$ equal to zero. The zone temperature model can include a summation of the heat transfers between building zone i and each other building zone j≠i as a function of the zone temperatures $T_i$ and $T_j$ and the coupling coefficient $\beta_{ij}$. In other embodiments, heat transfer between zones can be accounted for using the external disturbance estimate $\dot{Q}_{other,i}$.

The low-level optimization can include using the zone disturbance estimates received from zone disturbance predictor 2324 to identify appropriate values of the external disturbance $\dot{Q}_{other,i}$ for each zone i at each time step of the optimization period. In some embodiments, the low-level optimization uses the weather forecasts from weather service 2104 and/or the load and rate predictions provided by load/rate predictor 2102 to determine appropriate values for the ambient air temperature $T_a$ and/or the external disturbance $\dot{Q}_{other,i}$ for each zone i at each time step of the optimization period. Values of $C_i$ and $H_i$ can be specified as parameters of the zone i, received from the BMS that manages the building zone i, received from a user, retrieved from memory 2308, or otherwise provided to zone temperature modeler 2314.

In some embodiments, the low-level optimization in block 2406 includes generating a model of the total amount of thermal energy delivered to the indoor subsystem $Q_{total}$ (e.g., the total amount of heating or cooling delivered to the indoor subsystem) as a function of the individual zone loads $\dot{Q}_{c,i}$. In some embodiments, the low-level optimization includes modeling the total indoor subsystem load using the following $$\frac{dQ_{total}}{dt} = \sum_{i=1}^{n_z} \dot{Q}_{c,i}$$

where $Q_{total}$ is the total amount of thermal energy (e.g., heating or cooling) delivered to the indoor subsystem and $\dot{Q}_{c,i}$ is the rate at which thermal energy is being delivered (units of power) of a particular zone i. The indoor subsystem load model can sum the thermal energy loads $\dot{Q}_{c,i}$ of each building zone to calculate the total indoor subsystem thermal energy load $$\frac{dQ_{total}}{dt},$$

which is the derivative of the total amount of thermal energy $Q_{total}$ delivered to the indoor subsystem.

In some embodiments, the low-level optimization includes generating one or more models that define the thermal energy load $\dot{Q}_{c,i}$ of each building zone as a function of the zone temperature $T_i$ and the zone setpoint $u_i$ as shown in the following equation:

$$\dot{Q}_{c,i} = f(T_i, u_i)$$

where the function $f$ is defined according to relationships between the zone thermal energy load $\dot{Q}_{c,i}$ and the zone setpoint $u_i$ (e.g., zone temperature setpoint $T_{sp,i}$ or operating mode $z_i$ and refrigerant flow rate $m_i$) as previously described. The models generated by the low-level optimization can be used as optimization constraints to ensure that the thermal energy load $\dot{Q}_{c,i}$ is not reduced to a value that would cause the zone temperature $T_i$ to deviate from an acceptable or comfortable temperature range.

In some embodiments, the low-level optimization in block 2406 seeks to minimize the total amount of thermal energy $Q_{total,N}$ used by the indoor subsystem over the optimization period subject to the zone temperature constraints and other constraints provided by the low-level indoor models described herein. For example, the low-level optimization can formulate the low-level optimization problem as:

$$\min_{x,u} Q_{total,N}$$

subject to the following constraints:

$$C_i \frac{dT_i}{dt} = -H_b(T_b - T_a) - \sum_{j \neq i} \beta_{i,j}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_{min} \leq T_i \leq T_{max}$$

$$\frac{Q_{total,k+1} - Q_{total,k}}{\Delta} \leq \dot{Q}_{c,b,k}$$

$$Q_{total,k+1} - Q_{total,k} \geq 0$$

$$\dot{Q}_{c,i} = f(T_i, u_i)$$

where the function $f$ is defined according to relationships between the zone thermal energy load $\dot{Q}_{c,i}$ and the zone setpoint $u_i$ (e.g., zone temperature setpoint $T_{sp,i}$ or operating mode $z_i$ and refrigerant flow rate $m_i$) as previously described.

Still referring to FIG. 24, flow diagram 2400 is shown to include using the optimal refrigerant flow setpoints to the indoor VRF units in each of the indoor subsystems (block 2408). For example, each low-level indoor MPC 2112-2116 can operate the indoor VRF units located in the corresponding indoor subsystem 2132-2136. Operating the indoor VRF units can include activating or deactivating the indoor VRF units, adjusting a refrigerant flow rate, adjusting a fan speed, or otherwise controlling the indoor VRF units to achieve the refrigerant flow setpoints.

Figure 25:
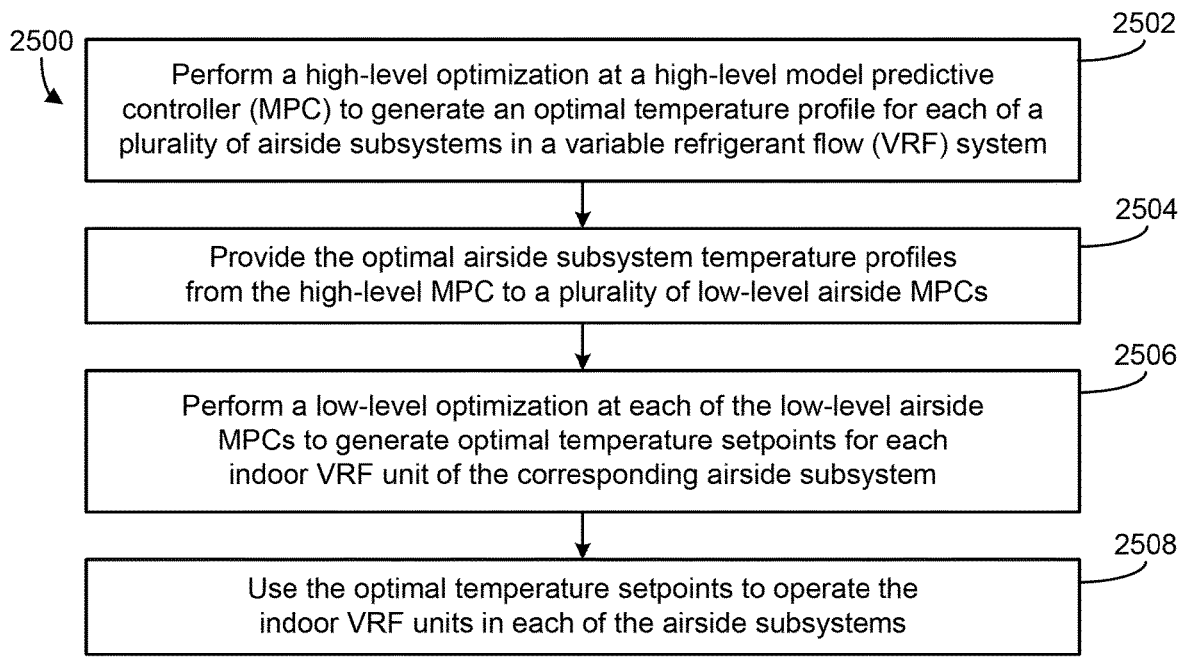
FIG. 25 is another flow diagram of a high-level and distributed low-level model predictive control technique which can be used to optimize energy cost in the MPC system of FIG. 21 when the low-level optimizations track temperature profiles provided by the high-level optimization, according to some embodiments.

Referring now to FIG. 25, a flow diagram 2500 illustrating a model predictive control technique which can be performed by MPC system 2100 is shown, according to some embodiments. Flow diagram 2500 is shown to include performing a high-level optimization at a high-level model predictive controller (MPC) to generate an optimal temperature profile for each of a plurality of indoor subsystems in a variable refrigerant flow (VRF) system (block 2502). In some embodiments, the high-level optimization is performed by high-level MPC 2108, as described with reference to FIGS. 21-22. The high-level optimization can be the same or similar to the high-level optimization described with reference to FIG. 24.

The high-level optimization in block 2502 can generate an optimal temperature profile $\hat{T}_b$ for each indoor subsystem. The optimal temperature profile $\hat{T}_b$ can include a vector of predicted temperature states $\hat{T}_b$ for each low-level indoor subsystem 2132-2136. Each vector of predicted temperature states $\hat{T}_b$ can include a predicted indoor subsystem temperature state $\hat{T}_{b,k}$ for each time step k during the optimization period. Temperature states $\hat{T}_{b,k}$ can be predicted using any of a variety of predictive techniques including, for example, a Kalman filter as described in U.S. Pat. No. 9,235,657.

Flow diagram 2500 is shown to include providing the optimal indoor subsystem temperature profiles $\hat{T}_b$ from the high-level MPC to a plurality of low-level indoor MPCs (block 2504). Each subsystem temperature profiles $\hat{T}_b$ can be sent from high-level MPC 2108 to one of low-level indoor MPCs 2112-2116. In some embodiments, each low-level indoor MPC is configured to monitor and control a particular indoor subsystem. Each low-level indoor MPC can receive the optimal subsystem temperature profile $\hat{T}_b$ for the indoor subsystem monitored and controlled by that low-level indoor MPC.

Flow diagram 2500 is shown to include performing a low-level optimization at each of the low-level indoor MPCs to generate optimal temperature setpoints for each indoor VRF unit of the corresponding indoor subsystem (block 2506). The low-level optimization in block 2506 can be similar to the low-level optimization in block 2406. However, the low-level optimization in block 2506 can formulate the low-level optimization problem to track the optimal temperatures generated by the high-level optimization in block 2502 rather than minimizing total amount of thermal energy used.

In some embodiments, the low-level optimization in block 2506 can be formulated as:

$$\min_{x,u} \sum_{k=1}^{N} \frac{1}{2}\left\|T_{b,k} - \hat{T}_{b,k}\right\|^2 + \mu Q_{total,N}$$

subject to the following constraints:

$$C_i \frac{dT_i}{dt} = -H_i(T_i - T_a) - \sum_{j \neq i} \beta_{i,j}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_{min} \leq T_i \leq T_{max}$$

$$Q_{total,k+1} - Q_{total,k} \geq 0$$

$$\dot{Q}_{c,i} = f(T_i, u_i)$$

where the function $f$ is defined according to relationships between the zone thermal energy load $\dot{Q}_{c,i}$ and the zone setpoint $u_i$ (e.g., zone temperature setpoint $T_{sp,i}$ or operating mode $z_i$ and refrigerant flow rate $m_i$) as previously described.

Still referring to FIG. 25, flow diagram 2500 is shown to include using the optimal temperature setpoints to operate the indoor VRF units in each of the indoor subsystems (block 16008). For example, each low-level indoor MPC 2112-2116 can operate the indoor VRF units located in the corresponding indoor subsystem 2132-2136. Operating the indoor VRF units can include activating or deactivating the indoor VRF units, adjusting a refrigerant flow rate, adjusting a fan speed, or otherwise controlling the indoor VRF units to achieve the refrigerant flow setpoints.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A heating, ventilation, or air conditioning (HVAC) system for a building, the HVAC system comprising:
    HVAC equipment configured to provide heating or cooling to one or more building spaces;
    one or more controllers comprising one or more processing circuits configured to:
        generate energy targets for the one or more building spaces using a heat transfer model defining a relationship between the energy targets for the one or more building spaces, a temperature of the one or more building spaces predicted to result from the energy targets for the one or more building spaces, and a thermal capacitance of the one or more building spaces to which the heating or cooling is provided by the HVAC equipment;
        generate setpoints for the HVAC equipment using the energy targets for the one or more building spaces to which the heating or cooling is provided by the HVAC equipment; and
        operate the HVAC equipment using the setpoints to provide the heating or cooling to the one or more building spaces.

2. The HVAC system of claim 1, wherein:
    the energy targets comprise amounts of thermal energy to be added to the one or more building spaces or removed from the one or more building spaces by the HVAC equipment at each of a plurality of time steps in a time period; and
    the one or more controllers are configured to use the amounts of thermal energy to be added or removed by the HVAC equipment as a constraint when generating the setpoints for the HVAC equipment.

3. The HVAC system of claim 1, wherein the HVAC equipment comprise one or more indoor variable refrigerant flow (VRF) units and the setpoints comprise at least one of:
    refrigerant flow setpoints for the one or more indoor VRF units; or
    temperature setpoints for the one or more building spaces to which the heating or cooling is provided by the one or more indoor VRF units.

4. The HVAC system of claim 1, wherein the one or more controllers are configured to generate the energy targets using an airside power consumption model defining a relationship between:
    the energy targets for the one or more building spaces; and
    airside power consumption predicted to result from the energy targets for the one or more building spaces.

5. The HVAC system of claim 1, wherein the one or more controllers are configured to:
    generate temperature profiles for the one or more building spaces predicted to result from the energy targets; and
    generate the setpoints for the HVAC equipment such that the HVAC equipment operate to drive actual temperatures of the one or more building spaces toward the temperature profiles.

6. The HVAC system of claim 1, wherein:
    the one or more building spaces comprise a plurality of building spaces;
    the HVAC equipment comprise a plurality of HVAC subsystems, each HVAC subsystem corresponding to a building space of the plurality of building spaces and configured to provide heating or cooling to the corresponding building space; and
    the one or more controllers are configured to generate a plurality of energy targets, each energy target corresponding to a HVAC subsystem of the plurality of HVAC subsystems and generated based on a thermal capacitance of the building space to which the heating or cooling is provided by the corresponding HVAC subsystem.

7. The HVAC system of claim 6, wherein the plurality of HVAC subsystems and the plurality of building spaces are located in separate buildings thermally decoupled from one another such that no direct heat exchange occurs between building spaces served by separate HVAC subsystems.

8. The HVAC system of claim 1, wherein the HVAC equipment comprise:
one or more airside units configured to provide the heating or cooling to the one or more building spaces using a heated or chilled fluid provided as an input to the one or more airside units; and
at least one of an outdoor variable refrigerant flow (VRF) unit or a waterside system configured to provide the heated or chilled fluid to the one or more airside units.

9. The HVAC system of claim 8, wherein the one or more controllers are configured to generate the energy targets for the one or more building spaces by determining:
an amount of thermal energy to be delivered to each of the one or more airside units at each of a plurality of time steps in a time period; and
an amount of thermal energy to be produced by at least one of the outdoor VRF unit or the waterside system at each of the plurality of time steps in the time period.

10. A method for operating a heating, ventilation, or air conditioning (HVAC) system for a building, method comprising:
generating energy targets for one or more building spaces using a heat transfer model defining a relationship between the energy targets for the one or more building spaces, a temperature of the one or more building spaces predicted to result from the energy targets for the one or more building spaces, and a thermal capacitance of the one or more building spaces to which the heating or cooling is provided by HVAC equipment;
generating setpoints for the HVAC equipment that provide heating or cooling to the one or more building spaces using the energy targets for the one or more building spaces; and
operating the HVAC equipment using the setpoints to provide the heating or cooling to the one or more building spaces.

11. The method of claim 10, wherein:
the energy targets comprise amounts of thermal energy to be added to the one or more building spaces or removed from the one or more building spaces by the HVAC equipment at each of a plurality of time steps in a time period; and
the amounts of thermal energy to be added or removed by the HVAC equipment are used as a constraint when generating the setpoints for the HVAC equipment.

12. The method of claim 10, wherein the HVAC equipment comprise one or more indoor variable refrigerant flow (VRF) units and the setpoints comprise at least one of:
refrigerant flow setpoints for the one or more indoor VRF units; or
temperature setpoints for the one or more building spaces to which the heating or cooling is provided by the one or more indoor VRF units.

13. The method of claim 10, wherein the energy targets are generated using an airside power consumption model defining a relationship between:
the energy targets for the one or more building spaces; and
airside power consumption predicted to result from the energy targets for the one or more building spaces.

14. The method of claim 10, comprising:
generating temperature profiles for the one or more building spaces predicted to result from the energy targets; and
generating the setpoints for the HVAC equipment such that the HVAC equipment operate to drive actual temperatures of the one or more building spaces toward the temperature profiles.

15. The method of claim 11, wherein:
the one or more building spaces comprise a plurality of building spaces;
the HVAC equipment comprise a plurality of HVAC subsystems, each HVAC subsystem corresponding to a building space of the plurality of building spaces and configured to provide heating or cooling to the corresponding building space; and
the energy targets comprise a plurality of energy targets, each energy target corresponding to a HVAC subsystem of the plurality of HVAC subsystems and generated based on a thermal capacitance of the building space to which the heating or cooling is provided by the corresponding HVAC subsystem.

16. The method of claim 11, wherein the HVAC equipment comprise:
one or more airside units configured to provide the heating or cooling to the one or more building spaces using a heated or chilled fluid provided as an input to the one or more airside units; and
at least one of an outdoor variable refrigerant flow (VRF) unit or a waterside system configured to provide the heated or chilled fluid to the one or more airside units.

17. One or more non-transitory computer-readable media storing instructions that, when executed by one or more processors, cause the one or more processors to perform operations comprising:
generating energy targets for one or more building spaces using a heat transfer model defining a relationship between the energy targets for the one or more building spaces, a temperature of the one or more building spaces predicted to result from the energy targets for the one or more building spaces, and a thermal capacitance of the one or more building spaces to which heating or cooling is provided by HVAC equipment;
generating setpoints for the HVAC equipment that provide heating or cooling to the one or more building spaces using the energy targets for the one or more building spaces; and
operating the HVAC equipment using the setpoints to provide the heating or cooling to the one or more building spaces.

* * * * *